(12) United States Patent
Sherga

(10) Patent No.: US 10,343,328 B1
(45) Date of Patent: Jul. 9, 2019

(54) STRUCTURAL COMPOSITES METHOD AND SYSTEM

(71) Applicant: EcoStrate SFS, Inc., Arlington, TX (US)

(72) Inventor: Ronald Matthew Sherga, Arlington, TX (US)

(73) Assignee: ECOSTRATE SFS, INC., Arlington, TX (US)

( * ) Notice: Subject to any disclaimer, the term of this patent is extended or adjusted under 35 U.S.C. 154(b) by 0 days.

(21) Appl. No.: 16/102,350

(22) Filed: Aug. 13, 2018

Related U.S. Application Data

(62) Division of application No. 14/170,331, filed on Jan. 31, 2014.

(51) Int. Cl.
  *B29C 51/00* (2006.01)
  *B29C 51/42* (2006.01)

(52) U.S. Cl.
  CPC .......... *B29C 51/002* (2013.01); *B29C 51/428* (2013.01)

(58) Field of Classification Search
  CPC .................................................. B29C 51/428
  USPC ........................................................ 264/161
  See application file for complete search history.

(56) References Cited

U.S. PATENT DOCUMENTS

| | | | |
|---|---|---|---|
| 4,590,027 A * | 5/1986 | Murphy | B29B 15/105 264/135 |
| 4,795,666 A | 1/1989 | Okada et al. | |
| 5,212,223 A | 5/1993 | Mack et al. | |
| 5,219,498 A | 6/1993 | Keller et al. | |
| 5,286,576 A | 2/1994 | Srail et al. | |
| 5,728,330 A | 3/1998 | Erwin et al. | |
| 5,972,475 A | 10/1999 | Beekman | |
| 6,226,944 B1 | 5/2001 | Peshkam et al. | |
| 6,233,892 B1 | 5/2001 | Tylman | |
| 6,432,349 B1 | 8/2002 | Pletcher et al. | |
| 6,497,956 B1 | 12/2002 | Phillips et al. | |
| 8,172,564 B2 | 5/2012 | Pricone | |
| 8,475,894 B2 | 7/2013 | Noble et al. | |
| 8,518,312 B2 | 8/2013 | Katz | |
| 2003/0104743 A1* | 6/2003 | Weberg | C08F 4/38 442/286 |
| 2004/0166243 A1 | 8/2004 | Inglefield | |
| 2004/0224590 A1 | 11/2004 | Rawa et al. | |

(Continued)

FOREIGN PATENT DOCUMENTS

WO    2004048072 A1    6/2004

OTHER PUBLICATIONS

ABS materialTDS-Abs-web (as evidence) date uncertain—data sheet evidence, random year put in for form purposes (Year: 2000).*

(Continued)

*Primary Examiner* — Matthew J Daniels
*Assistant Examiner* — Kimberly A. Stewart
(74) *Attorney, Agent, or Firm* — Husch Blackwell LLP; Nathan Sportel

(57) ABSTRACT

The present invention is generally directed to methods and systems for making thermoformed structural elements and composites, including the use of composites, dissimilar or variable processing materials. End products can have the same outward appearance as those products made by more demanding, more expensive extrusion process or injection process, but the end products can be pre-engineered to have significantly, unexpectedly, improved physical and chemical properties.

14 Claims, 24 Drawing Sheets

(56) References Cited

U.S. PATENT DOCUMENTS

2007/0045886 A1     3/2007   Johnson, Sr.
2007/0270529 A1    11/2007   Lutzmann et al.
2009/0151576 A1     6/2009   Ito et al.
2012/0052760 A1     3/2012   Doyle et al.

OTHER PUBLICATIONS abs RTP 600 Acrylonitrile Butadiene Styrene (ABS) Product Data Sheet date uncertain—data sheet evidence, random year put in for form purposes (Year: 2000).*
pet ERIKS PET Data sheet date uncertain—data sheet evidence, random year put in for form purposes (Year: 2000).*
poly(ethylene terephthalate) information and properties date uncertain—data sheet evidence, random year put in for form purposes (Year: 2000).*

* cited by examiner

Control Panel for 14A

Control Panel for 14C

STRUCTURAL COMPOSITES METHOD AND SYSTEM

RELATED U.S. APPLICATION DATA

The Application is a Divisional of U.S. application Ser. No. 14/170,331 titled "Structural Composites Method and System" filed on Jan. 31, 2014.

TECHNICAL FIELD OF THE INVENTION

The present invention is directed to methods and systems for making thermoformed structural elements and composites from dissimilar or variable processing materials.

BACKGROUND OF THE INVENTION

There is a major unresolved challenge in recycling mixed plastics and mixed plastics with non-plastic-contaminates. The difficulty with this type of recycling process is that the different plastics used in the recycling process are not compatible for use or combination with each other. There is an inherent inability of two or more dissimilar plastics to undergo mixing or blending, which means that some plastics cannot be mixed together during the recycling process. Also, different types of plastics are immiscible at the molecular level, and there are significant differences in processing requirements at the macroscopic level with respect to the different plastic inputs.

Even a small amount of the wrong type of plastic can make it impractical to recycle an entire container or bale of reclaimed material. Co-mingled reclaimed material is worth significantly less than sorted material. Mixed or co-mingled plastics are frequently contaminated with such items as metals, paper, pigments, inks, adhesives, carbon fiber, flame retardants, fiber reinforced plastics, glass filled plastics, cured silicon and rubber.

A primary reason for the incompatibility of mixed reclaimed materials is the different melting points associated with different plastic resins and the inability of certain plastics to undergo a "re-melting" process. Plastics involved in recycling activities can be considered in two broad categories: thermoplastics and thermoset. Comparing these types, in the present art, thermoplastics are much easier to adapt to recycling.

Thermoplastic polymers can be heated and formed, then heated and formed again and again. The shape of the polymer molecules are generally linear or slightly branched. This means that the molecules can flow under pressure when heated above their melting point. Thermoset polymer plastics, on the other hand, undergo a chemical change when they are heated, creating a three-dimensional network. Thermosets cannot be re-melted or remolded and therefore have been traditionally difficult to recycle. Typical types of thermosetting plastics are Polyurethane (PU), epoxies, polyesters, silicones and phenolics, with vulcanized rubber being an excellent example of a thermosetting and also polyoxybenzylmethylenglycolanhydride (bakelite).

Materials made from two polymers mixed together are called blends. In general, polymers cannot be homogeneously mixed with one another, and even attempting to mix most polymers will result in phase-separated mixtures. An example of phase-separated mixtures or immiscible blends is polystyrene and polybutadiene, which are immiscible polymers. When you mix polystyrene with a small amount of polybutadiene, the two polymers will not blend together. Polystyrene is generally a stiff, brittle, material that will break or shatter if bent. Polybutadiene separates from the polystyrene into usually small, isolated, sphere-shaped items, and the polybutadiene spheres in the blend are elastic in nature and absorb energy under stress.

The polystyrene and polybutadiene immiscible blend bends and does not break like polystyrene by itself. The immiscible blends of polystyrene and polybutadiene are known as high-impact polystyrene, or HIPS. Another example of an immiscible blend is one made from Polyethylene Terephthalate (PET) and poly(vinyl alcohol) (PVA). The blend results in PET and PVA separating into individual sheetlike layers. This blend is particularly useful in the making of plastic bottles for carbonated liquids.

"Recycling and Recovery of Plastics," by Joop Lemmens recognizes a recent trend in the increased use of polymer mixtures, blended polymers and novel plastic combinations. An example of 'novel' plastic is cross-linked polyethylene (PEX). Crosslinking polyethylene changes the polymer from a thermoplastic to a thermoelastic polymer. Once it is fully crosslinked, polyethylene tends not to melt but merely to become more flexible at higher temperatures.

Examples of problems in recycling plastics include cases where a quantity of recycled PET is contaminated with a small amount of PVC. The PVC will release hydrochloric-acid gas before the process temperature to melt the PET is reached, and the released gas will degrade the PET. In the reverse, where a small amount of PET contaminates recycled PVC, the PET will remain in solid form after the PVC reaches its melting point, which results in crystalline PET inhabiting the post-melt-cooled PVC structure.

A major problem in the recycling of PVC is its high chlorine content of raw PVC, and the hazardous additives added to the polymer to achieve the desired material quality. PVC requires separation from other plastics and sorting before mechanical recycling. PVC recycling is difficult because of high separation and collection costs, loss of material quality after recycling, and the low market price of recycled PVC compared to virgin PVC.

There are thousands of different varieties of plastic resins or mixtures of resins, and most plastics have a code number or classification. Plastics not identified by code numbers are difficult to recycle. These items, such as computer keyboards, do not fit into the numbering system that identifies plastics used in consumer containers.

Bazant & Cedolin address concerns about the stability of structural composites, such as the composites made from recycled materials. Namely, Bazant & Cedolin states three-dimensional instabilities are important for solids with a high degree of incremental anisotropy, which can be either natural, as is the case for many fiber composites and laminates, or stress-induced, as is the case for highly damaged states of materials and the typical three-dimensional instabilities are the surface buckling and internal buckling, as well as bulging and strata folding.

Bazant & Cedolin state that three dimensional buckling modes no doubt play some role in the final phase of compression failures. For example, Bazant (1967) showed that a formula based on thick-wall buckling agrees with his measurements of the effects of the radius-to-wall thickness ratio on the compressive failure stress of fiber-glass laminate tubes. On the other hand, other physical mechanisms, particularly the propagation of fractures or damage bands, are no doubt more important for the theory of compression failure. The reason is two-fold: (1) the calculated critical states for the three-dimensional instabilities require some of the tangential moduli to be reduced to the same order of magnitude as some of the applied stress components, which can occur only in the final stage of the failure process; and (2) the body at this stage might no longer be adequately treated as a homogeneous continuum.

Bazant & Cedolin address orthotropic composites that have a very high stiffness in one direction and a small shear stiffness may suffer three-dimensional instabilities such as internal buckling or surface buckling. These instabilities, which involve buckling of stiff fibers (glass, carbon, metal) restrained by a relatively soft matrix (polymer), are analogous to the buckling of perfect columns. When the fibers are initially curved, one may expect behavior analogous to the buckling of imperfect columns. In particular, the initial curvature of fibers causes fiber buckling, which reduces the stiffness of the composite. It also gives rise to transverse tensions, which may promote delamination failure.

Urquhart & O'Rourke address three dimensional instabilities as whenever a material is subjected to compression in one direction, there will be an expansion in the direction perpendicular to the compression axis. When this expansion is resisted, lateral compressive stresses are developed, which tend to neutralize the effect of the longitudinal compressive stress, and thus increase resistance against failure. This is the principle involved in the use of spiral or hooped reinforcement.

Also, Urquhart & O'Rourke states that within the limit of elasticity the hooped reinforcement is much less effective than longitudinal reinforcement. Such reinforcement, however, raises the ultimate strength of the column, because the hooping delays ultimate failure, and the material continues to compress and to expand laterally, thus increasing the tension in the bands, while final failure occurs upon the excessive stretching or breaking of the hooping. As long as the bond between the fiber and the polymer is effective, the two materials will deform equally, and the intensities of the stresses will be proportional to their moduli of elasticity.

A structural system's failure mode can be defined as the characteristics bounded by that known as catastrophic or localized within the said system, wherein the term catastrophic indicates a system-wide structural failure involving progressive individual and sub-systemic structural element(s) failures and the term localized indicates a system or sub-system arrest of structural failure and/or redistribution of the force(s) which resulted in the initial failure-mode of the initial failed structural element.

One of the unexpected results of full-scale testing of the present invention's physical manifestations, is the damping effect of the present invention to structural shock, such as the characteristic of nailing or directly impacting physical samples of the present invention.

U.S. Pat. No. 6,497,956 (956) issued Dec. 24, 2002, to Phillips et al., teaches that high density polyethylene (HDPE) and plastic lumber made from HDPE, PVC, PP, or virgin resins has been characterized as having insufficient stiffness to allow its use in structural load-bearing applications. For example, it is noted that non-reinforced plastic lumber products typically have a flexural modulus of only one-tenth to one-fifth that of wood such as Douglas fir. This process uses a laminar flow of material that is extruded in a melt extrusion process. U.S. Pat. No. 5,212,223 discusses the inclusion of short glass fibers within reprocessed polyolefin and further teaches doing so to increase the stiffness of the non-reinforced plastic lumber by a factor of 3:4. However, none of the prior art known to applicant is capable of fabricating plastic lumber having the structural stiffness and strength of products made according to the present invention.

U.S. Pat. App. No. 20070045886, filed Mar. 1, 2007, by Johnson teaches that composite lumber is currently used for decking, railing systems and playground equipment. Sources indicate that there currently exists a $300 million per year market for composite lumber in the United States. It is estimated that 80% of the current market uses a form of wood plastic composite (WPC). It is estimated that the other 30% is solid plastic. A wood plastic composite (WPC) refers to any composite that contains wood particles mixed with a thermaloset or thermoplastic. The presence of wood fiber increases the internal strength and mechanical properties of the composite as compared to, e.g., wood flour. And, for example, the addition of wood fillers into plastic generally improves stiffness, reduces the coefficient of thermal expansion, reduces cost, helps to simulate the feel of real wood, produces a rough texture improving skid resistance, and allows WPC to be cut, shaped and fastened in a manner similar to wood.

Also, the addition of wood particles to plastic also results in some undesirable characteristics. For example, wood particles may rot and are susceptible to fungal attack, wood particles can absorb moisture, wood particles are on the surface of a WPC member can be destroyed by freeze and thaw cycling, wood particles are susceptible to absorbing environmental staining, e.g., from tree leaves, wood particles can create pockets if improperly distributed in a WPC material, which may result in a failure risk that cannot be detected by visual inspection, and wood particles create manufacturing difficulties in maintaining consistent colors because of the variety of wood species color absorption is not consistent. Plastics use UV stabilizers that fade over time. As a result, the wood particles on the surface tend to undergo environmental bleaching. Consequently, repairing a deck is difficult due to color variation after 6 months to a year of sun exposure.

In a typical extrusion composite design, increased load bearing capacity capability may be increased while minimizing weight by incorporating internal support structures with internal foam cores. Examples of such designs are taught in U.S. Pat. Nos. 4,795,666; 5,728,330; 5,972,475; 6,226,944; and 6,233,892.

Increased load bearing capacity, stability and strength of non-extruded composites has been accomplished by locating geometrically shaped core material in between structural layers. Examples of pre-formed geometrically shaped core materials include hexagon sheet material and lightweight woods and foam. Problems associated with typical pre-formed core materials include difficulties associated with incorporating the materials into the extrusion process due to the pre-formed shape of the materials.

Other efforts to increase strength with composite fiber design have focused on fiber orientation in the composite to obtain increased strength to flex ratios. In a typical extrusion composite process, the fiber/fillers are randomly placed throughout the resin/plastic. Therefore increasing strength by fiber orientation is not applicable to an extrusion process.

Foam core material has been used in composites for composite material stiffening (e.g., in the marine industry) since the late 1930's and 1940's and in the aerospace industry since the incorporation of fiber reinforced plastics. Recently, structural foam for core materials has greatly improved in strength and environmental stability. Structural core material strengths can be significantly improved by adding fibers. Polyurethane foams can be modified with chopped glass fibers to increase flexible yield strength from 8,900 psi-62,700 psi.

Prior art patents tend to describe foam core materials as rigid or having a high-density. However structural mechanical properties of the foam core tend not to be addressed. A common method to obtain a change in load capacity is to change the density of the material. For example, this can be done in a polyurethane in which water is being used as a blowing agent. The density of a polyurethane decreases with the increase in water concentration.

One problem that may occur when a core material and a structural material are not compatible both chemically and physically is delamination. Chemical and physical incompatibility can result in composite structures that suffer structural failures when the core material and the structural material separate from one another.

Coefficient of thermal expansion (CTE) is discussed in Johnson, as well as the conformable core material is injected into and around internal structural support members of an extruded member. Preferably, while the member is being extruded, the core material is injected to replace air voids within the member. The injection of conformable structural core material at the same time and same rate as the structural member is being extruded produces significant improvements by increasing load bearing capacity, stability and overall strength and by improving economic feasibility. For example, a rigid polyurethane foam is approximately 10 times less expensive per volume than PVC. Therefore, by replacing some interior volume of an extruded member with foam, the PVC volume is reduced while maintaining the same structural strength or greater. Therefore, the injection of a conformable foam results in a significant cost savings. In some applications, the injectable conformable structural core material may be applied to an extruded member that has been previously cured.

One benefit of an injectable conformable structural core material is that the core material is not limited by the structural design of the composite member because the core material conforms to the geometric shapes present in structure.

Although a core material and a structural material may be initially combined into a composite member without regard to the CTE's of each, this does not guarantee structural integrity over time. Therefore, the invention of the application involves tailoring of the conformable structural core material by the selection of optimal amounts of structural fillers to achieve a desired CTE of the materials. The step of tailoring the structural core material provides a solution for composite structural design regardless of the composition of the materials.

One aspect of the invention is directed towards the mechanical interaction and the relationship between a selected thermal plastic and a selected foam core material. Thermal plastics have mechanical properties that are influenced by environmental temperatures. For example, thermal plastics are stronger at colder temperatures but are more brittle. Thermal plastics are weaker in warmer weather, but are more flexible.

Foam for an internal core material inside a thermal plastic material may be tailored to overcome variations in structural strengths of thermal plastics. For example, an ideal core material is selected to possess thermal expansion properties that offset the thermal sag characteristics of thermal plastic structural material that the structural material experiences due to thermal heating in the environment. The thermal expansion of the core and mechanical stiffness of the composite may be tailored to achieve desired strength and internal pressure, resulting in mechanical stiffening of the composite.

The interaction of thermal sag of the thermal plastic material in relationship to the thermal expansion of the internal core material may be considered to select an ideal foam for use with a particular plastic. Ideally, the materials will function as a true composite. Because of the enormous uses of this invention associated with composite design and their applications with the overwhelming selection of materials and their combinations, the method described herein allows for optimal material pairings to be determined. As internal cross members of a structural member and the exterior structure undergo mechanical weakening as the temperature increases, a selected internal core material having an optimal thermal expansion with enhanced thermal mechanical properties will improve the rigidity and the mechanical strength of the combined composite in a manner similar to inflating an automobile tire to increase mechanical rigidity of the rubber.

A further advantage associated with the use of core materials such as foams are thermal insulation properties of the foam. A significant mechanical advantage is achieved by reducing the heat transfer rate from the surface of a structural member to an internal support structure of the composite, thereby thermally shielding the internal support structure from heat fluctuations and maintaining increased internal strengths of the cell structures in the composite during elevated temperatures.

CTE can be tailored in a composite matrix to improve surface functionality between the structural material and the core, thereby reducing the shear stresses that are created by thermal cycling at the contact interface of the two materials. Polyurethane foam densities are directly proportional to the blowing agent, typically water. The less water, the tighter the cell structure, which results in higher density foams.

In a closed cell structure, controlling internal forces caused by thermal cycling produced by the core material can be accomplished by tailoring the CTE. The CTE of a core material may be tailored by adjusting an amount of filler in the core material. For example, fillers such as chop fibers and micro spheres will have much lower CTE in the structural foam. The CTE of glass spheres is approximately 100 times smaller than most resin materials.

Glass spheres or ceramic spheres have enormous compression strength in comparison to the foam cells created by blowing agents. Therefore, the addition of micro spheres will not only provide the ability to tailor the CTE of the foam but it will replace low compression strength cell structures with higher strength cell structures.

The incorporation of chop fibers adds dramatic cross structural strength throughout the foam. Applicant's mechanical model analysis clearly illustrates an increased strength of materials resulting from the presence of core material regardless of the mechanical structure. The analysis was directed to extruded PVC. Some of the extruded PVC members were filled with chopped fibers and some were not. The chopped fibers increased strength of the structural member and decreased the CTE. The additives of selected fillers to the foam core materials illustrate similar characteristics. Selecting appropriate materials for a composite is complicated because composites are not homogeneous materials. However, composites are required to function as a homogeneous structure without structural deviation. The models clearly show how reinforcing fibers increases load bearing capabilities in the composite materials.

Manmade fibers and fillers can be used to improve mechanical properties as well as to lower CTE's of a core material. Ideally, filler materials should be environmentally stable and malleable into desired geometric configurations so that they may be incorporated into a structural design. Examples of fiber materials include fiberglass, carbon and nylon. These fibers can be cut to a specific length with a desired diameter that can be incorporated into an injection molding process either from the plastics manufacturer if the desired material is a foam plastic. If the resin is a reactive material such as polyurethane foam, the fillers and fibers can be combined either in the liquid stage prior to mixing the reactive components or in the foam mixing chamber prior to being extruded. The coefficient of thermal expansion is directly related to the volume fillers to plastics ratio.

Solid core materials can be made from high-density polyurethane, polyureas and epoxy materials etc., having high strength and fast cure times. These materials may be filled with fillers or micro spheres to produce high strength injectable core materials.

SUMMARY OF THE INVENTION

The present invention is generally directed to methods and systems for making thermoformed structural elements and composites, including the use of composites, dissimilar or variable processing materials. A comparison of test data shows the present invention possesses unexpected improved properties that the present art does not have.

Materials used originate from polymer waste streams of various origins, primarily engineer grade plastics recovered from electronic-waste and industrial scrap such as from automotive production. Materials also will include fibrous polymer waste recovered from 100% post consumer sourcing or other waste streams where standard methods of recovery have been to landfill, or waste to energy. The innovative recovery and reuse of these waste streams is a key component of our inventiveness and technology.

The present invention avoids the expense and the technical issues of the present art on how difficult it is to 'clean' said 'dirty' recycled materials so that they are acceptable to the extrusion process and or the injection mold process. The end products can have the same outward appearance as those products made by the more demanding, more expensive extrusion process and or injection process but the present invention's end products can be pre-engineered to have significantly, unexpectedly, improved physical and chemical properties. And, the end products have improved hardness characteristics for sub-zero and cold temperature tolerances.

The objects of the present invention is as follows:

(1) utilize the differential between certain materials' melt-point(s), said different material(s) thermal-mass, thermal-energy-densities, thermal-energy gradient(s) and structural integrity/stability in said material(s) in the individual near-melt-point range vis-a-vis pressure-heat ratio, consisting primarily of recycled thermoplastics, thermoset plastics, and non-plastic materials and directly reduced from grind-states to a laminate film and/or sheet and/or plate-state which is reinforced via fibers, having an average length greater than the composite's thickness, which are tensioned during the manufacture of said composite, (2) minimize costs and loss of time-value associated with separation of waste-stream plastics into thermoplastics, thermosets, and non-plastics, (3) eliminate the direct labor costs associated with extruding plastic material into sheet material, thereby readying said plastic sheet material for shearing and/or cutting such, before placement of cut plastic sheet material in a thermoform, (4) ease and encourage the use of post-consumer plastics in thermoform operations by eliminating the need to pelletize and/or sheet-extrude plastic material(s) before thermoforming, the significant costs, involved in 'separation' and/or 'cleaning' post-consumer plastic material, are eliminated, (5) utilize waste-stream plastics which the present art has difficulties in economically separating for recycling and using in finished products, and allow the use of such plastic mixes in the manufacture of finished products, (6) utilize the formation, via the thermoforming operation of structurally bridging internal structural differences, and provide the use of 'foaming' material(s), included with the above referenced thermoform able plastic material(s), which when said 'foaming' materials is/are triggered, provides heat, or additional heat, and provides pressure or additional pressure to the thermoform process, and (7) provide a well-distributed non-thermoform able material(s) throughout a thermoformed item, as well as providing well-distributed thermoform able material, of different melt-points throughout a thermoformed item.

DETAILED DESCRIPTION OF THE PREFERRED EMBODIMENTS

Figure 1:
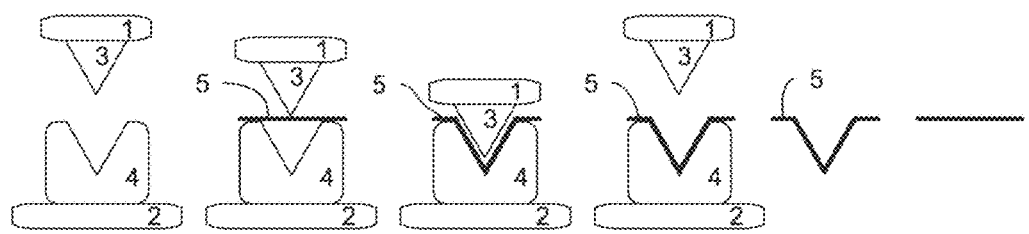
FIG. 1 illustrates the process of forming an embodiment of a thermoformed composite.

The invention utilizes the manufacturing process known as thermoforming. The thermoform process combines thermally charging a material, usually a material such as plastic sheet, to a pliable or plastic-state, and pressing, frequently via a vacuum, into a desired shape. The thermoformed item is usually then allowed to cool resulting in a hardening of the thermoformed material. Thermoforming is frequently the lowest-cost-manufacturing process, over other processes, due in part to usually lower tooling costs and greater factory flexibility.

Thermoform methods and systems are usually subdivided, denoted, as "thin-gauge" and "thick-gauge." By industry standard, thin-gauge methods and systems usually mean a finished product that is 1.5 mm (0.059 in.) or less in thickness. Thick-gauge methods and systems usually mean a finished product which is 3 mm (0.12 in.) or greater in thickness.

The present invention is applicable regardless of the final thermoformed product's thickness. For clarity, the following will address the typically encountered 'thick-gauge' methods and systems, it being understood that the invention is not limited by the thickness of the end product.

The present invention utilizes the difference in melt temperatures of materials commonly encountered in thermoform operations. For example, the melt point for nylon, depending on specific configuration, is above 420 degrees F., while amorphous ABS has an effective melt point above 220 degrees F. Such differentials in melt point vis-a-vis the thermoform process allows for a blending of two or more materials which once through a thermoform can result in specific structural-composites.

The present invention utilizes the differences in energy per unit mass (specific energy or thermal-energy-density) of the materials during the construction of the present invention's structural-composites physical manifestations. For example, physically mixing two materials with different thermal-energy-densities results in an entity in which heat transfer occurs between the two materials when thermal energy is externally applied to said mixture.

The present invention utilizes the differences in the thermal-energy gradient (rate of temperature change with distance) of the materials during the construction of the present invention's structural-composites physical manifestations. For example, physically mixing two materials with different thermal-energy gradients results in an entity in which the heat transfer rate occurs between the two materials when thermal energy is externally applied to said mixture.

An example of a commercial application of two materials, with different melt points, which may be configured into a structural-composite is where nylon fiber and a plate of ABS plastic is thermoformed at a temperature above the melt point of the ABS plastic but below the melt point of the nylon. The standard thermoform combination of heat and pressure will cause the ABS plastic to flow into and surround the nylon-fiber(s).

The character of the physical interface between the nylon weave and the ABS plastic is deterministic via the character of the nylon-fiber and geometry before, during and after the thermoform process. The structural aspects of the referred to above nylon/ABS structural-composite is deterministic based on the significantly different mechanical properties of the chosen nylon-type, size-length-diameter of individual nylon fiber(s), fiber configuration(s) and chosen ABS plastic-type.

Substitution of the referred above ABS plastic 'plate' with ABS plastic pre-extrusion 'grind' and reconfiguration of the above referred flexible nylon-fiber(s) explicitly describes one of the intents of the present invention.

Use of a material, in a configuration, such as, but not limited to, ABS plastic pre-extrusion 'grind', allows the inclusion of, and mix with, the 'grind' material(s) which may or may not be normally thermoform-able. Examples of material(s) which might be 'included' and or 'mixed', before thermoforming, with a thermoform-able 'grind', are ceramic(s), metal(s), organic(s) and the like.

Use of a 'foaming' material 'mixed' with the above referred thermoform-able 'grind' allows the deterministic nature of a 'foaming' material to provide and or enhance the 'pressure' aspect of commonly encountered thermoform operations. Examples of, but not limited to, 'foaming' materials are polystyrene and or polyurethane. Such 'foaming' material(s) may be 'triggered' to 'foam' before, during, or after the thermoforming of the desired structural-composite. In the use of foaming materials, such as foaming polyurethane and polystyrene, the activation of the foaming action can be designed to occur before, during, and or after thermoforming the intended structural composite. Activation of the foaming action after the construction of the structural composite allows intended results such as internal pressurizing of said structural composite.

As a general statement, a thermoform-able 'grind' has a lower density than said 'grind' material post-thermoform. That is, the heat/pressure of the thermoform operation densifies the 'grind'. The process of 'squeezing' or distorting via the thermoform operation, results in an increase in the surface-area-to-volume (S/V) ratio.

Thermoform-able materials may be categorized as 'virgin' (meaning materials which do not have a history) 'post-industrial' (meaning materials which were involved in a manufacturing process but were not consumed) and 'post-consumer' (meaning materials which were completely used in the manufacture of an item which was sold or consumed by another entity).

A specific to the present invention is the recycling of post-consumer items consisting of relatively high percentages of thermoform-able materials. Post-consumer recycle of solid waste has been costly in execution. Recycling post-consumer plastic solid waste has been particularly difficult to achieve. There are a number of reasons for this inability in the present art, it lacks economic methods to physically separate plastics of similar specific-gravities but with different physical and or chemical properties. Another reason is that post-consumer plastic solid waste is frequently embedded with non-plastic materials which are frequently uneconomic to be detectable.

The present invention relates to predetermined dimensional structural composites and similar load carrying structural elements. Such load carrying structural element design, advancing the present art, address the following engineering characteristics: (a) components that do not rust, corrode, or decompose when exposed to fresh water and/or sea water and/or sewage and/or water-borne creatures, plants, insects or other such, (b) components that do not require special handling equipment on the installation job-site, or factory floor, (c) components that are easy to transport to installation job-site, or factory floor, (d) components that allow for ease of handling and rigging, in installation and or assembly applications, with other structural element sections, (e) components that do not require new expensive installation equipment, (f) components that allow for quick field jointing or assembly with other structural element sections, (g) structural element sections which are certified and in use by state agencies and approved for use by Federal and State Agencies, (h) components that allow the use of existing engineering design codes, addresses pertinent engineering design consensus standards and specifications, and (i) composites' elements that are geometrically similar in cross-section to that which they are intended to be structural substitutes.

The present invention's economic vitality centers on three aspects. First, full-scale testing of examples of the present invention's physical expressions show that said examples provide factors-of-magnitudes higher unit strengths than common grades of un-reinforced recycled plastic with similar stiffness or load to deflection ratios. As such, modest engineering design efforts will result in significant reductions in the present invention's materials-costs while providing the customer with equivalent product utility.

Second, the present invention's physical manifestations, if engineered to common un-reinforced recycled plastic engineering characteristics, is of significantly lower mass (or weight) resulting in lower transportation costs. And, third, the present invention's significantly lower mass (or weight) results in easier assembly or installation labor costs either in a factory environment and or construction site.

Similar structural aspects are in play involving hardware fastener applications such as screws, bolts and nails except that shear is usually an initial structural failure mechanism, where said failure is in the recycled plastic and not the fastener, followed immediately with bending moment carried by the recycled plastic element located between the point of initial shear failure, usually located at or near the shank of the fastener some distance from the surface of the recycled plastic element. Such structural failure mode behavior provides some mitigation from catastrophic structural failure when a given fastener/lumber-element connection is loaded beyond its capacity.

The present invention's preferred embodiment is a thermoformed structural-composite construct utilizing the differential between certain materials' melt-point(s), said different material(s) thermal-mass, thermal-energy-densities, thermal-energy gradient(s) and structural integrity/stability in said material(s) in the individual near-melt-point range vis-a-vis pressure-heat ratio, consisting primarily of recycled thermoplastics, thermoset plastics, and non-plastic materials.

The present invention's physical manifestations may be addressed as thermoformed structural-composites constructed utilizing the differential between certain materials' melt-point(s), said different material(s) thermal-mass, thermal-energy-densities, thermal-energy gradient(s) and structural integrity I stability in said material(s) in the individual near-melt-point range vis-a-vis pressure-heat ratio, consisting primarily of recycled thermoplastics, thermoset plastics, and non-plastic materials and directly reduced from grind-states to a laminate film and or sheet and or plate-state.

An alternative preferred embodiment is as described above with said thermoformed structural-composites constructed utilizing the differential between certain materials' melt-point(s), said different material(s) thermal-mass, thermal-energy-densities, thermal-energy gradient(s) and structural integrity/stability in said material(s) in the individual near-melt-point range vis-a-vis pressure-heat ratio, consisting primarily of recycled thermoplastics, thermoset plastics, and non-plastic materials and directly reduced from grind-states to a laminate film and or sheet and or plate-state which is reinforced via fibers, having an average length greater than the composite's thickness, which are tensioned before or during the manufacture of said composite.

An alternative preferred embodiment utilizes the differential between certain materials' melt-point(s), said different material(s) thermal-mass, thermal-energy-density, thermal-energy gradient(s) and structural integrity I stability in said material(s) in the individual near-melt-point range vis-a-vis pressure-heat ratio. That is, if a first material A has a melt-point of X, and if a second material B has a melt-point of X+1, and a third material has a melt-point of X+2, for a given 'pressure', then, by thermal-energy-management alone, the resultant thermoformed product is deterministic.

If said materials A's, B's & C's thermal-gradient's nature are known, for a given 'pressure', then by thermal-energy-management alone, the length of time required to thermoform the resultant product is deterministic. Design of such a deterministic product may begin with material C placed in the thermoform press, followed by material B placed on top of material A, followed in turn with the placement of material A on top of material B. For a given 'pressure', with the addition of thermal-energy, A will reach its melt-point before B & C. If not constrained, material A will 'flow' past material B and co-mingle with material C. The addition of more thermal-energy will then cause material B to reach its melt-point and, if not constrained, will co-mingle with the mixture of A & C.

Specific to this alternative preferred embodiment and demonstrated viable by one of the present invention's co-inventors, if material C is recycled nylon-fiber thread, and material B is recycled post-consumer electronic-waste Acrylonitrile butadiene styrene (ABS) plastic and material A is white (translucent) High Impact Polystyrene (HIPS) then the resultant product is as referenced above. That is, a structural composite consisting of unmelted nylon-fiber thread encased in ABS plastic which in turn is encased in white (translucent) HIPS.

A further refinement specific to this alternative preferred embodiment, utilizes pre-heating the nylon-fiber providing a thermal-mass lower than the nylon-fiber's melt-point but higher than the ABS melt-point. This configuration allows the on-set of ABS melt while the ABS insulates the HIPS material. Addition of thermal-energy and pressure causes the ABS to flow and encase the nylon before the HIPS melt-point is reached.

Specific to that configuration referenced above, the resultant product has nylon-fiber density concentrated on the structural-composite element's side opposite to the element's concentration of HIPS on the other side. As such in an application wherein the structural-composite element is subject to a bending-moment, such as but not limited to, shelving, with the HIPS surface up and the nylon-fiber concentrated surface down, the tensile strength of the nylon-fiber will allow for a thinner panel than otherwise.

Further, it has been observed that due to the migration of the plastic flowing into and throughout the nylon-fiber, due in part to the pressure aspects of the thermoforming process, said nylon-fiber(s) are straightened and stretched out. Said tensioning of said nylon-fiber(s) becomes 'locked' if the plastic is allowed to fully solidify before said pressure is released. The said pre-tension-ing of the nylon-fiber and the resultant pre-compressing of the plastic allows for higher than otherwise tensile loads on the plastic items of the present invention's structural-composite.

Specific to that configuration referenced above in this alternative preferred embodiment, utilizing the process of pre-heating the nylon-fiber providing a thermal-mass lower than the nylon-fiber's melt-point but higher than the ABS melt-point, in conjunction with or alternatively as a separate function, the HIPS material may be pre-chilled so as to delay the on-set of the HIPS thermal-gain and it reaching its melt-point.

It being noted that other materials and other materials' geometry apply to the above. For example, the referenced nylon-fiber may be substituted with fiberglass and or carbon-fiber and or like materials. Such substitutions, in addition to the originally mentioned nylon, may be used in different geometrical configurations, such as but not limited to screens, grating, or other micro-structural shapes.

Yet another alternative preferred embodiment utilizes the differential between certain materials' melt-point(s) and the requirement of well designed structural-composites for shear transfer between opposing extreme fibers such that, if tensile-tear is optimal, shear strength, for a given composite is greater than compressive strength which in turn is greater than the composite's tensile strength. It being a given that most recycled plastic composites structurally fail catastrophically in compression and most strata or laminates catastrophically fail in either compression or shear or both.

This alternative preferred embodiment utilizes melt-point differentials. Specific examples for the referenced embodiment may include polyethylene terephthalate (PET), Nylon-fiber & acrylonitrile butadiene styrene (ABS). Under atmospheric pressure, PET melts at +/−480 degrees F., while Nylon-fiber melts at +/−500 degrees F. and ABS melts at +/−220 degrees F. It should be kept in mind that thermoforming pressures, usually, significantly, reduce melt-points and the use of recycled materials usually have some 'contaminates' which will move individual melt-points.

To achieve the desired structural-composite characteristics of a failure-mode based on tensile-tear, rather than catastrophic compressive or shear failure, a determination is made to the quantity of nylon-fiber at the extreme-fiber and the distance to the neutral axis, in the case of bending moment. The distance from the extreme-fiber to the neutral axis determines the thickness of the composite's core material which in this example consists of the high melt-point recycled PET. To provide the significant shear transfer, between extreme-fibers, required the referenced PET material is presented to the thermoforming process with passages which will allow migration, during the thermoforming process, of the nylon-fibers which will sandwich the PET materials. Said migration of the nylon-fibers will be encouraged by the melt of ABS material which will sandwich the nylon-fibers and the PET core materials.

Ingress of the nylon-fibers, through the referenced PET material core's passages, put said migrated nylon-fibers in shear with the application of a bending-moment on this embodiment of the present invention. It can be seen that to achieve this embodiment the operating temperature and pressure of the thermoform process need only be such as to melt and cause flow of the lower melt-point ABS material.

There are seven different identified types of plastic usually involved in recycling activities plus a number of other types of plastics and materials frequently encountered in co-mingled waste-streams. Some of these, but not limited to, materials addressed in the present invention are: (1) Polyethylene Terephthalate (PET)—typical melt-point range +/−490 F to 510 F (255 C to 265 C) PET density is greater than water. Recycled PET is frequently used in such items such as textiles, carpets, fiber fillings for apparel, audio cassettes, soft drink bottles, water bottles, plastic jars, and some plastic wrappings, (2) High-Density Polyethylene (HDPE)—typical melt-point range +/−250 F to 275 F (120 C to 137 C). HDPE is frequently used in plastic milk cartons, juice and liquid detergent containers. Recycled HDPE is used in such items as plastic pipes, agricultural and plant containers, trash cans and buckets, (3) Vinyl/Polyvinyl Chloride (PVC)—typical melt-point range +/−212 F to 500 F (100 C to 260 C). PVC is frequently used in piping, liquid detergent containers, food wrappings and blister packaging. (4) Low-Density Polyethylene (LDPE)—typical melt-point range +/−257 F to 278 F (125 C to 137 C). LDPE is frequently used in plastic bags and garment bags. Recycled LDPE is frequently used in plastic trash bags, plastic tubing and plastic lumber. (5) Polypropylene (PP)—typical melt-point range +/−320 F to 330 F (160 C to 165 C). PP is frequently used in the automotive industry, also for bottle tops, battery casings and carpets. (6) Polystyrene (PS)—typical melt-point range +/−365 F to 500 F (180 C to 260 C). PS is frequently used in meat packing, protective packing and packing foam. (7) OTHER: Usually layered or mixed plastic. Common examples are headlight lenses and safety glasses; No recycling potential-must be landfilled. (8) polyvinyl alcohol (PVA)—typical melt-point range +/−356 F to 374 F (180 C to 190 C). (9) Acrylonitrile butadiene styrene (ABS)—typical melt-point range +/−218 F to 260 F (103 C to 128 C). (10) High impact polystyrene (HIPS)—typical melt-point range +/−392 F to 500 F (200 C to 260 C). (11) polylactide (PLA)-typical melt-point range +/−302 F to 320 F (150 C to 160 C). (12) Nylon—typical melt-point range +/−428 F to 510 F (220 C to 265 C). (13) Polycarbonate (PC)—typical melt-point range +/−510 F (+/−265 C). (14) Acrylic—typical melt-point range +/−572 F to 600 F (+/−300 to 315 C). (15) Fiberglass—typical melt-point range +/−2075 F (+/−1121 C).

Mechanical grinding is used to process raw materials, such as when recycled plastics are fed into mechanical grinders where they're ground into flakes. Most post-consumer plastics, in addition to being of, as referenced above, a mixed plastic nature, collected for recycling have traditionally nonrecyclable materials attached such as paper, metal parts or glass. The product of such an operation is known in the industry as "dirty" regrind.

Traditionally, this material would have to be "cleaned" in order to be recycled. The above referenced 'cleaning' operation usually first uses air to remove materials lighter than plastic, such as paper labels. The grit is then passed through scrubbers to materials such as oils, glue residues and inorganic dust. The plastic grit is then run through a "float/sink" tank(s) where heavier plastics heavier than water sink and lighter plastics float.

The recovered plastic is usually re-melted and converted into pellet form before being used in traditional injection-molding, blow-molding or extrusion-molding.

FIG. 1 illustrates the process of forming an embodiment of a thermoformed composite. Upper plate 1 and lower plate 2 hold a matched die set having a male segment 3 and a female segment 4. Addressing FIG. 1, from left to right, the left-most plates 1 and 2 hold the matched die set 3 and 4. A thermoform-able material 5, which in the present art is frequently pre-heated, is placed between die set 3 and 4. Through heat and pressure, thermoform-able material 5 is converted into the desired end-shape.

The desired shape may be flat, V-shaped, rounded, or any other bent or molded shape. Different die sets are used to achieve the different desired shapes. For example, the size of the imprinted shape are form raised letters or even small Braile dots (that represent letters for blind feel readers). Highly precise edges for lettering and dots formed on raised projections can be formed using the present invention. Also, flat molding plates can be used to make flat services, suitable for making panels or signage (which can be painted, polished or left in a matte or high sheen finish). (See far right figures in FIGS. 1-7). The thermoform-able material 5 is removed from the die set once it has completely cooled. It should be noted that the term "thermoform-able" is used here as reference to specific material(s) melt-point for a given thermal-mass plus pressure.

Figure 2:
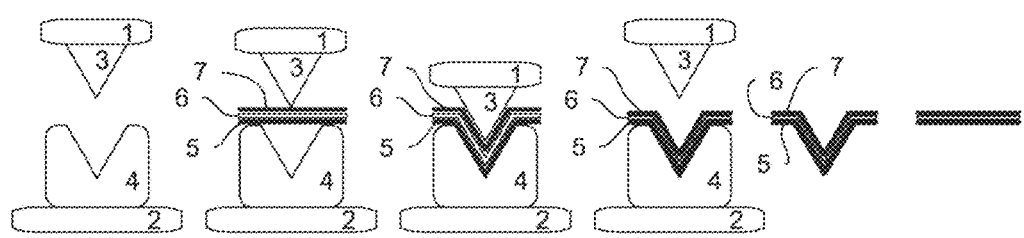
FIG. 2 illustrates the process of forming an embodiment of a thermoformed composite.

FIG. 2 illustrates the process of forming an embodiment of a thermoformed composite. The process of FIG. 2 is similar to the process of FIG. 1. Plates 1 and 2 hold the matched die set 3 and 4. Unlike FIG. 1, that demonstrates a single thermoform-able material 5, FIG. 2 shows three distinct materials 5, 6 and 7. Through the thermoforming process of heat and pressure, materials 5, 6 and 7 are structurally laminated into a finished desired product.

This thermoforming process is sometimes known as the 'strata-process'. As the term 'strata-process' implies the 'laminated' together materials retain their individual structural integrities. That is, for example as shown in FIG. 2, the thermoforming process of materials 5, 6 and 7 provides the intended results of two distinct shear-planes. Said two distinct shear-planes being that structural interface between materials 5 and 6 and materials 6 and 7.

Figure 3:
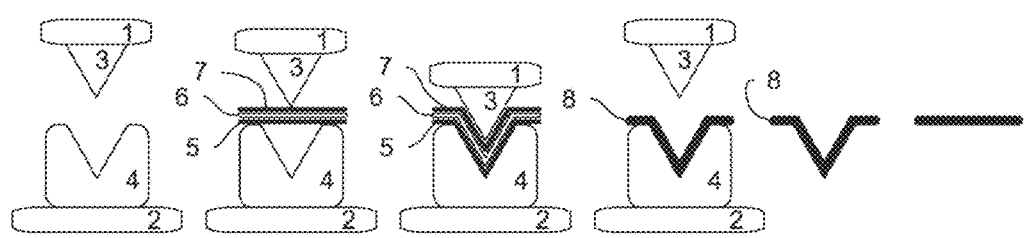
FIG. 3 illustrates the process of forming an embodiment of a thermoformed composite.

FIG. 3 illustrates the process of forming an embodiment of a thermoformed composite. The process of FIG. 3 is similar to the process of FIG. 1. Addressing FIG. 3, from left to right, the left-most plates 1 and 2 hold the matched die set 3 and 4. Similar to FIG. 2, FIG. 3 shows three distinct materials 5, 6, and 7 which through the thermoforming process of heat and pressure are structurally melded into a single finished desired structural composite 8. Composite 8 is a product without defined distinct shear-planes.

An example of this process is the pre-thermoforming sandwiching of a fiber material such as nylon fiber and or fiberglass strand and or carbon-fiber material 6 having a melt-point higher than the material(s) 5 and 7. The invention's thermoforming operation elevates the thermal-mass of material(s) 5 and 7 to or above the melt-point of material(s) 5 and 7 but does not approach the melt-point of the fiber material 6. Through the invention's thermoforming process, materials 5, 6 and 7 merge together to form a single structural entity 8 without distinct shear-planes.

Figure 4:
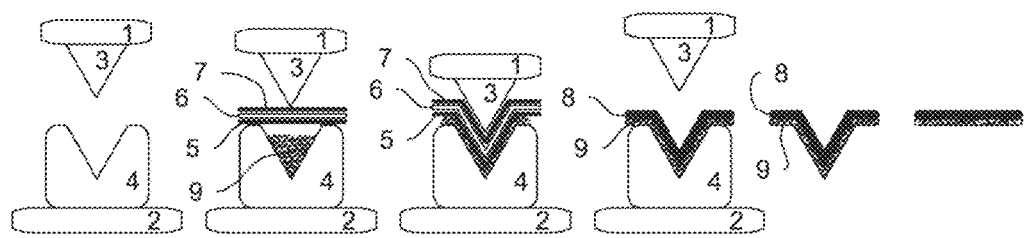
FIG. 4 illustrates the process of forming an embodiment of a thermoformed composite.

FIG. 4 illustrates the process of forming an embodiment of a thermoformed composite. The process of FIG. 4 is similar to the process of FIG. 1. FIG. 4 is similar to FIG. 3 but with the addition of material 9. Plates 1 and 2 hold the matched die set 3 and 4. As in FIG. 3, FIG. 4 shows three distinct materials 5, 6 and 7 which through the thermoforming process of heat and pressure are structurally melded into a single finished desired structural composite 8. Composite 8 is a product without defined distinct shear-planes.

FIG. 4 also shows referenced material 9. The present invention allows the use of material which has not been pre-formed into sheets and or plates. The present invention allows the formation of a combination of a single structural composite 8 with a strata material 9 having a distinct shear-plane.

Figure 5:
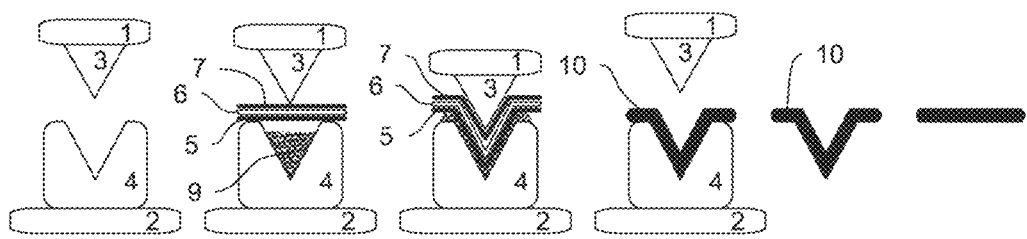
FIG. 5 illustrates the process of forming an embodiment of a thermoformed composite.

FIG. 5 illustrates the process of forming an embodiment of a thermoformed composite. The process of FIG. 5 is similar to the process of FIG. 1. FIG. 5 is similar to FIG. 4 except that material 9 is of a different nature. Materials 5, 6, and 7 and material 9 are thermoformed such that the present invention's thermoforming operations melds with materials 5 6 and 7 and material 9 to form a single structural entity 10 without distinct shear-planes.

Figure 6:
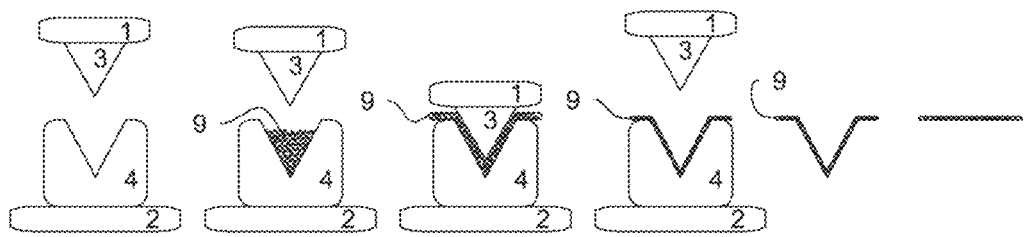
FIG. 6 illustrates the process of forming an embodiment of a thermoformed composite.

FIG. 6 illustrates the process of forming an embodiment of a thermoformed composite. The process of FIG. 6 is similar to the process of FIG. 1. FIG. 6 is similar to FIG. 5 but without any pre-formed sheet materials 5, 6 and 7 as depicted in other previous FIGURES. Material 9 is thermoform-able material(s) or thermoform-able materials(s) and non-thermoform-able material(s) mixture. The present invention's direct reduction of material 9 to a single structural entity without distinct shear-planes, reduces direct materials costs.

Examples include thermoform-able recycled post-consumer electronic-waste ABS plastic grind and or recycled nylon fiber, recycled polypropene and/or the like. Mixtures of thermoform-able and non-thermoform-able grind may include non-thermoform-able materials such as titanium dioxide, ceramic dust, metal filings, marble dust, shale flake and/or the like. It should be noted that the terms "thermoform-able" and "non-thermoform-able" are used here as reference to a specific material's melt-point for a given thermal-mass plus pressure. As such, for example, a mixture of ABS grind with nylon fibers and a thermoform operating effective temperature higher than the melt-point for a chosen ABS but lower than the melt-point for a chosen nylon would by definition have the nylon to be considered "non-thermoform-able" material(s) for the example's mixture.

Figure 7:
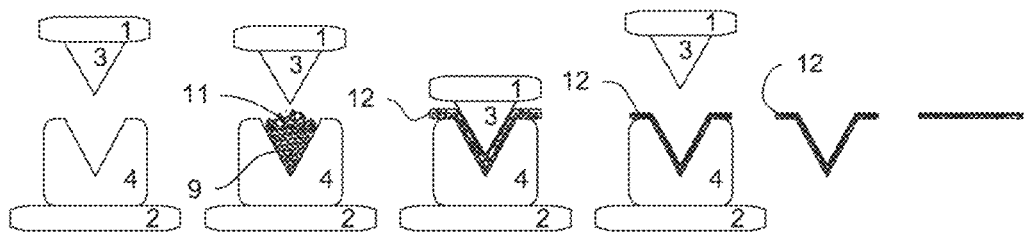
FIG. 7 illustrates the process of forming an embodiment of a thermoformed composite.

FIG. 7 illustrates the process of forming an embodiment of a thermoformed composite. The process of FIG. 7 is similar to the process of FIG. 1. FIG. 7 is similar to FIG. 6 but with structural/micro-structural elements 11 included with the afore-referenced recycled grind material(s) 9. Said structural elements 11 may include recycled fiberglass air filter structures, recycled spent industrial filter structures, recycled plastic extrusion, metallic and metallic/plastic screens, and or scraps of such and similar screening and such for the purpose of forming a single structural entity without distinct shear-planes.

Figure 8:
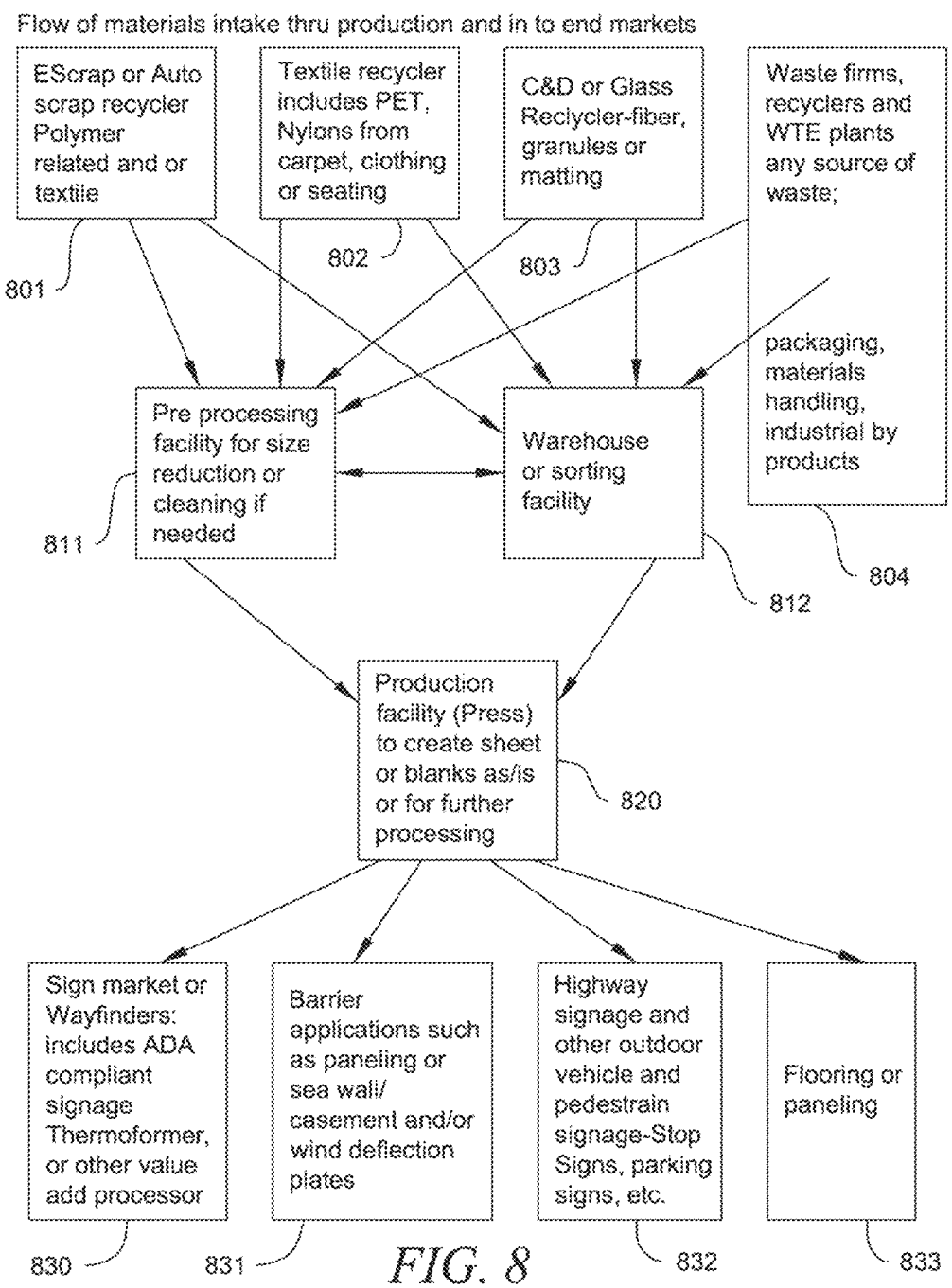
FIG. 8 is a flowchart illustrating the production process.

Now referring to FIG. 8, a flowchart illustrates the production process. Various sources are gathered into a pre-processing facility 811 or a warehouse or sorting facility 812. Pre-processing facility 811 may be used for size reduction or cleaning if needed. Some of the various material sources may be: (801) EScrap or Auto scrap recycler Polymer related and or textile; (802) Textile recycler that includes PET, Nylons from carpet, clothing or seating; (803) C&D or Glass Recycler-fiber, granules or matting; (804) Waste firms, recyclers and WTE plants, any source of waste, packaging, materials handling, or industrial by-products.

The material is retrieved from the pre-processing facility 811 or warehouse facility 812 and brought to a production facility 820. The production facility 820 uses presses to create sheets or blanks. Further processing such as thermoforming, cutting, painting, silk screening or laser etching may also be performed.

After production, the new sheets or blanks are sent out of the production facility 820 to be used for various products. Some of these products consist: (830) Sign market or Wayfinders, which includes ADA compliant signage, Thermoformer, or other value add processors; (831) barrier applications such as paneling or sea wall/casement; (832) highway signage and other outdoor vehicle and pedestrian signage (e.g. stop signs, parking signs, etc.); (833) flooring and panels for interior applications.

Many sources may be used for the material. Primary sourcing are certified EScrap recovery facilities such as MBA Polymers, GEEP, MEXTEK, CEAR, SIMS and others. By sourcing polymers generated from these EScrap recovery locations, a new end usage is being created for this problematic scrap. In addition, other non polymer material, especially glass from CRT monitors, are hoped to be included as part of the composite recipe, once deemed safe. If safety cannot be assured, the other glass sourcing mentioned, will suffice.

These recovery processes are mandated and policy driven under producer responsibility policies or as part of landfill diversion requirements around the world. The shortage of many materials in the EScrap stream drive the overall recovery efforts. In so doing, the larger volume materials are ignored. This is comparable to the illegal poaching of rare species such as Rhinos in order to get the horn, but leave the carcass of the rest of the animal to waste. We help provide and support the legitimate recovery of materials domestically and around the globe.

Similar materials are also able to be recovered from auto scrap, packaging and consumer goods. Other material sourcing as part of the composite recipe include glass fibers recovered from building insulation or made from recovered glass from packaging, old insulation, CRT glass, or other post consumer glass fiber sourcing.

Such programs are often part of a closed loop process by the OEM'S of the glass products or from waste firms as part of their waste contracts. Examples would be Owens Corning, Waste Management, Johns Manville, and CertainTeed who need recovery of these materials to meet internal corporate pledges (CSR) or as part of a requirement in order to sell new materials. The composite disclosed herein is a value added alternative to landfill and improper disposal.

The other component materials are recovered from post consumer textile waste; specifically flooring waste and or carpet. The key materials recovered from this sourcing channel are nylon (polyamide) waste, PP (polypropylene) waste or PET waste. The fibrous components of these materials lend themselves to helping create a matrix type structure during the melting and forming of the composites.

In addition, these materials can also be pre melted to form a base material or pelletlflake/chip, that can be used in the composite structure as well. Other flooring components such as PVC will play a role in composites where the end market will allow PVC content or prefers it. PVC has an inherently flame retardant quality that lends itself to certain applications other materials do not provide. Since, it is also available as a post consumer material in large supply, we see it as an interchangeable option as needed.

In referring to the EScrap supply earlier, we also have incorporated PVC wire strippings from EScrap recovery facilities or auto scrap/metal scrap plants. This is another highly problematic scrap where our composite helps to provide an effective alternative solution to landfill, burning or illegal disposal.

These post consumer waste materials are all then shipped to a central location in various forms: bales of fiber, chips or pellets primarily. They can also be entire parts that we can process ourselves if need be. After these materials arrive at the centralized location, various blending methods. This can range from hand blending in a bucket to large batch blending in industrial blending equipment to meet volume needs.

The blending of these large distinctive and problematic waste streams have not been done before and offer a unique set of properties and performance that add value and offer a value added non landfill or non incineration option heretofore not previously performed. Further refining and blending is accomplished at the hydraulic press or mechanical press. It is at that point, that layering of the materials and or the dispersion of materials in a mold of various shapes can be performed. These layers allow for the melt differentials or similarities to complement each other in a unique and performance enhancing fashion.

A similar example might be the way concrete is laid down using rebar and or fiber additives. Certain systems for charting carbon fiber composites use a sheet process built layer upon layer under heat. The composite disclosed herein uses unique combinations of waste materials that each contribute to adding strength, flame retardancy, impact or temperature tolerance improvement and improved weatherability in order to create a finished sheet products to be used in various end applications as is, or to be submitted for further processing such as thermoforming, cutting, painting, silk screening or laser etching.

Figure 9:
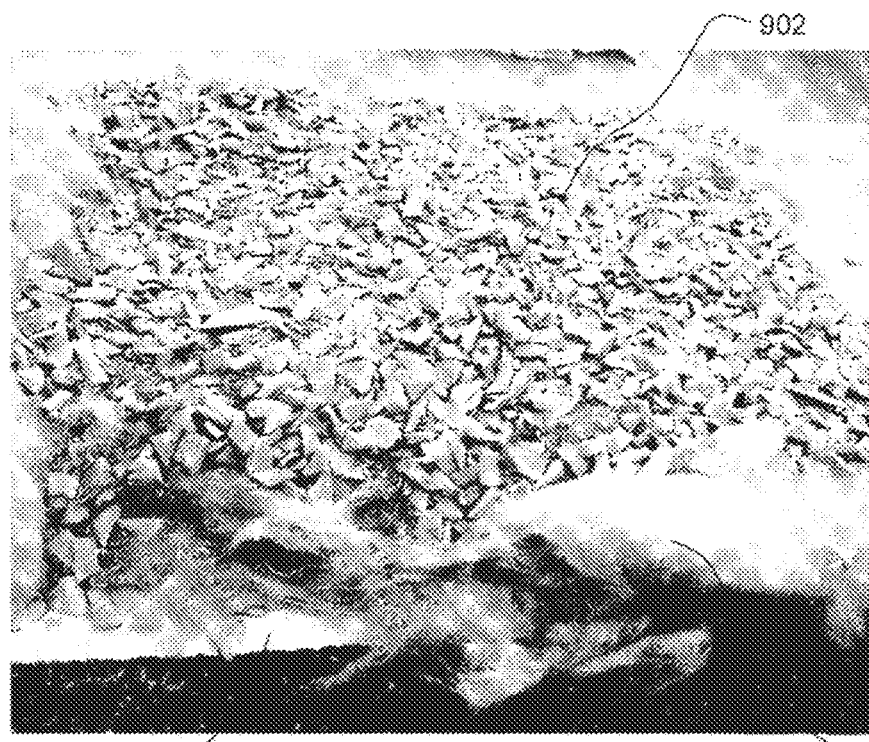
FIG. 9 illustrates an embodiment of various materials combined prior to production.

FIG. 9 illustrates various materials combined prior to production. Layered above a material sheet 900, are a fiberglass layer 901 and foam or wood layer 902. Other materials may also be used in place of the layers. Sheets of different materials may also be used as long as they provide a solid outer layer that helps the layered materials retain a sturdy shape while pressed during production.

Figure 10:
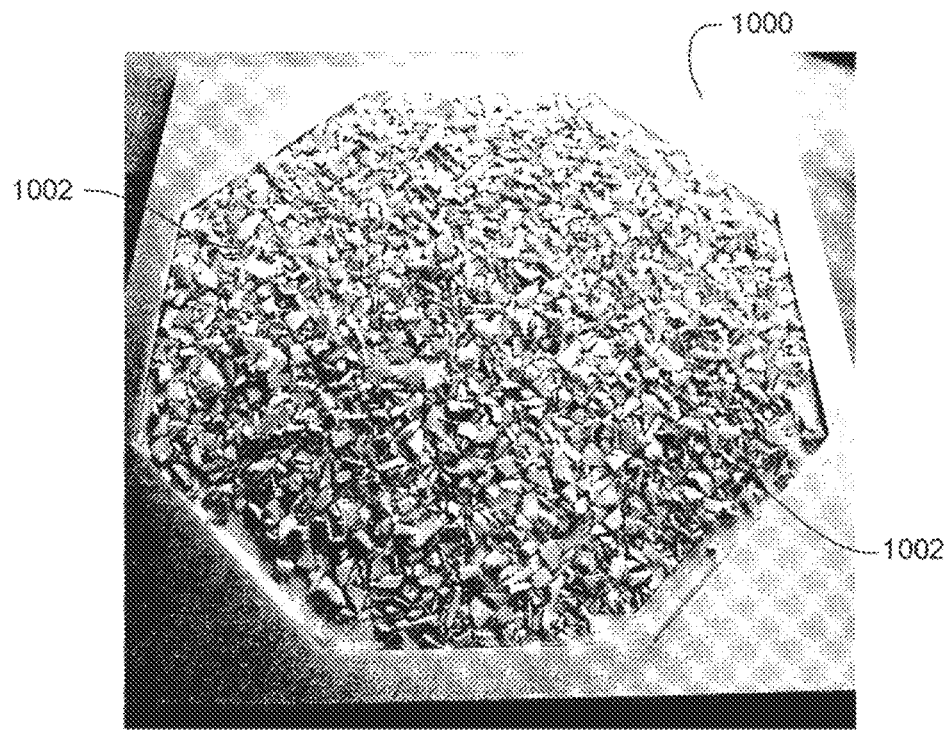
FIG. 10 illustrates an embodiment of various materials combined prior to production.

FIG. 10 illustrates various materials combined prior to production. Layered above a material sheet 1000, are a fiberglass layer 1001 and foam or wood layer 1002. The layered materials 1001 and 1002 may be arranged in a pre-determined shape. The shape depicted in FIG. 10 is an octagon shape (e.g. stop sign). Other materials may also be used in place of the layers. Sheets of different materials may also be used as long as they provide a solid outer layer that helps the layered materials retain a sturdy shape while pressed during production.

Figure 11:
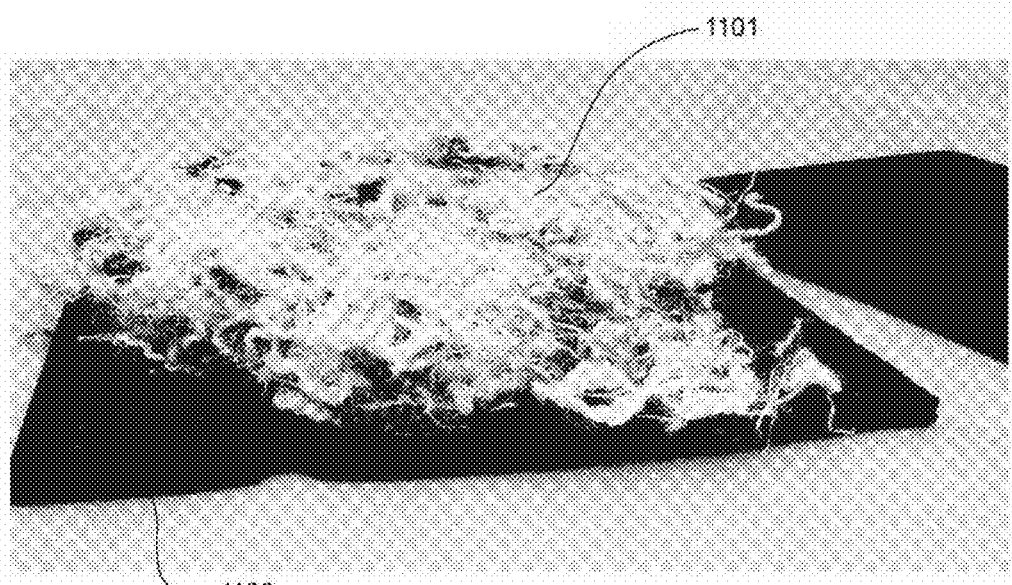
FIG. 11 illustrates an embodiment of various materials combined prior to production

FIG. 11 illustrates various materials combined prior to production. Layered above a material sheet 1100, are various forms of string, yarn and thread 1101. Other materials may also be used in place of the layers. Sheets of different materials may also be used as long as they provide a solid outer layer that helps the layered materials retain a sturdy shape while pressed during production.

Figure 12:
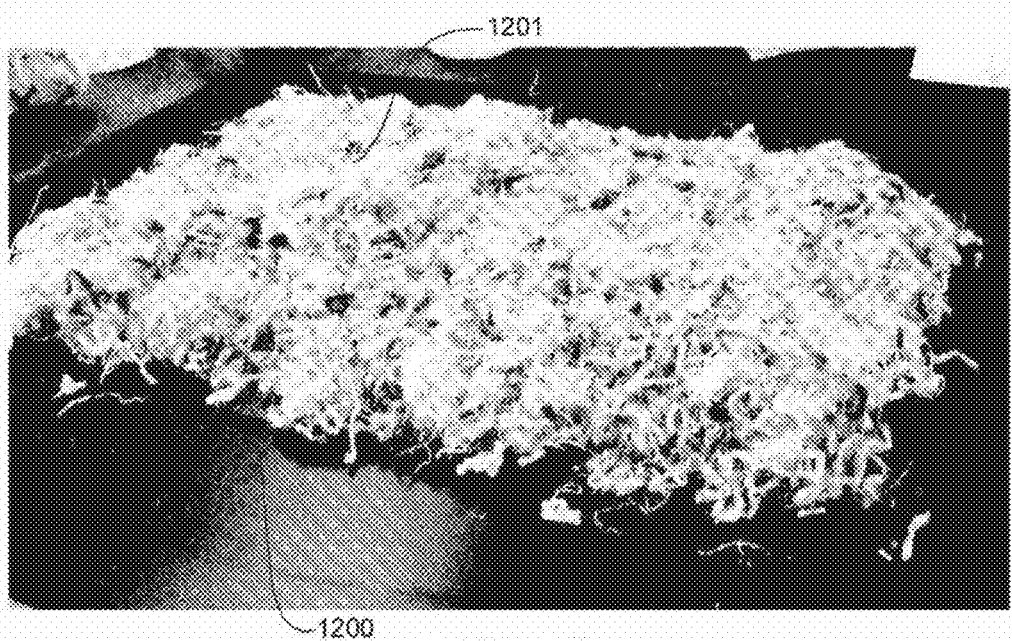
FIG. 12 illustrates an embodiment of various materials combined prior to production.

FIG. 12 illustrates various materials combined prior to production. Layered above a material sheet 1200, are various forms of string, yarn and thread 1201. Other materials may also be used in place of the layers. Sheets of different materials may also be used as long as they provide a solid outer layer that helps the layered materials retain a sturdy shape while pressed during production.

Figure 13:
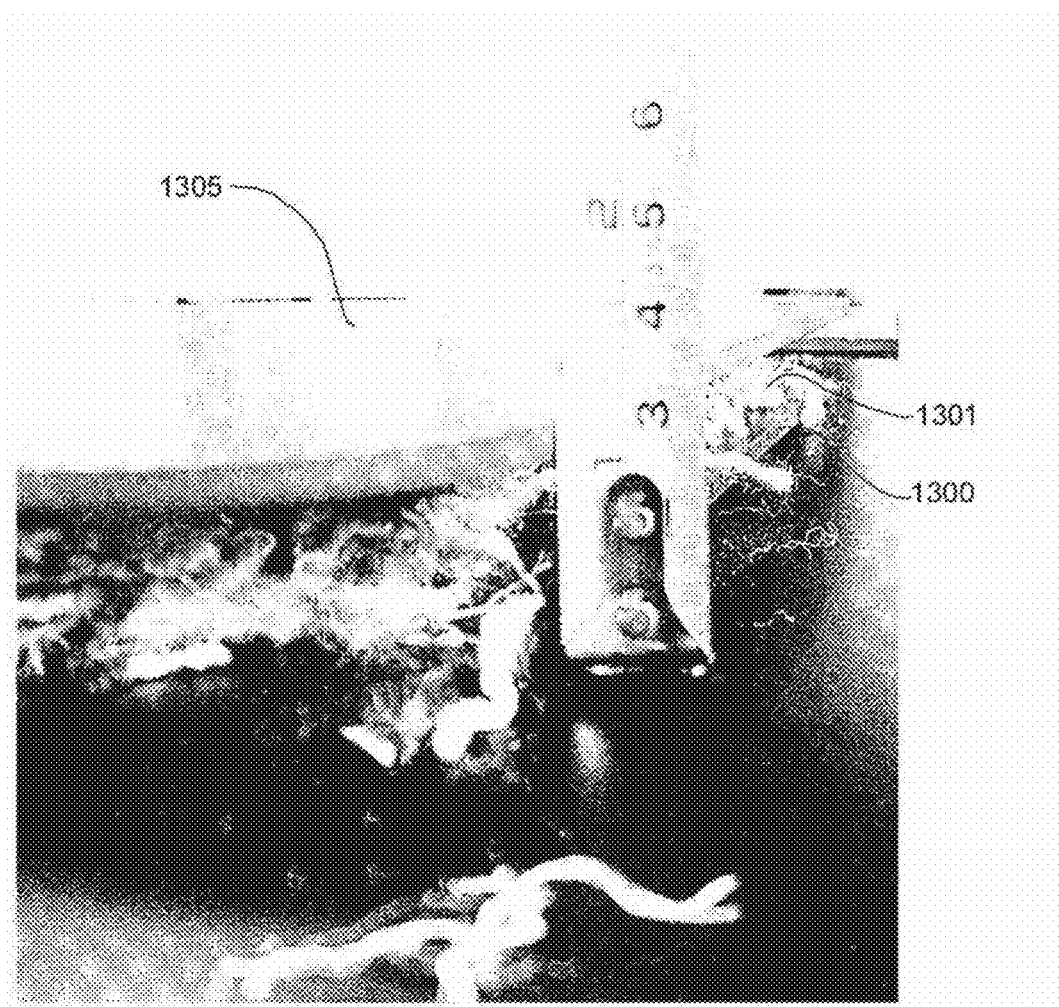
FIG. 13 illustrates an embodiment of various materials combined prior to production.

FIG. 13 illustrates various materials combined prior to production. Layered above a material sheet 1300, are various forms of string, yarn and thread 1301. Another material sheet 1305 is placed on top the string/yam/thread layer 1301. Material sheets 1300 and 1305 cooperate to sandwich the string/yam/thread layer 1301. Other materials may also be used in place of the layers. Sheets of different materials may also be used as long as they provide a solid outer layer that helps the layered materials retain a sturdy shape while pressed during production.

Figure 14A:
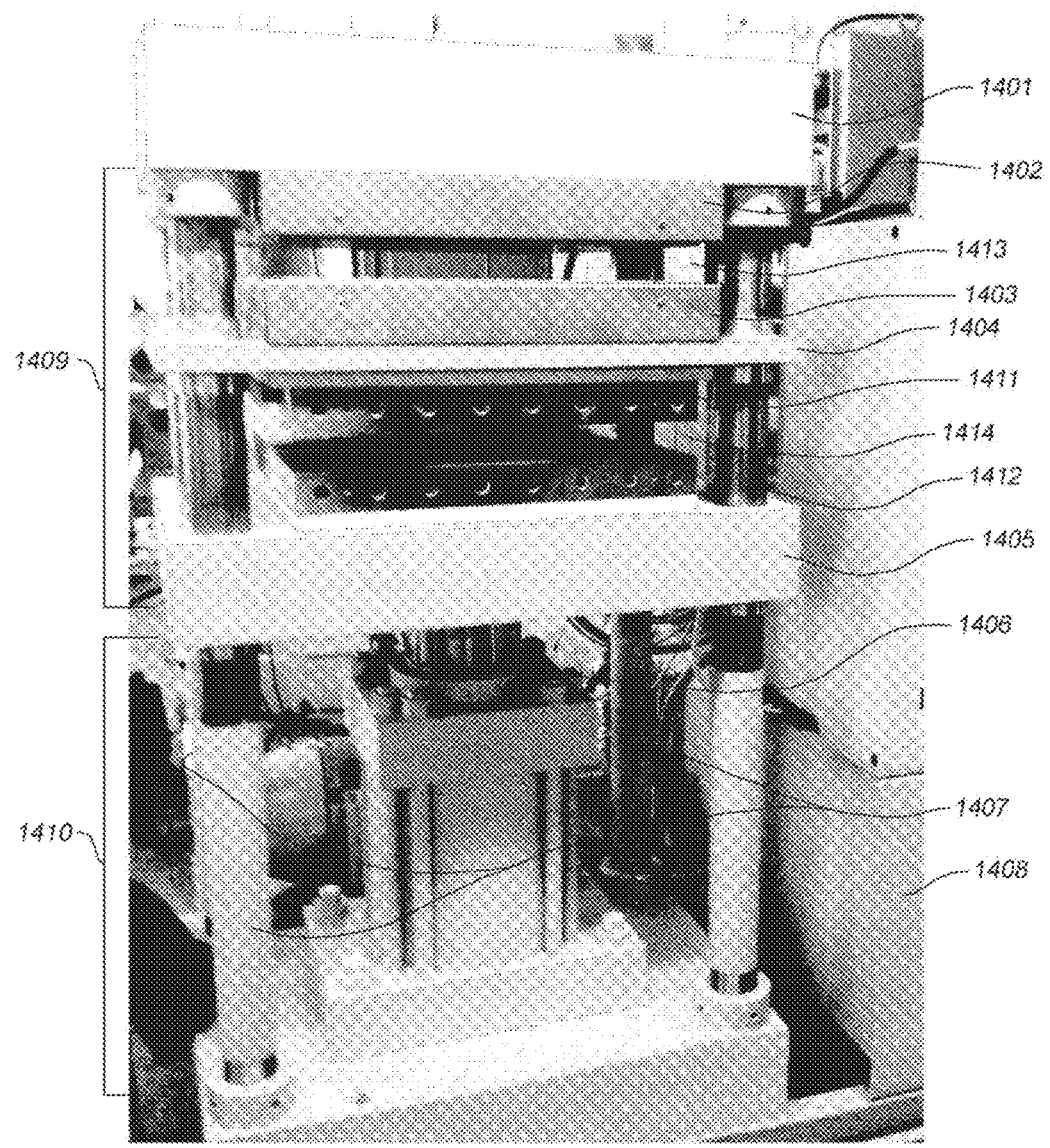
FIG. 14A to 14D illustrates two types of presses and associated components and control panels used to create a sheet of thermoformed composite.

FIG. 14A is a press used to produce the finished composite sheet. The press is known in the art and provides equally dispersed pressure along the top and bottom of the sheet. This equally dispersed pressure ensures the sheet has equal thickness throughout its planar axis. Preferably, the press uses a hydraulic pressure to compress the layers. If thermoforming, an intense heat is also used to thermally "melt" the layers together and create a single bonded layer. FIG. 14A shows a thermoforming compression-type press capable of producing a single panel. The thermoforming press of FIG. 14A has three main components, a hydraulic system 1410, a press section 1409 and an electrical control panel 1408.

The hydraulic system 1410 has a single vertically-mounted cylinder 1406 which can operate up to 3600 psi. The hydraulic system consist of an automated pressure pump to raise the lower and middle bolster plates 1405 and 1404 towards the upper bolster plate 1401. The bolster plates are connected together by four tie rods 1407 and the vertically mounted cylinder 1406 will the move the lower and middle bolsters 1405 and 1404 upward along the tie rods 1407 towards the stationary upper bolster plate 1401.

The press section encompasses the region between the upper and lower bolster plates 1401 and 1405 and includes the upper and lower heating platens 1402 and 1403 and the upper and lower cooling platens 1411 and 1412. There is an upper daylight space 1413 between the upper and lower heated platens 1402 and 1403. The upper heated platen 1402 is secured to the underside of the upper bolster plate 1401 and both the upper bolster plate 1401 and the upper heated platen 1402 are stationary. The lower heated platen 1403 is situated on the top side of the middle bolster plate 1404 and moves with the middle bolster plate. The upper cooling platen 1411 is secured to the underside of the middle bolster plate 1404 and moves with the middle bolster plate. There is lower daylight space 1414 between the upper and lower cooling platens 1411 and 1412. The lower cooling platen 1412 is situated on the top side of the lower bolster plate 1405 and moves with the lower bolster plate.

The electrical control panel 1408 has mechanisms to regulate pressure, heat, cooling, water, air and time variables relating to operation of the press. The panel also has gauges to display pressure and temperature. The heated platens each have a microprocessor controller wherein the temperature is controlled by a closed PID loop (proportional-integral-derivative) and the heat is controlled SCR-type (silicon-controlled rectifier) or thyristor-type power controller. The control mechanisms are housed in an electrical enclosure cabinet. The electrical control panel 1408 is further described in FIG. 14B.

Operation of the press to make thermoformed panels begins with placing molds which have been loaded with materials for compression on top of the lower heated platen 1403 in the upper daylight space 1413 between the heated platens 1402 and 1403 below the upper heated platen 1402 such that the mold is centrally located on the lower heated platen 1403.

Controls on the electrical control panel 1408 are actuated to heat the platens to the desired temperature and to cause the vertically-mounted cylinder 1406 of the hydraulic system 1410 to raise the lower bolster plate 1405 with the affixed lower cooling platen 1414 such that the lower cooling platen 1414 will contact the upper cooling platen 1413 secured on the underside of the middle bolster plate 1404. The continuing upward cylinder force moves the lower and middle bolster plates 1404 and 1405, the cooling platens 1411 and 1412 and the lower heated platen 1403 affixed on top of the middle bolster plate 1404 upwards towards the stationary upper heated platen 1402 secured to the upper bolster plate 1401 such that the mold situated atop the lower heated platen 1403 is compressed between the upper and lower heated platens 1402 and 1403. Application of upward pressure from the cylinder 1406 of the hydraulic system 1410 is continued until the selected pressure and temperature have been reached and the selected time has elapsed. Selected pressures, temperatures and times will vary according to the materials loaded into the molds for compression into thermoformed panels. Temperatures and pressures are selected to achieve the vicat softening point of the materials in the molds, but not to the point of liquefaction.

At the end of the selected time, the heating mechanism is deactivated and the pressure is released by actuating the mechanism controlling the hydraulic system 1410 on the electrical control panel 1408 causing the vertically-mounted cylinder 1406 to move downward to lower the lower heated platen 1403 away from the upper heated platen 1402. The hydraulic system 1410 accomplishes this by lowering the lower bolster plate 1405 along with the middle bolster plate 1404, the cooling platens 1411 and 1412 and the lower heated platen 1403 down the tie rods 1407 such that the daylight spaces 1413 and 1414 are again evident between the heated platens 1402 and 1403 and the cooling platens 1411 and 1412.

Cooling of the thermoformed panel begins when the mold is removed from the heated platen and pressure stage. The removed molds are centrally placed on top of the lower cooling platen 1412 in the lower daylight space 1414 located between the upper and lower cooling platens 1411 and 1412 of the press. The cooling mechanism on the electrical control panel 1408 is actuated to circulate water through the cooling platens 1411 and 1412. The temperature of the water should be cooler than ambient room temperature and below the temperature of the vicat softening point of the materials within the molds. To minimize distortion of the panels upon cooling, pressure may be applied to the cooling platens 1411 and 1412 by actuating the cylinder 1406 of the hydraulic system 1410 to raise the lower bolster plate 1405 having the lower cooling platen 1412 affixed on top such that the mold on top of the lower cooling platen 1412 contacts the upper cooling platen 1411. The circulating water then cools the materials in the molds to a temperature below the vicat softening point while the molds are kept under pressure. Molds may also be additionally cooled outside of the press, or may be optionally cooled entirely outside of the press, by circulating air over the mold surface or by water bath submersion following removal of the mold from the press. After cooling is achieved, the molds are removed from the thermoforming press and the panels are removed from the molds.

The Electrical control panel 1408 of FIG. 14A has an electrical enclosure cabinet 1420 connected to a switch box 1433 by an electrical conduit 1432. Electrical enclosure cabinet 1420 has an analog gauge to display System Pressure 1421 via pressure conduit 1422.

Pressure to the press is controlled via platen pressure control 1423 and the pressure is displayed on the analog pressure gauge 1424. Progress of time and temperature is displayed in window 1425.

The platens each have a microprocessor controller wherein the temperature is controlled by a closed PID loop (proportional-integral-derivative) and the heat is controlled by an SCR-type (silicon-controlled rectifier) or thyristor-type power controller. The microprocessor regulating time and temperature for the top set of platens is controlled by dial and panel 1427 and 1426 located on the front of the control panel below the display window 1424. The microprocessor regulating time and temperature for the bottom set of platens is controlled by dial and panel 1429 and 1428 located on the front of the control panel below the control for the top platens 1427 and 1426.

The automated hydraulic lift of the cylinder is controlled by dial and panel 1430 and 1431 located on the control panel below the control for the bottom platens 1429 and 1428.

Switch box 1433 has on/off control switches for heat 1434, cooling 1435, water 1437 and air 1438. A centrally located stop button 1436 stops the press and functions as an emergency release.

Figure 14B:
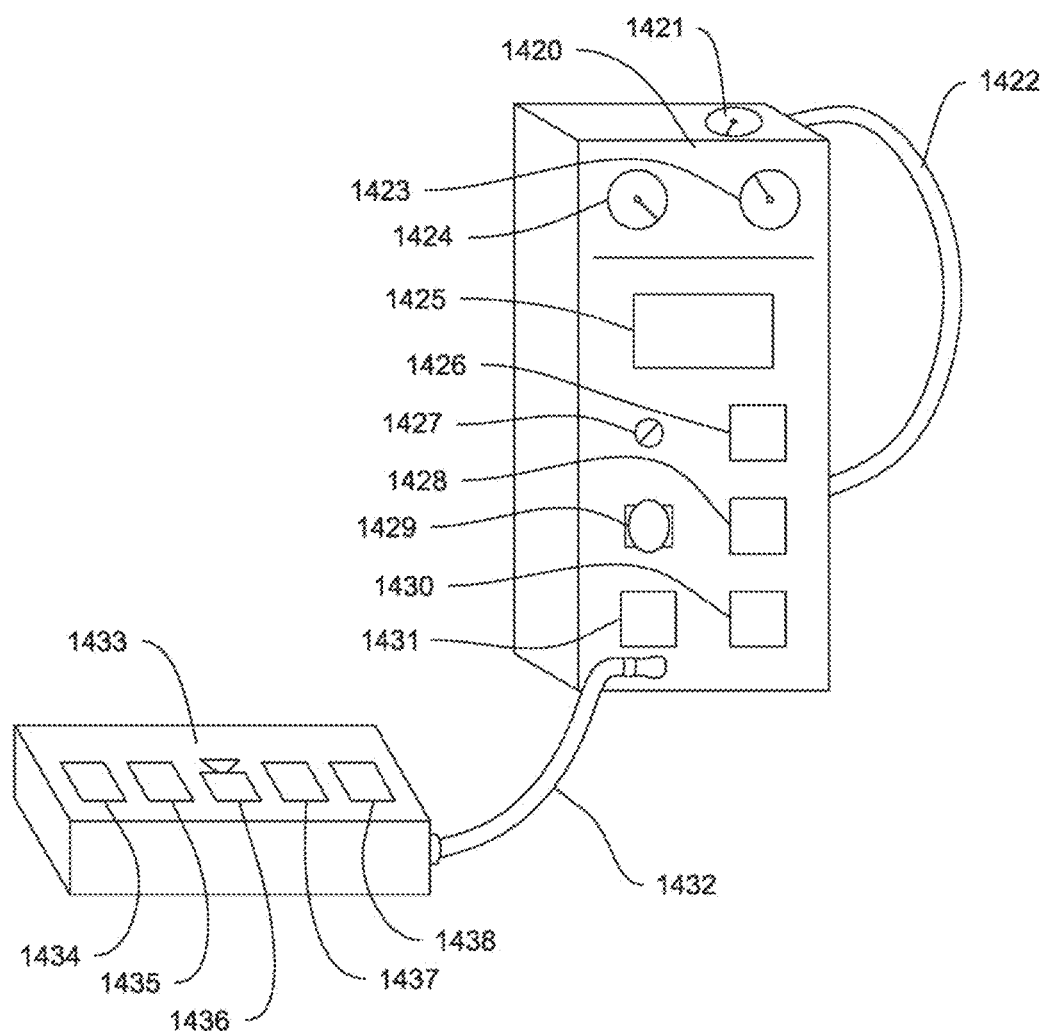
Figure 14C:
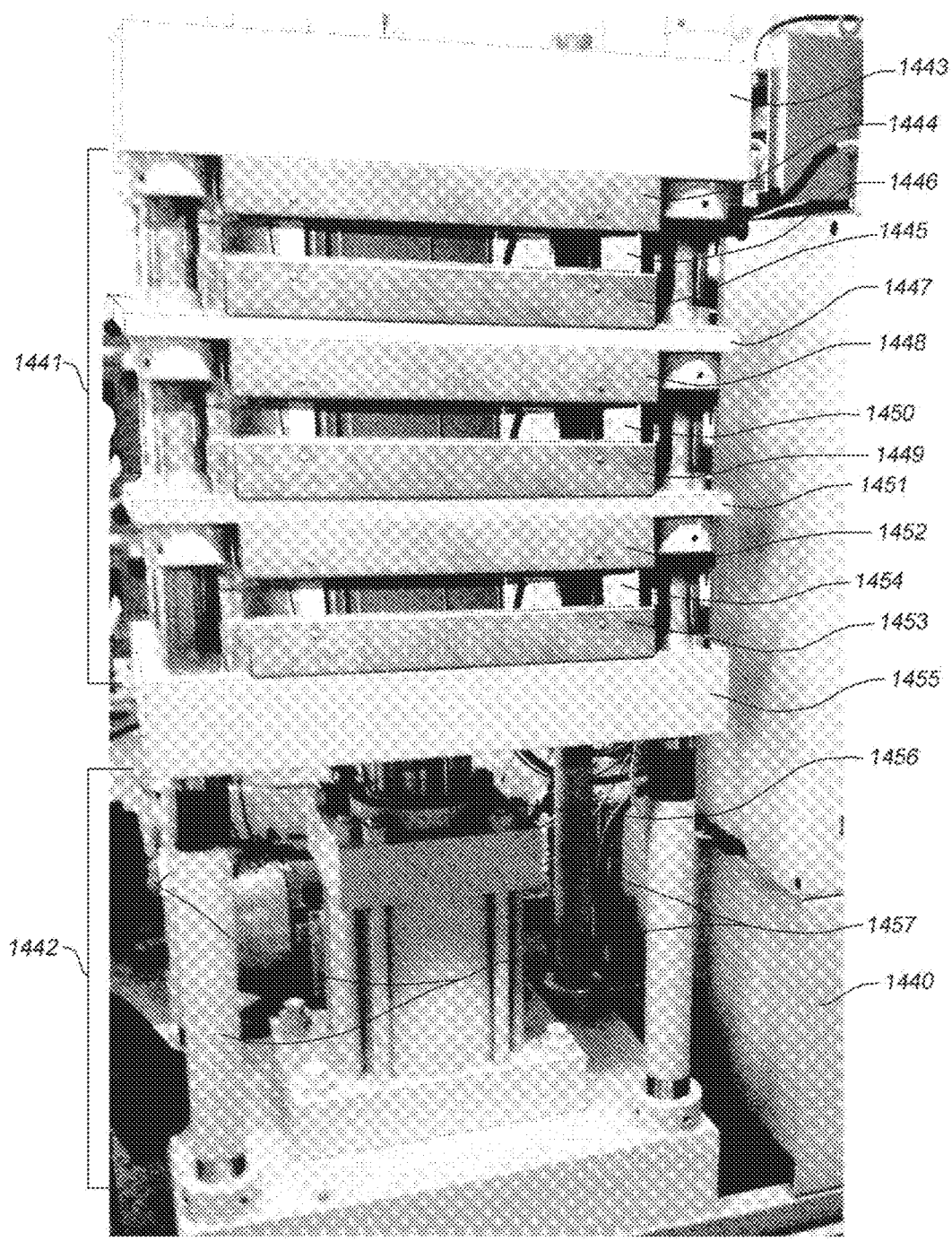

FIG. 14C shows a representative thermoforming compression-type press capable of producing a multiple panels. The thermoforming press of FIG. 14C has three main components, a hydraulic system 1442, a press section 1441 and an electrical control panel 1440.

The hydraulic system 1442 has a single vertically-mounted cylinder 1456 which can operate up to 3600 psi. The hydraulic system consist of an automated pressure pump to raise the lower, lower middle and upper middle bolster plates 1455, 1451 and 1447 towards the upper bolster plate 1443. The bolster plates are connected together by four tie rods 1457 and the vertically mounted cylinder 1456 will the move the lower, lower middle and upper middle bolsters 1455, 1451 and 1447 upward along the tie rods 1457 towards the stationary upper bolster plate 1443.

The press section encompasses the region between the upper and lower bolster plates 1443 and 1455 and includes three sets of platens, a top, a center and a bottom set of heated platens, each set having an upper and lower heated platen including: top upper heated platen and top lower heated platen 1444 and 1445, center upper heated platen and center lower heated platen 1448 and 1449, and bottom upper heated platen and bottom lower heated platen 1452 and 1453.

A daylight space is between each set of upper and lower platens as follows: a top daylight space 1446 between the top upper heated platen and top lower heated platen 1444 and 1445, a center daylight space 1450 between the center upper heated platen and the center lower heated platen 1448 and 1449, and a bottom daylight space 1454 between the bottom upper heated platen and the bottom lower platen 1452 and 1453.

The top upper heated platen 1444 is secured to the underside of the upper bolster plate 1443 and both the upper bolster plate 1443 and the top upper heated platen 1444 are stationary. The top lower heated platen 1445 is situated on the top side of the upper middle bolster plate 1447 and moves with the upper middle bolster plate.

The center upper heated platen 1449 is secured to the underside of the upper middle bolster plate 1447 and moves with the upper middle bolster plate. There is center daylight space 1450 between the center upper and center lower heated platens 1448 and 1449. The center lower heated platen 1449 is situated on the top side of the lower middle bolster plate 1451 and moves with the lower middle bolster plate.

The bottom upper heated platen 1452 is secured to the underside of the lower middle bolster plate 1451 and moves with the lower middle bolster plate. There is a bottom daylight space 1454 between bottom upper and bottom lower heated platens 1452 and 1453. The bottom lower heated platen 1453 is situated on top of the lower bolster plate 1455 and moves with the lower bolster plate.

The electrical control panel 1440 has mechanisms to regulate pressure, heat, cooling, water, air and time variables relating to operation of the press. The panel also has gauges to display pressure and temperature. The heated platens each have a microprocessor controller wherein the temperature is controlled by a closed PID loop (proportional-integral-derivative) and the heat is controlled SCR-type (silicon-controlled rectifier) or thyristor-type power controller. The control mechanisms are housed in an electrical enclosure cabinet. The electrical control panel 1440 is further described in FIG. 14D.

Operation of the press to make multiple thermoformed panels begins with placing a mold which has been loaded with materials for compression atop each of the lower heated platens 1445, 1449 and 1453 in the daylight spaces 1446, 1450 and 1454 beneath the upper heated platens 1444, 1448 and 1452 such that each mold is centrally located on a lower heated platen 1445, 1449 and 1453.

Controls on the electrical control panel 1440 are actuated to heat the platens to the desired temperature and to cause the vertically-mounted cylinder 1456 of the hydraulic system 1442 to raise the lower bolster plate 1455 such that the molds situated atop the bottom lower heated platen 1453 and the center lower heated platen 1449 will contact the adjacent upper heated platens 1452 and 1448 secured on the undersides of the middle bolster plates 1452 and 1447. The continuing upward cylinder force moves the lower, lower middle and upper middle bolster plates 1455, 1451 and 1447 having the affixed platens 1453, 1452, 1449, 1448 and 1445 towards the stationary top upper heated platen 1444 secured to the upper bolster plate 1443. Application of upward pressure from the cylinder 1456 of the hydraulic system 1442 is continued until the selected pressure and temperature have been reached and the selected time has elapsed. Selected pressures, temperatures and times will vary according to the materials loaded into the molds for compression into thermoformed panels. Temperatures and pressures are selected to achieve the vicat softening point of the materials in the molds, but not to the point of liquefaction.

At the end of the selected time, the heating mechanism is deactivated and the pressure is released by actuating the mechanism controlling the hydraulic system 1442 on the electrical control panel 1440 causing the vertically-mounted cylinder 1456 to move downward to lower the lower heated platens 1445, 1449 and 1453 away from the upper heated platen 1444, 1448 and 1452. The hydraulic system 1442 accomplishes this by lowering the lower bolster plate 1455 along with the upper middle and lower middle bolster plates 1447 and 1451 with the affixed platens down the tie rods 1457 such that the daylight spaces 1446, 1450 and 1454 are again evident between the three sets of heated platens 1444 and 1445, 1148 and 1149, and 1452 and 1453.

Cooling of the thermoformed panels begins when the molds are removed from the heated platen and pressure stage. The molds may be held in the thermoforming press once the heat has been turned off and allowed to cool to ambient temperature while under reduced pressure. The molds may also be removed from the heated platens of the presently described press and moved to the cooling platens of another press. To minimize distortion of the panels upon cooling, pressure may be applied to the platens 1444 and 1445, 1148 and 1149, and 1452 and 1453 by actuating the cylinder 1456 of the hydraulic system 1442 to raise the lower bolster plate 1455 in the manner described above to apply pressure to the molds during the cooling period. The molds can be held under pressure until cooled to below the vicat softening point of the materials in the mold. Molds may also be additionally cooled outside of the press, or may be optionally cooled entirely outside of the press, by circulating air over the mold surface or by water bath submersion following removal of the mold from the press. After cooling is achieved, the molds are removed from the thermoforming press and the panels are removed from the molds.

The Electrical control panel 1440 of FIG. 14C has an electrical enclosure cabinet 1460 connected to a switch box 1475 by an electrical conduit 1474. Electrical enclosure cabinet 1460 has an analog gauge to display System Pressure 1461 via pressure conduit 1462.

Pressure to the press is controlled via platen pressure control 1463 and the pressure is displayed on the analog pressure gauge 1464. Progress of time and temperature is displayed in window 1465.

The platens each have a microprocessor controller wherein the temperature is controlled by a closed PID loop (proportional-integral-derivative) and the heat is controlled SCR-type (silicon-controlled rectifier) or thyristor-type power controller. The microprocessor regulating time and temperature for the top set of platens is controlled by dial and panel 1467 and 1466 located on the front of the control panel below the display window 1465. The microprocessor regulating time and temperature for the center set of platens is controlled by dial and panel 1469 and 1468 located on the front of the control panel below the controls for the top platens 1467 and 1466. The microprocessor regulating time and temperature for the bottom set of platens is controlled by dial and panel 1471 and 1470 located on the front of the control panel below the controls for the center platens 1469 and 1468.

The automated hydraulic lift of the cylinder is controlled by dial and panel 1473 and 1472 located on the front of the control panel below the controls for the bottom platens 1471 and 1470.

Switch box 1475 has on/off control switches for heat 1476, cooling 1477, water 1479 and air 1480 located across the top of the switch box. A centrally located stop button 1478 stops the press and functions as an emergency release.

Figure 15:
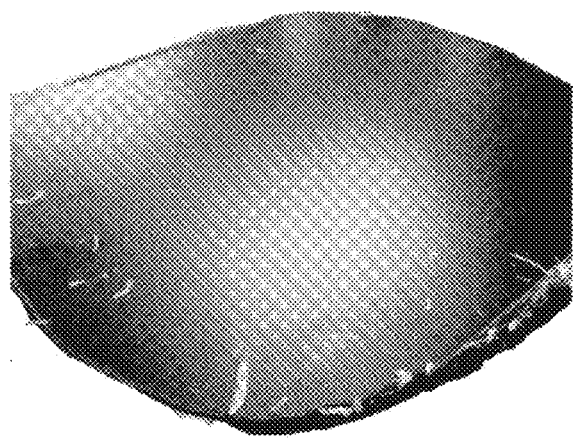
FIG. 15 illustrates a thermoformed composite after production.

FIG. 15 illustrates a thermoformed composite after production. The composite comprises material sheet layers and a string/yarn/thread layer. The layers have been compressed together and heated to create a single composite sheet. The new composite sheet comprises the strengths of the individual layers from the pre-production. The new composite sheet may be further shaped and formed into a pre-determined shape to be used for signage, paneling, etc. The new composite sheet is designed to be lighter, stronger, and more eco-friendly than the conventional signage material. The inherent, yet unique qualities, such as impact properties, flame retardancy, rigidity, cold crack resistance and melt variances each contribute to end properties that allow for uses that are not achievable if each material were to be used on its own.

Figure 16:
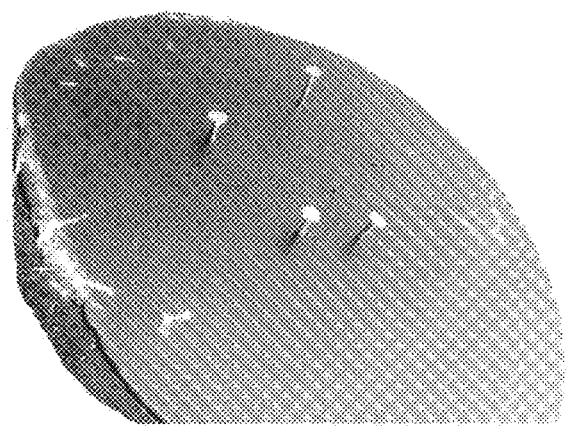
FIG. 16 illustrates a thermoformed composite after production.

FIG. 16 illustrates a thermoformed composite after production. The composite comprises material sheet layers and a string/yarn/thread layer. The layers have been compressed together and heated to create a single composite sheet. The new composite sheet comprises the strengths of the individual layers from the pre-production. The new composite sheet may be further shaped and formed into a pre-determined shape to be used for signage, paneling, etc. The new composite sheet is designed to be lighter, stronger, and more eco-friendly than the conventional signage material. The inherent, yet unique qualities, such as impact properties, flame retardancy, rigidity, cold crack resistance and melt variances each contribute to end properties that allow for uses that are not achievable if each material were to be used on its own.

Figure 17:
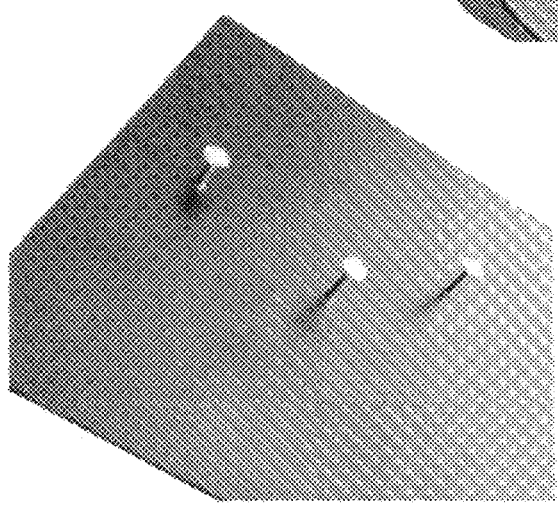
FIG. 17 illustrates a thermoformed composite after production shaped into a square.

FIG. 17 illustrates a thermoformed composite after production. The composite comprises material sheet layers and another material layer. The layers have been compressed together and heated to create a single composite sheet. The new composite sheet comprises the strengths of the individual layers from the pre-production. The new composite sheet may be further shaped and formed into a pre-determined shape to be used for signage, paneling, etc.

In FIG. 17, the composite sheet has been cut and shaped into a square. Other shapes are also allowable. The new composite sheet is designed to be lighter, stronger, and more eco-friendly than the conventional signage material. The inherent, yet unique qualities, such as impact properties, flame retardancy, rigidity, cold crack resistance and melt variances each contribute to end properties that allow for uses that are not achievable if each material were to be used on its own.

Figure 18:
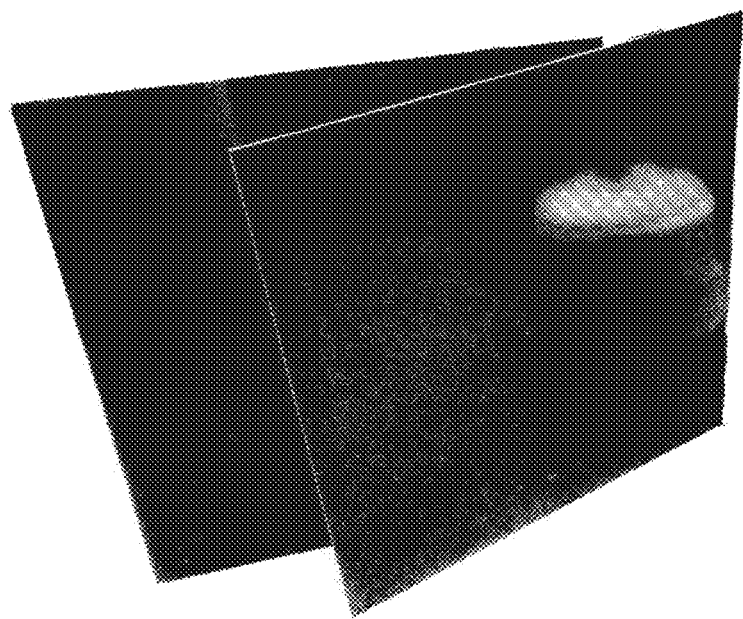
FIG. 18 illustrates a perspective view of a thermoformed composite after production shaped into a square.

FIG. 18 illustrates a perspective view of a thermoformed composite after production. The composite comprises material sheet layers and another material layer. The layers have been compressed together and heated to create a single composite sheet. The new composite sheet comprises the strengths of the individual layers from the pre-production. The new composite sheet may be further shaped and formed into a pre-determined shape to be used for signage, paneling, etc.

In FIG. 18, the composite sheet has been cut and shaped into a square. Other shapes are also allowable. The new composite sheet is designed to be lighter, stronger, and more eco-friendly than the conventional signage material. The inherent, yet unique qualities, such as impact properties, flame retardancy, rigidity, cold crack resistance and melt variances each contribute to end properties that allow for uses that are not achievable if each material were to be used on its own.

Figure 19:
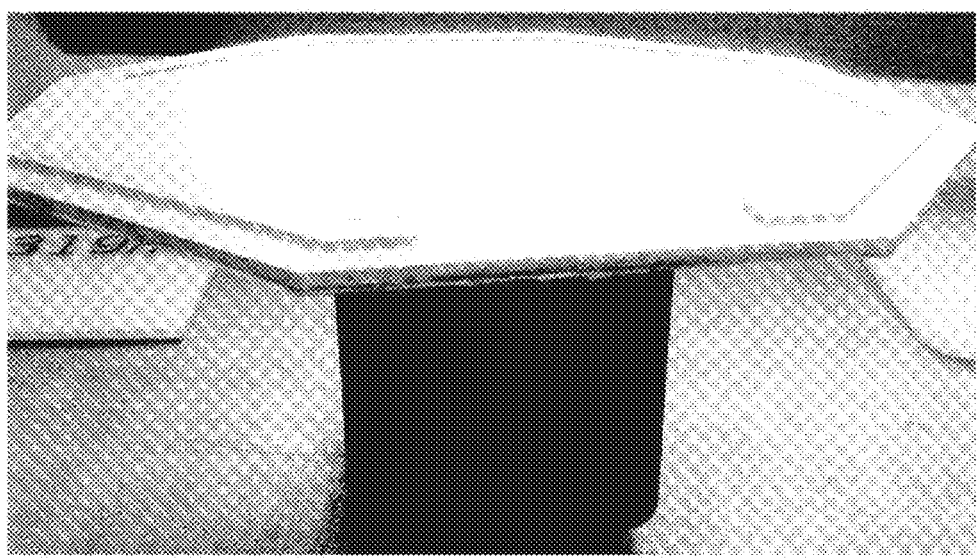
FIG. 19 illustrates a thermoformed composite after production shaped into an octagon.

FIG. 19 illustrates a thermoformed composite after production. The composite sheet has been shaped into an octagon form. The new composite sheet is designed to be lighter, stronger, and more eco-friendly than the conventional signage material. The inherent, yet unique qualities, such as impact properties, flame retardancy, rigidity, cold crack resistance and melt variances each contribute to end properties that allow for uses that are not achievable if each material were to be used on its own.

Figure 20:
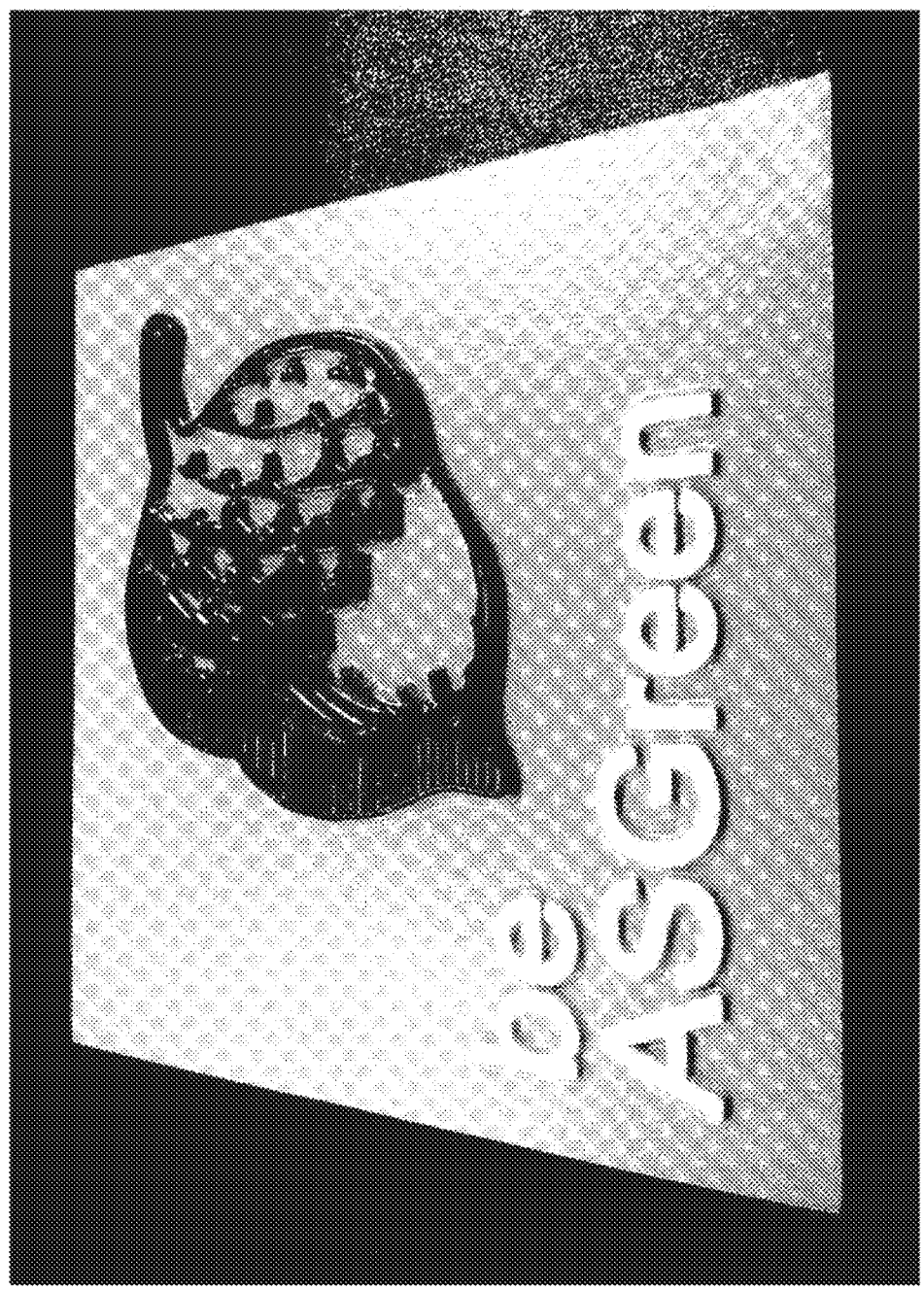
FIG. 20 illustrates a thermoformed composite after production shaped into a square sign.

FIG. 20 illustrates a thermoformed composite after production. The composite sheet has been shaped into a square sign. The sign includes graphics and lettering that is formed during the thermoforming process. This is done by having the graphic and/or lettering as part of a negative imprint of the press dies. This allows the layered materials to not be fully compressed in the negative imprint areas while completely compressed in the non-negative imprint areas.

Negative imprints in the dies are common to the art of molding and casting. The new composite sheet is designed to be lighter, stronger, and more eco-friendly than the conventional signage material. The inherent, yet unique qualities, such as impact properties, flame retardancy, rigidity, cold crack resistance and melt variances each contribute to end properties that allow for uses that are not achievable if each material were to be used on its own.

The invention uses a unique combination of materials recovered from various waste streams or recycling processes to create various recipes and formulas to serve a variety of end markets. The combinations from these unrelated sources and material types are combined and formed, using thermoforming and hydraulic pressure to create composites not currently available. They also divert materials from landfills or illegal disposal in to a value added series of products such as signage, sheet and board type products for the disability community, military or government sector and transportation markets.

The inherent, yet unique qualities, such as impact properties, flame retardancy, rigidity, cold crack resistance and melt variances each contribute to end properties that allow for uses that are not achievable if each material were to be used on its own. Energy, emissions and water savings from the use of such materials have also been documented in various life cycle studies by the EPA and NGO's, which makes these materials and/or end products suitable for numerous environmental credits, LEED, carbon offsets and diversionary credits.

The invention can use a foaming material mixed with the above referred thermoform-able grind, which allows the deterministic nature of a foaming material to provide and or enhance the pressure aspect of commonly encountered thermoform operations. Such foaming material(s) may be triggered to foam before, during, or after the thermoforming of the desired structural-composite. In the use of foaming materials, the activation of the foaming action can be designed to occur before, during, and or after thermoforming the intended structural composite. Activation of the foaming action after the construction of the structural composite allows intended results such as internal pressurizing of said structural composite.

Figure 21:
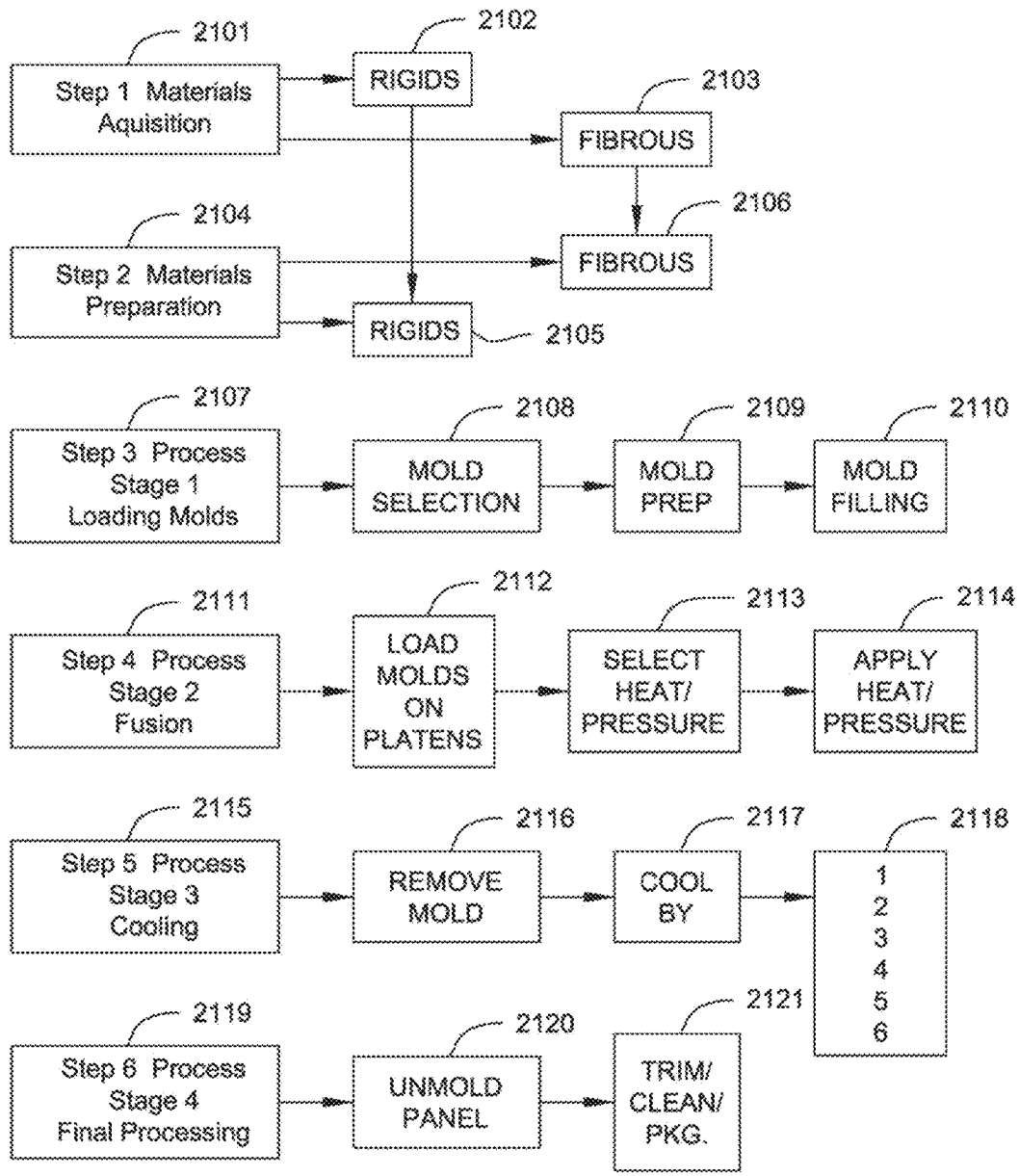
FIG. 21 shows a flow chart for one embodiment of the process in the present invention.

FIG. 21 is a flowchart of the process for making thermoformed structural composites with particulate rigid materials utilized in the base and top layers of the composite panel and having a fibrous core between the base and top layers of rigid materials.

Step 1 Material Acquisition starts at step 2101. Rigid materials are acquired at step 2102 and fibrous materials are acquired at step 2103, with both these types of materials being useable for forming composite panels that can be made in this process.

Two types of materials are typically utilized in formation of composite panels. Rigid materials acquired in step 2102 are used for forming the exterior portions of the panels and fibrous materials acquired in step 2103 are used as a core filling material. In another embodiment, panels are formed utilizing only rigid materials without having a core of fibrous material.

The rigid plastics acquired in step 2102 are preferred for making composite panels. Rigid plastics are generally defined as polymer based materials holding a finite shape and having a low degree of flexibility whether the plastic article is full or empty, supported or freestanding. These properties make rigid plastics suitable for use as the hardshell casing or exoskeleton of the thermoformed panels of the invention. Acrylonitrile butadiene styrene (ABS) is the preferred rigid material acquired in step 2102 for use in the invention.

Alternatively, engineered plastics and non-olefin materials, such as styrenic polymers, and polymers with low viscosity may be used for the rigid materials acquired in step 2102. High-density polyethylene (HDPE), low-density polyethylene (LDPE), polypropylene (PP) and polyethylene (PE) may be used. Olefin materials with high melting points may be used for some limited applications. Mixed plastic materials, non-plastic type materials, such as rubbers and non-polymer materials like glass and mineral based materials may be used as fillers or additives.

Rigid materials acquired in step 2102 for use with the claimed process are acquired from post-consumer plastics, post-industrial plastics, and virgin plastics. Post-consumer ABS plastics are the preferred rigid material for the invention. Post-consumer plastics include such materials as electronic waste, automobiles, appliances, toys, pill bottles, and food containers. Post-consumer plastics having mineral, paper or glass contaminants are useable in the thermoformed panels of the invention. Alternatively, post-industrial plastics including scraps and waste leftover from manufacturing processes or virgin plastics materials which are unprocessed and have not been used in manufacturing a product may be used.

The fibrous materials acquired in step 2103 as the core layer of the composite panels, and these materials are preferably man-made fibrous materials made through extrusion processes such as fibers used in carpeting or clothing. Polyethylene terephthalate (PET) fibers are preferred as the core layer for the thermoformed panels of the invention.

Other man-made fibers having a base of nylons, polyesters, polyethylene terephthalate (PET), poly 1,4-benzamide (BPA), poly-paraphenylene terephthalamide (Kevlar-type), biaxially-oriented polyethylene terephthalate (BOPET also known as Mylar) or polyamides may also be acquired in step 2101 for the thermoformed panels of the invention. Fibers may be combined or coated with acrylics, glass, mineral fillers or binders. The fibers may also contain an olefin component. However, olefins having low melting points are not preferred. Alternatively, cotton or other natural fibers may also be utilized as the fibrous component of the claimed process. But, materials deemed toxic are not suitable.

Fibrous materials reclaimed from carpets are acquired in step 2101, which are preferred for the thermoformed panels of the invention. These fibrous materials are acquired as carpet fibers from shredded or otherwise deconstructed carpet. Alternatively, fibers from clothing or other textiles, or fabric fibers reclaimed from fiber dominated products such as cleaning cloths, disposable gowns, diapers, pads or other healthcare textiles may be used as the fibrous core material of thermoformed panels.

Step 2 Material Preparation starts at step 2104. Rigid materials are acquired at step 2102 and fibrous materials are acquired at step 2103. In step 2104, these rigid and fibrous materials are prepared for use in a thermoformed composite panel.

In step 2105, rigid materials, preferably ABS plastics are prepared for use in the method by reducing the size of the plastics to particulate sizes for subsequent dispersal into molds. Size reduction of the particles improves the overall process by reducing the amount of energy needed for fusion, by reducing the amount of pre-heating needed and by reducing the overall processing time. Reduced size particles produce a finished product with improved surface consistency having improved fusion of the particles due to the greater surface area associated with the smaller particles. Rigid plastics may be received in a reduced size form from a supplier or the plastics may be size reduced after acquisition. The rigid materials, after size reduction preparation, are shown by example in FIGS. 9-10.

In step 2105, grinding is the preferred means for size reduction of the rigid plastic materials into particulates for the thermoformed panels of the invention. Rigid plastics are ground to achieve particle sizes of less than 1/16 of an inch (approximately 1.5 mm) to mesh sizes of 30-100 (0.595 mm to 0.149 mm). Ground materials are sifted through screens to regulate particle sizes. Particles less than 1.5 mm are free-flowing powders, and have better penetration of fibrous core layer and better fusion with less heating than larger particles. Smaller sized particles are preferred for making panels with smooth or glossy finishes. Rigid materials received as large pieces may be size reduced prior to grinding. Alternatively, size reduction can be accomplished by folding, chopping, pulverizing or other means for reducing the plastic starting materials to the appropriate size for a particular application. After shredding, grinding or pulverizing, the materials are sifted through screens to regulate particles sizes.

Shredders capable of handling large-sized starting materials are utilized in step 2105 for materials such as automobile parts, rolls of materials such as carpets, fibers or films, large pieces of electronic equipment, large toys, and other such large sized materials. Large size starting materials are usually described as those having pieces larger than a suitcase. There is a greater need for pre-stage shredding of materials having harder impact properties or greater densities, or for those having assembled pieces with plastics and metals.

The extent of size reduction in step 2105 is dictated by the type of rigid material and by the process the materials will undergo in the next stage of production. These considerations can include the size of the feed or transfer piping, air movement, size of the storage containers, as well as the characteristics desired for the final panel, such as surface finish. Particles sizes of the rigid materials define how the fibrous materials need to be staged for use. Particle size may be selected based on the desired final appearance of the panel, or the type of fibrous core used.

Larger sizes of rigid materials can be achieved in step 2105, for use in thermoformed panels. Ground particles larger than 30 mesh and larger pieces up to one inch shredded strips of rigid plastic may be used. Larger sized polymer-dominated material can be used. However, smaller sizes will yield more consistent results in the final product. Particle sizes may be uniform or may be a combination of different sizes depending on the characteristics desired in the final product.

Smaller sized particles, such as those having mesh sizes of 30 to 100 (0.595 mm to 0.149 mm), are the preferred sizes in step 2104 for producing higher gloss finishes on the final product. Larger particle sizes may be preferred when a smooth or glossy finish on the final product is not needed, or to prevent or minimize migration of loose fibers to the surface of the panel.

Smaller particles of rigid materials are preferred sizes in step 2105 when the final product will have a glossy finish or a non-porous surface and are preferred when a thinner final panel is prepared. Smaller rigid particle sizes may be used advantageously when the temperature of the vicat softening point of the rigid material is high. Smaller particles have greater surface area requiring less energy to soften the particles to a uniformly flowable state for fusion through the layers.

Smaller particles are also preferred sizes in step 2105 when the fibrous core is fabric or textile type material. In one preferred embodiment, a layered folded fabric having many small openings around the fibers is used as the fibrous core and smaller particles sizes are used for the rigid material to allow for greater penetration of the spaces around the fabric fibers by the softened rigid plastics. This combination of materials leads to stronger fusion and bonding of the layers while producing a thinner end product.

Larger particle sizes of rigid materials are preferred sizes in step 2105 when the fibrous core is made of larger loose fibers prone to migration through the softened rigid materials. In another preferred embodiment, larger particles of rigid material are used to prevent or minimize the migration of loose core fibers to the surface of the panel. Migration of fibers can have a negative impact on the final product, such as the appearance of the panel, or may prevent good adhesion of decals on the panel surface. Use of larger rigid particle sizes in step 2104 may also be used to yield a more porous surface on the final product for improved adherence of paint.

Preparation of Fibrous Materials begins at step 2106. Fibrous materials may be size reduced after acquisition. Fibrous materials are size reduced in step 2106, and these materials include the preferred PET fibers. The fibrous materials are preferably size reduced in step 2106 using a hammermill or pulverizer type apparatus. Preferably, the fibrous materials are size-reduced for subsequent hand-layering of the loose fibers into the molds.

Alternatively, fibrous materials can be cut, shredded or pulverized in step 2106. Examples of equipment suitable for size reduction of fibrous materials for the process of the invention include pulverizers and hammermills. Added cutting or folding can be performed as needed to fit a specific size of mold.

Fibrous materials are preferentially sized in step 2106 to allow distribution by hand to form an even layer over the base layer of rigid particulate material in the molds, such that few voids are present in the fibrous layer. The disbursed fibrous materials are shown in FIGS. 11 and 12.

Loose fibrous materials may be pre-shaped in step 2106 by folding and pressing into a box having the same dimensions as a specific mold. Pressing the fibers with weights will create low to high density matting for core layers. Pre-shaping the fibrous materials into mats will control the presence of loose fibers on the edges, and allows for easier handling and transfer of the fibrous material to the final molding stage before entering the platens. Pre-shaping the fibrous material in step 2106 into mats reduces the processing time and reduces the voids between the fibers.

Fabric-type or netting-type fibrous materials in step 2106 may be folded to fit the mold. Fabric or netting-type fibrous materials are evenly distributed between the rigid layers either by hand layering or after being pre-shaped into mats to fit specific molds.

In step 2106, fibrous materials may be selected based on the size of the fibers, by either the length or width of loose fibers, by the thickness of a fabric or textile fibrous core, or by the thickness of a pre-shaped fibrous mat. Fibrous materials add ductile strength to the finished panels. The thickness of the end product is directly affected by the thickness of the fibrous core, which can be adjusted in the stated ranges.

Preferably, the fibrous core will have a weight that is approximately 10-15% of the total weight of the rigid materials. Alternatively, the weight of fibrous material in the core layer can be from 1% to 80% of the weight of the rigid materials. Preferably, the fibrous core is from ⅛ inch to ¼ inch thick. Alternatively, the fibrous core can have the thickness of a single layer of netting up to a densely pressed mat of ½ inch thickness.

The process step 2107 is then conducted were molds are prepared and loaded with materials. Rigid materials 2105 and fibrous materials 2106 as prepared in Step 2 2104 are loaded into molds at step 2107. FIGS. 9-12 show molds that have been prepared and loaded with first layer of rigid material and a covering layer of fibrous material.

Mold selection is determined in step 2108 by the characteristics desired in the final panel, the starting materials used in preparation of the panel, or combinations of these factors. Molds are sized that will fit between the platens of the press and must be made of materials that can withstand pressures in excess of 4000 psi and temperatures up to 500° F. Characteristics such as the dimensions, thickness and finish desired for the thermoformed panel are determining factors for mold selection in step 2108. Properties of the starting materials, such as vicat softening temperature, are also determining factors for mold selection.

Molds have two parts, a mold base and a mold top plate. Preferably, molds are made of metals, such as aluminum, copper and/or steel. The aluminum molds we use provide a better coefficient of heat transfer to our process by a fact of 20 plus versus steel molds. This allows us to use less heat and energy. Alternatively, molds can be made of epoxy board, wood or other materials able to withstand at least 4000 psi of pressure and temperatures up to 500° F. Molds made of metals, such as aluminum, copper and/or steel, have higher coefficients of heat transfer as compared to wood or epoxy board, allowing for more rapid heat transfer to the particulate materials.

Molds used in step 2107 made of metal are preferred for making thicker or larger panels, for use with rigid materials having high vicat temperatures, for fusion processes requiring pressures over 2500 psi, and for use when fused materials require rapid cooling prior to unmolding. Molds of epoxy board and wood are used for making thinner panels or where lower temperatures and pressure are needed. Non-metal molds are also advantageous used when fused material require slower cooling to prevent warping.

The mold used in step 2107 has a base unit with an area able to contain the rigid and fibrous materials for fusion. Molds have a depth that corresponds to the thickness of the finished panel and a recessed area capable of receiving and retaining the rigid and fibrous components in both the dry phase during loading and the viscous phase during fusion. The mold used in step 2108 will also have a top plate that fits over the mold base to form a closed interior space able to contain the rigid and fibrous components during the fusion stage of the process. When heat and pressure are applied to the top and bottom parts of the mold, the rigid and fibrous materials will be compressed to fill the interior space of the mold producing a fused surface on the panel. Alternatively, the mold base has a flat surface without a recessed area.

Preferred mold dimensions for the molds used in step 2107 are less than the dimensions of the platens. Mold length and width dimensions may be smaller than the dimensions of the platens of the thermoforming press, the same dimensions as the platens, or have larger dimensions than the platens. Mold dimensions are limited by whether adequate pressure and heat can be applied to produce fusion of the materials loaded within the molds.

Molds may also be selected in step 2108 based on the desired shape and size of the final product. A mold with a high polish finish on the interior contact surface will produce a panel with a highly polished surface. The aluminum molds we use provide a better coefficient of heat transfer to our process by a fact of 20 plus versus steel molds. This allows us to use less heat and energy. A rougher mold finish will produce a matte type finish on the final product which would be useful for surfaces that will be painted or glued.

A mold used in step 2107 will also have a top plate preferably made of the same material as the mold base. Alternatively, the top plate can be made of a different material that is able to withstand the heat and pressure of the fusion process. The mold top plate is preferably a flat piece that substantially mirrors the dimensions of the base plate and is held in place against the mold base by the weight of the top plate. Alternatively, the mold top plate can be secured by matching male/female type fasteners on the edges of the mold base and top plate.

Preferably, a mold used in step 2107 will have a flat surface on both the mold base and the mold top plate producing a panel that has two flat surfaces. Alternatively, the mold base will have a depressed design in the bottom of the mold that will produce a raised design on the surface of the finished panel. Alternatively, the mold base has a raised area that will result in a groove-like depression in the panel surface for insertion of a bold or other fastener.

Mold preparation in step 2109 includes removing surface contaminants from the mold and pre-heating the mold prior to loading with materials for fusion. Molds are wiped with a polymer wool brush to remove contaminants prior to loading with materials for fusion. Molds may be cleaned by air-blowing, brushing, washing, or other means of cleaning debris from the mold surface that could interfere with fusion of materials, mar the finish of the panel or otherwise have a negative effect on the thermoformed panel. Molds may optionally be coated with a releasing agent to aid the release of certain types of materials.

Molds used in step 2109 are preferably preheated following removal of contaminants and prior to addition of materials for fusion. Preheating the molds reduces the heat that must be added during the pressure stage allowing for shorter processing times. Molds are preferably preheated to temperatures of approximately 100° F./38° C. to 122° F./50° C. in step 2109 prior to filling. Rigid and fibrous materials may be preheated in a like manner prior to loading into preheated molds. Higher pre-heating temperatures should not exceed the melt flow temperature of the materials may be used in step 2109. Alternatively, molds may be filled without preheating for use with materials having low vicat softening points.

Figure 23:
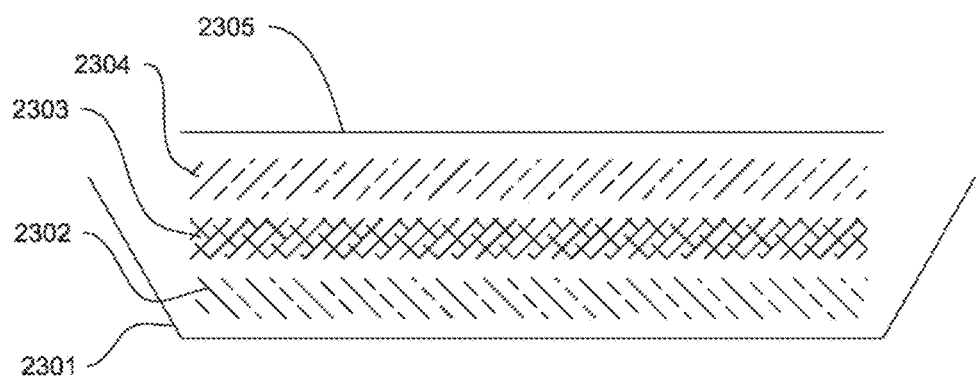
FIG. 23 illustrates a mold "sandwich" of materials in the present invention.

Mold filling is conducted in step 2110, which includes layering prepared materials in the mold for thermoforming into a panel. FIGS. 9-12 show molds that have been prepared and filled with a top layer of fibrous material. Molds that have been cleaned and preheated in the manner described above 2109 are loaded with materials for thermoforming into panels in step 2110. The mold base is preferably filled in step 2110 in a "sandwich" manner with a base layer of particulate rigid material on a lower level, followed by a covering of core layer of fibrous material, and then followed by covering the core layer with a top layer of particulate rigid material. The cross-section of the "sandwich" is shown in FIG. 23 after rigid and fibrous materials are distributed in the mold. The filled mold base is then topped with the mold top plate. Alternatively, molds may be filled with only rigid materials, omitting the fibrous core. Molds may also be fitted with a pre-made blank panel for the rigid base, followed by a fibrous core layer and then followed by covering the core layer with another pre-made blank panel.

The "sandwich" filling method of loading in step 2110 is described in more detail as follows. Rigid particulate materials, prepared as described above, are evenly distributed in the bottom of the mold to form a base layer of material covering from edge to edge of the mold. Preferably, rigid materials are a free-flowing dry powder sized less than 1.5 mm (1/16") to 0.149 mm (100 mesh) for uniform distribution in the mold. Rigid materials are preferably loaded into the molds by a funnel drop mechanism, but alternatively, may be distributed by hand, via hose, or other loading mechanism that can deliver the materials into the mold for even distribution of materials across the mold surface. If larger rigid materials are used, such as folded strips, shredded pieces or pre-made blank panels, these rigid materials are preferably distributed in the molds by hand.

The amount of rigid material loaded into a mold will be determined based on size of the panel desired and the end use of the panel. In a preferred embodiment, a 12 inch square mold is loaded with a base layer of eight ounces of rigid ABS particulate material. Alternatively, rigid particulate materials ranging in weight from 0.3 ounce, to produce a very thin blank panel, up to about 2 pounds of particulate material, to produce a panel having a thickness of greater than ¼ inch, may be used in a 12 inch square mold, with the total amount evenly divided between the base and top layers of rigid particulate materials.

A fibrous core layer is then distributed over the top of the previously distributed layer of rigid material. Fibrous materials are preferably loose fibers distributed by hand over the rigid particulates; however, fibrous fabrics, netting-type materials or pre-formed fibrous mats may be used as the fibrous core. The fibrous layer will preferably be 10-15% by weight of the rigid material. In the preferred embodiment having an 8 ounce base layer of rigid particulates layered in a 12 inch square mold, the fibrous core would constitute 1.6-2.4 ounces of loose PET fibers evenly distributed over the rigid materials. Fibers are distributed evenly to the edges of the base layer of rigid materials in the mold, but preferably not beyond the rigid material to prevent migration of fibers during fusion.

Fibrous materials are evenly distributed over the surface of the rigid material base layer by hand distribution of loose fibers, by folding fabric or netting type materials to fit the dimensions of the mold or by placing a pre-shaped fibrous mat of the appropriate dimensions on top of the base layer of rigid material. The fibrous materials are placed over the rigid materials such that the fibrous materials are nearly to the edge of the mold, but preferably not contacting the edges of the mold. The fibrous layer can range from a very thin layer having numerous and/or large voids between the fibers (such as a single thickness of netting) up to a thickness of ¼ inch having few and/or very small voids between the fibers (such as a dense pre-formed mat) depending upon the intended end use of the panel. The fibrous layer can also be omitted altogether to make pre-formed blank panels.

A top layer of rigid material is applied over the top of the fibrous core material previously distributed as described above. The rigid materials of the top layer should completely cover the fibrous layer and contact the edges of the mold base. In the preferred embodiment having a base layer of 8 ounces of rigid particulate material in a 12 inch square mold and a fibrous core layer of 1.6-2.4 ounces of loose fibers, eight ounces of rigid particulate material is evenly distributed over the surface of the fibrous core layer.

A top mold plate is situated over the loaded base mold. The top mold plate will be in contact with the top layer of rigid material. The "sandwich" of materials, having a mold base, a rigid particulate base layer, a fibrous core layer, a rigid particulate top layer and a mold top plate, is now ready for loading into the thermoforming press. The cross-section of the "sandwich" is shown in FIG. 23 after rigid and fibrous materials are distributed in the mold.

The process then proceeds to step 2111 where the fusion step is conducted. First, in step 2112, the platen is loaded with molds that have been filled. Filled molds are loaded onto the platens of the thermoforming press. Preferably the platens have been preheated to prior to placing the molds in the press. Molds are centrally placed on the lower heated platen of the thermoforming press to ensure uniform fusion of materials within the mold.

Figure 14D:
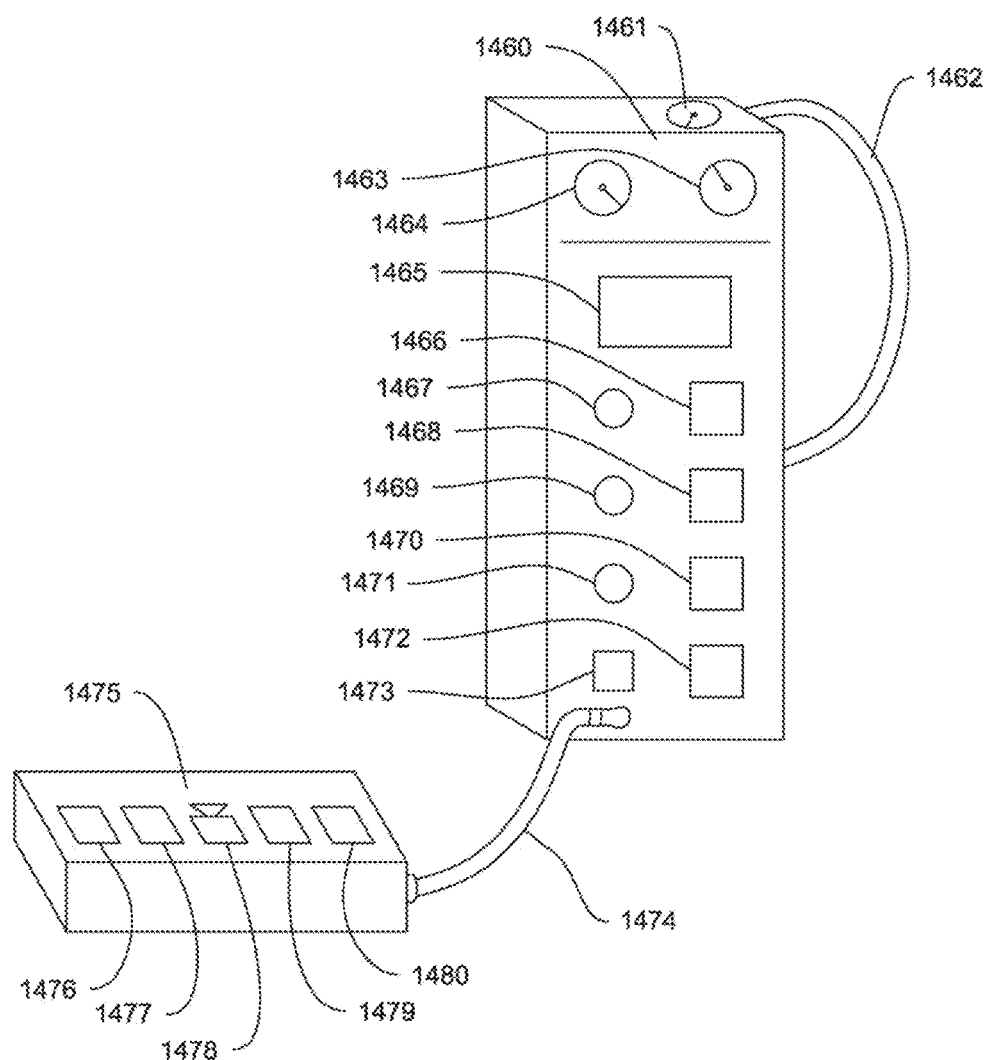

Heat and pressure parameters are selected in step 2113 using the control panel shown in FIG. 14B or 14D. Pressure, heat and processing time are selected based on the vicat softening point of the materials, but sufficient for fusing the materials loaded in the mold is selected on the control panel of the thermoforming press. The vicat softening point is the temperature where materials with no definite melting point, such as plastics, will become viscous enough to flow, sometimes referred to as the melt-flow temperature. Materials at the vicat softening point are able to flow under pressure to fill voids between the layers used in preparing the claimed thermoformed panels.

The vicat softening point of the rigid particulate material is preferably used to determine the processing parameters. Alternatively, the vicat softening point of the fibrous core is used to determine the processing parameters. The preferred rigid material, ABS plastic, has a vicat softening point of approximately 212° F./100° C. to 248° F./120° C. Alternative rigid materials that may be used have different vicat softening points. The average vicat softening point for polystyrene is approximately 217° F./102.5° C. The average vicat softening point for polyethylene is approximately 261° F./127.3° C. The average vicat softening point for polypropylene is approximately 305° F./152.2° C. For processing the preferred ABS plastic rigid material, the preferred parameters are a temperature of approximately 400° F., with pressure of 1500-2500 psi applied for 100-130 seconds.

The vicat softening point is the temperature at which the material is softened, but not melted, or flowing, or liquefied. The vicat softening point for any given material is dependent on the thermal conductivity of the given materials, where the thermal conductivity is the quantity of heat transmitted through a unit thickness in a direction normal to a surface of unit areas.

Thermal conductivity is measured by a thermal conductivity coefficient K, where higher K numbers show greater conductivity of heat through the material versus absorption of heat to a melting point. For instance, the thermal conductivity coefficient K for metals and dense materials is as follows (at 25° C.): (1) Aluminum 205, (2) Aluminum Oxide 30, (3) Asbestos cement 2.07, (4) Beryllium 218, (5) Brass 109, (6) brick dense 1.31-1.6, (7) Bronze 110, (8) Cadmium 92, (9) Carbon 1.7, (10) Cement, mortar 1.73, (11) Chrome Nickel Steel 16.3, (12) Chromium 94, (13) Cobalt 69, (14) Concrete (dense) 1.0 to 1.8, (15) Copper 401, (16) Carbon Steel 54, (17) Diamond 1000, (18) Earth (dry) 1.5, (19) fireclay brick 1.40, (20) Gold 310, (21) Granite 1.7 to 4.0, (22) Ice 2.18, (23) Iridium 147, (24) Iron 80, (25) Limestone 1.26-1.33, (26) Magnesium 156, (27) Marble 2.08 to 2.94, (28) Nickel 91, (29) Platinum 70, (30) Porcelain 1.5, (31) Rock (solid) 2-7, (32) Sand 2 to 4, (33) Silver 429, (34) Slate 2.01, (35) Sodium 84, (36) Steel 43, (37) Stainless Steel 16, (38) Titanium 22, (39) Tungsten 174, (40) Zinc 116.

The thermal coefficients K at 25° C. below a one (1) value compose a majority of preferred materials for use in the present invention, include: (1) Acetone 0.16, (2) Acrylic 0.2, (3) Asbestos fiber 0.15, (4) Asphalt 0.75, (5) Bitumen 0.17, (6) Calcium Silicate 0.05, (7) Chalk 0.09, (8) Diatomaceous earth (sil-o-cel) 0.06, (9) Diatomite 0.12, (10) Epoxy 0.35,

(11) Felt insulation 0.04, (12) Fiberglass 0.04, (13) Fibre insulating board 0.048, (14) Fibre hardboard 0.2, (15) Glass window 0.96, (16) Glycerol 0.28, (17) Gravel 0.7, (18) Gypsum board 0.17, (19) Hardboards 0.15, (20) Hardwood 0.16, (21) Insulation materials 0.035 to 0.16, (22) Magnesia insulation 0.7, (23) Mica 0.71, (24) Nylon 6 0.25, (25) Paper 0.05, (26) Plaster 0.71 to 0.2, (27) Plastics 0.03, (28) Plywood 0.13, (29) Paraffin wax 0.25, (30) Polyester 0.05, (31) Polyethylene HD 0.42-0.51, (32) Polypropylene 0.1 to 0.22, (33) Polystyrene 0.03, (34) Polystyrol 0.043, (35) Polyurethane foam 0.03, (36) PTFE 0.25, (37) PVC 0.19, (38) Rubber 0.13, (39) Wood 0.042 to 0.039, (40) Silica 0.02, (41) Teflon 0.25, (42) Vinyl ester 0.25, (43) Wood 0.17 to 0.05.

By combining materials with differing melting/vicat softening points in a layered sequence, the invention method and system uses the differential of thermal gradients of materials under heat and pressure to form a consolidated product. For instance, one preferred embodiment utilizes the differential between certain materials' melt-point(s), said different material(s) thermal-mass, thermal-energy-density, thermal-energy gradient(s) and structural integrity I stability in said material(s) in the individual near-melt-point range vis-a-vis pressure-heat ratio. That is, in this embodiment, a first material A has a melt-point of X, and a second material B has a melt-point of X+1, and a third material has a melt-point of X+2, for a given 'pressure.' Material C is placed in the thermoform press, followed by material B placed on top of material A, followed in turn with the placement of material A on top of material B. For a given 'pressure', with the addition of thermal-energy, A will reach its melt-point before B & C. If not constrained, material A will 'flow' past material B and co-mingle with material C. The addition of more thermal-energy will then cause material B to reach its melt-point and, if not constrained, will co-mingle with the mixture of A & C.

If material C is recycled nylon-fiber thread, and material B is recycled post-consumer electronic-waste Acrylonitrile butadiene styrene (ABS) plastic and material A is white (translucent) High Impact Polystyrene (HIPS) then the resultant product is as referenced above. That is, a structural composite consisting of unmelted nylon-fiber thread encased in ABS plastic which in turn is encased in white (translucent) HIPS.

A further refinement specific to this alternative preferred embodiment, utilizes pre-heating the nylon-fiber providing a thermal-mass lower than the nylon-fiber's melt-point but higher than the ABS melt-point. This configuration allows the on-set of ABS melt while the ABS insulates the HIPS material. Addition of thermal-energy and pressure causes the ABS to flow and encase the nylon before the HIPS melt-point is reached.

Specific to the configurations referenced above, the resultant product has nylon-fiber density concentrated on the structural-composite element's side opposite to the element's concentration of HIPS on the other side. As such, in an application wherein the structural-composite element is subject to a bending-moment, such as but not limited to, shelving, with the HIPS surface up and the nylon-fiber concentrated surface down, the tensile strength of the nylon-fiber will allow for a thinner panel than otherwise.

Further, it has been observed that due to the migration of the plastic flowing into and throughout the nylon-fiber, due in part to the pressure aspects of the thermoforming process, said nylon-fiber(s) are straightened and stretched out. Said tensioning of said nylon-fiber(s) becomes 'locked' if the plastic is allowed to fully solidify before said pressure is released. The said pre-tension-ing of the nylon-fiber and the resultant pre-compressing of the plastic allows for higher than otherwise tensile loads on the plastic items of the present invention's structural-composite.

Specific to that configuration referenced above in this alternative preferred embodiment, utilizing the process of pre-heating the nylon-fiber providing a thermal-mass lower than the nylon-fiber's melt-point but higher than the ABS melt-point, in conjunction with or alternatively as a separate function, the HIPS material may be pre-chilled so as to delay the on-set of the HIPS thermal-gain and it reaching its melt-point.

In the configurations set forth above, the referenced nylon-fiber may be substituted with fiberglass and or carbon-fiber and or like materials. Such substitutions, in addition to the originally mentioned nylon, may be used in different geometrical configurations, such as but not limited to screens, grating, or other micro-structural shapes.

Another alternative preferred embodiment utilizes the differential between certain materials' melt-point(s) and the requirement of well designed structural-composites for shear transfer between opposing extreme fibers such that, if tensile-tear is optimal, shear strength, for a given composite is greater than compressive strength which in turn is greater than the composite's tensile strength. It being a given that most recycled plastic composites structurally fail catastrophically in compression and most strata or laminates catastrophically fail in either compression or shear or both.

This alternative preferred embodiment utilizes melt-point differentials. Specific examples for the referenced embodiment may include polyethylene terephthalate (PET), Nylon-fiber & acrylonitrile butadiene styrene (ABS). Under atmospheric pressure, PET melts at +/−480 degrees F., while Nylon-fiber melts at +/−500 degrees F. and ABS melts at +/−220 degrees F. It should be kept in mind that thermoforming pressures, usually, significantly, reduce melt-points and the use of recycled materials usually have some 'contaminates' which will move individual melt-points.

To achieve the desired structural-composite characteristics of a failure-mode based on tensile-tear, rather than catastrophic compressive or shear failure, a determination is made to the quantity of nylon-fiber at the extreme-fiber and the distance to the neutral axis, in the case of bending moment. The distance from the extreme-fiber to the neutral axis determines the thickness of the composite's core material which in this example consists of the high melt-point recycled PET. To provide the significant shear transfer, between extreme-fibers, required the referenced PET material is presented to the thermoforming process with passages which will allow migration, during the thermoforming process, of the nylon-fibers which will sandwich the PET materials. Said migration of the nylon-fibers will be encouraged by the melt of ABS material which will sandwich the nylon-fibers and the PET core materials.

Ingress of the nylon-fibers, through the referenced PET material core's passages, put said migrated nylon-fibers in shear with the application of a bending-moment on this embodiment of the present invention. It can be seen that to achieve this embodiment the operating temperature and pressure of the thermoform process need only be such as to melt and cause flow of the lower melt-point ABS material.

There are seven different identified types of plastic usually involved in recycling activities plus a number of other types of plastics and materials frequently encountered in co-mingled waste-streams. Some of these, but not limited to, materials addressed in the present invention are: (1) Polyethylene Terephthalate (PET)—typical melt-point range +/−490 F to 510 F (255 C to 265 C) PET density is greater than water. Recycled PET is frequently used in such items such as textiles, carpets, fiber fillings for apparel, audio cassettes, soft drink bottles, water bottles, plastic jars, and some plastic wrappings, (2) High-Density Polyethylene (HDPE)—typical melt-point range +/−250 F to 275 F (120 C to 137 C). HDPE is frequently used in plastic milk cartons, juice and liquid detergent containers. Recycled HDPE is used in such items as plastic pipes, agricultural and plant containers, trash cans and buckets, (3) Vinyl/Polyvinyl Chloride (PVC)—typical melt-point range +/−212 F to 500 F (100 C to 260 C). PVC is frequently used in piping, liquid detergent containers, food wrappings and blister packaging. (4) Low-Density Polyethylene (LDPE)—typical melt-point range +/−257 F to 278 F (125 C to 137 C). LDPE is frequently used in plastic bags and garment bags. Recycled LDPE is frequently used in plastic trash bags, plastic tubing and plastic lumber. (5) Polypropylene (PP)—typical melt-point range +/−320 F to 330 F (160 C to 165 C). PP is frequently used in the automotive industry, also for bottle tops, battery casings and carpets. (6) Polystyrene (PS)—typical melt-point range +/−365 F to 500 F (180 C to 260 C). PS is frequently used in meat packing, protective packing and packing foam. (7) OTHER: Usually layered or mixed plastic. Common examples are headlight lenses and safety glasses; No recycling potential-must be landfilled. (8) polyvinyl alcohol (PVA)—typical melt-point range +/−356 F to 374 F (180 C to 190 C). (9) Acrylonitrile butadiene styrene (ABS)—typical melt-point range +/−218 F to 260 F (103 C to 128 C). (10) High impact polystyrene (HIPS)—typical melt-point range +/−392 F to 500 F (200 C to 260 C). (11) polylactide (PLA)-typical melt-point range +/−302 F to 320 F (150 C to 160 C). (12) Nylon—typical melt-point range +/−428 F to 510 F (220 C to 265 C). (13) Polycarbonate (PC)—typical melt-point range +/−510 F (+/−265 C). (14) Acrylic—typical melt-point range +/−572 F to 600 F (+/−300 to 315 C). (15) Fiberglass—typical melt-point range +/−2075 F (+/−1121 C).

By mixing and matching these materials, one can achieve a thermoformed structural-composite construct comprising a first material having a first melting pointing having a first thermal mass, first thermal energy density, first thermal-energy gradient, and first structural integrity and a second material having a second melting pointing having a second thermal mass, second thermal energy density, second thermal-energy gradient, and second structural integrity. This construct has the first and second materials combined under heat and pressure by utilizing the differential between said first and second materials' melting points, thermal-mass, thermal-energy-densities, thermal-energy gradients and structural integrities in the individual near-melt-point range vis-a-vis pressure-heat ratio to produce and solidify the materials together. One of said materials include one of the following: phase-separated mixtures, immiscible blends, Polyethylene Terephthalate (PET), or poly(vinyl alcohol) (PVA). And, one of said materials can include polymer originating from waste streams of various origins, cellulose acetate materials from cigarette filters, or packaging fillings. One of the materials can also include one of the following: High-Density Polyethylene (HDPE), Vinyl/Polyvinyl Chloride (PVC), Low-Density Polyethylene (LDPE), Polypropylene (PP), Polystyrene (PS), Acrylonitrile butadiene styrene (ABS), High impact polystyrene (HIPS), polylactide (PLA), Nylon, Polycarbonate (PC), Acrylic, or Fiberglass.

The materials used in the process include one of the following: thermoset epoxies, thermoset polyesters, thermoset silicones, thermoset phenolics, vulcanized rubber, polyoxybenzylmethylenglycolanhydride (bakelite), cross-linked polyethylene (PEX), Polyurethane (PU), carbon fiber, flame retardant plastics, fiber reinforced plastics. Also, the materials used in the invention are one of the following: glass filled plastics, cured silicone, mixed plastics, metals, paper, or shape memory plastics (SMP), or pigments, inks, adhesives, chlorine, styrene, and Olefin. Often times, these materials include engineered grade plastics recovered from electronic waste, electrical waste, and automotive waste, or are recycled thermoplastics, thermoset plastics, and non-plastic materials.

The materials are directly reduced from a grind-state to one or more of the following states: film-state, sheet-state, plate-state, laminate film-state, laminate sheet-state, laminate plate-state. The materials are reinforced via fibers, tensioned during the manufacture of said composite, or tensioned during the manufacture of said composite. Once placed in a proper state, the invention is a method of making a thermoformed structural-composite construct comprising the steps of: providing a first material having a first melting pointing having a first thermal mass, first thermal energy density, first thermal-energy gradient, and first structural integrity, providing a second material having a second melting pointing having a second thermal mass, second thermal energy density, second thermal-energy gradient, and second structural integrity, combining under pressure and heat said first and second materials, said combination uses the differential between said first and second materials' melting points, thermal-mass, thermal-energy-densities, thermal-energy gradients and structural integrities in the individual near-melt-point range vis-a-vis pressure-heat ratio to accomplish the combination step; configuring the combination of said first and second materials for a predetermined use.

The materials used in the method include the itemized materials set forth above, but can also include reinforced fibers tensioned during the manufacture of said composite or tensioned during the manufacture of said composite.

In the processing steps, the platens are heated during processing step 2114 to temperatures up to 500° F. The application of pressure in combination with the heat of the platens will raise the temperature of the compressed materials to the temperature needed to achieve vicat softening of the materials inside the mold. Pressures of 1500-3600 psi are applied to the molds.

Processing times from 90-150 seconds are required to achieve fusion of materials at the selected pressure and temperature. The processing time is determined by how long it takes to reach the temperature and pressure needed to allow the materials to flow through the layers within the mold. Excessive dwell times (the time the materials are held under heat and pressure after reaching vicat softening) will have a detrimental effect of the surface of the panel due to degradation of the materials. Dwell times should be less than 90 seconds.

In step 2114, a thermoforming press, such as in FIG. 14A and FIG. 14C, is actuated to apply the selected heat and pressure to the loaded mold. The hydraulic system of the press raises the bolsters applying pressure to the mold situated between the platens. The platens are heated to raise the selected temperature to the vicat softening point of the rigid materials within the mold. Pressure and temperature are held for a pre-determined amount of time needed to achieve fusion. When the processing time has elapsed, the heating is discontinued and the pressure is released by lowering the bolster plates to separate the platens and release the mold.

The next step in the process is in cooling step performed in step 2115. After the pressure is released from the mold by lowering the bolster plates with the hydraulic cylinder, the mold is removed from the heated platens and prepared for cooling. Molds must be cooled in step 2117 prior to removing the thermoformed panel from the mold. Cooling means are used to decrease the temperature of the materials in the mold below the vicat softening point and to near the ambient temperature before removing the panels to minimize warping of the panels.

Molds may be cooled by one or more means to achieve the temperature necessary to prevent warping of the thermoformed panels. Cooling continues until the center area of the fused materials in the mold has cooled to ambient or near ambient temperatures for unmolding. The preferred means of cooling the molds post-thermoforming shown in step 2118 employs a combination of cooling platens and air cooling until the interior of the fused material has reached ambient temperature. Molds are placed between cooling platens of the thermoforming press and cooled water is circulated through the cooling platens while air is blown over the molds.

Preferably, pressure of approximately 500 psi is applied to the cooling platens during the cooling process. Pressure applied to the cooling platens during the cooling process minimizes the possibility of warping of panels. Alternatively, pressures of 0 psi to 2500 psi are applied to the cooling platens during the cooling period.

Preferably, air at ambient temperature is blown over the molds during the cooling period while the molds are in the cooling platens. Air blowing over the molds in the cooling platens accelerates the cooling process. Alternatively, chilled air is blown over the molds.

Preferably, molds remain in the cooling platens with air cooling for approximately 3 minutes for a panel formed from particulate ABS rigid materials having a final panel thickness of ¼ inch. Thicker panels will require more cooling time and thinner panels will require less time. Starting with smaller rigid particulates will require more cooling time to prevent warping of the panels than using larger particles. Alternative cooling times can range from 1 minute for flash cooling (rapid cooling at temperatures below freezing) of a panel that is less than ¼ inch thick and up to 24 to 72 hours for a greater than ½ inch thick panel that is air cooled entirely at ambient temperature.

Alternative means may be employed to cool the thermoformed panels in step 2118 before unmolding. The molds may be removed from the press and air-cooled by blowing a fan over the removed mold or removed molds may be allowed to cool to ambient temperature without use of a fan. Molds may be cooled by placing the mold between cooled pinch rollers or by submersion in a chilled water bath. Combinations of the cooling methods may be selected based on the final thickness of the panel and the vicat softening point of the rigid materials.

The final processing step 2119 is then conducted. Following the cooling stage, the thermoformed panels are removed from the molds and final processing will prepare the panels for use in step 2119.

Panels are removed from molds following cooling in step 2120. Additional air-cooling or water-bath cooling to reduce panels to ambient air temperature or below may be used after unmolding. Panels may be stacked following unmolding to allow for additional crystallization time.

Preferably, ¼ inch thick thermoformed ABS panels are allowed to sit for 24 hours at ambient air temperature after unmolding to ensure complete crystallization of fused materials before trimming and packaging. Panels are preferably stacked after unmolding to allow the passive pressure supplied by the weight of the stacked panels to prevent warpage during crystallization. Additional flat weights of approximately the weight of the panels can be added to the top of the stacked panels.

Alternatively, panels thinner than ¼ inch are allowed sit for 1-8 hours after unmolding and are preferably stacked to allow the passive pressure supplied by the weight of the stacked panels to prevent curling of the edges during crystallization. Panels thicker than ¼ inch are allowed to sit for 24-72 hours after unmolding and may be stacked or unstacked during crystallization. A fan can be used to assist in air-cooling the panels, or unmolded panels may be submerged in cool water to assist cooling.

In step 2121, edges of removed panels may be trimmed to remove fibers that migrated from the edges during fusion. Panel surfaces may be lightly sanded to remove particles that have risen on the panel surface after unmolding. Panels may be cleaned to remove any dust from the panel surface or any releasing agent that was used in the mold.

Preferably, ABS panels are trimmed by hand to remove migrated fibers from the edges and to achieve final product size before packaging. Alternatively, panels are trimmed in a cutting press or by other mechanized cutting means to achieve a specified size, or are left untrimmed for sizing at the point of use. ABS panels are preferably wiped with a cloth to remove dust from the surface of the panel. Alternatively, panels are lightly sanded with high-grit sand paper to remove raised areas that appeared after unmolding. After any necessary trimming and cleaning thermoformed panels are packaged for distribution to end user. Packaging may be by boxing, bagging, stretch wrapping, vinyl heat wrapping, or other means suitable for packaging flat panels. The finished panels are shown in FIGS. 25-31.

All of the examples set forth below are used to produce floor tiles and signage. The produced signage and floor tiles are produced as blanks that can be polished, sanded and painted for particular uses. Gloss finishes may improve adhesion of paints or glues. There are also applications available to anti-ballistic composite materials that do not degrade like Kevlar (susceptible to degradation with exposure to arid or moisture). Kevlar fibers and material can be used in the process filler/middle layers of the present invention to produce a significantly improved antiballistic composite. Also, plastic or metal sheeting may be placed on one or more surfaces of the floor tile, signage or antiballistic blanks to improve product strength, flexibility and product longevity.

Example 1

ABS and a fibrous PET combination to produce a ¼ inch thick 12 inch square panel with a matte surface.

1. Selection of mold: An aluminum mold with a 12 inch by 12 inch by 0.125 inches fillable mold area and having a matte interior surface is selected. The mold selected is able to withstand pressures exceeding 4,000 lb/sq. in. and temperatures up to 500° F. Alternatively, the mold may have dimensions of 12×15, 12×18, 8×8, or 13×4. The mold is lubricated to prevent sticking of the final product. Lubricants include Spray McLube 17006.

2. Application of rigid material for base layer: A base layer of approximately 8 ounces of ground ABS (acrylonitrile butadiene styrenic) having an average particle size of less than ¹⁄₁₆ of an inch is evenly distributed in the mold using a funnel drop mechanism able to distribute free-flowing dry particles. The ABS material has ideally been reclaimed from electronic waste which has been previously pulverized to achieve the preferred particle size.

3. Application of fibrous core material: A core layer of approximately 2 ounces of loose fibrous PET (polyethylene terephthalate) is placed over the previously applied ABS layer such that the ABS is completely covered by the fibrous material and only small voids are visible in the fibrous layer. The PET fibrous material in the fibrous layer has ideally been reclaimed from deconstructed carpet fibers.

4. Application of rigid material for top layer: A top layer of approximately 8 ounces of the same ABS materials used in the base layer is distributed uniformly over the fibrous material using a similar funnel drop apparatus to create a continuous layer of ABS particles completely covering the fibrous core materials.

5. Fitting of top mold plate: A mold plate having the same characteristics as the base mold used is placed over the top layer of ABS material.

6. Placement of loaded mold in thermoforming press: The loaded mold is placed on the lower platen of the thermoforming press which has been preheated to 100° F./38° C. and the hydraulic system of the press is activated to raise the lower platen until the upper platen contacts the top mold plate.

7. Application of heat and pressure to loaded molds: The platens are electrically heated to approximately 400° F. and the thermoforming press is actuated to apply pressure of 1500-2500 psi for 100-130 seconds. This combination of temperature and pressure will allow the ABS materials to reach the vicat softening point and become viscous enough to flow around the PET fibers in the core material allowing the ABS and PET materials within the molds to fuse into a cohesive unit. Pressure is released after the appropriate time has elapsed.

8. Cooling and removal of finished panel: The molds are removed from the thermoforming press and placed between cooling platens until the fused materials reach ambient temperature—approximately 3 minutes. Cooling platens are cooled using circulating water and receive 500 psi of pressure during the cooling period. A fan assists with cooling by blowing ambient temperature air over the mold in the cooling platen. When fused materials in the mold reach ambient temperature, the molds are removed from the cooling platens, the fused materials are removed from the mold and the panel is stacked with other panels. The stacked panels are held at ambient temperature for 24 hours to complete crystallization of the fused materials prior to further processing or shipping. The fully cooled panel is wiped with a cloth to remove dust and the edges are trimmed to remove loose fibers. The finished product is an approximately ¼ inch thick 12 inch square panel weighing slightly over 1 pound having a matte surface suitable for painting.

Example 2

ABS and Sinker combination to produce a ¼ inch thick 12 inch square panel with a matte surface.

1. Selection of mold: An aluminum mold with a 12 inch by 12 inch fillable mold area and having a matte interior surface is selected. The mold selected is able to withstand pressures exceeding 4,000 lb/sq. in. and temperatures up to 500° F. Alternatively, the mold may have dimensions of 12×15, 12×18, 8×8, or 13×4. The mold is lubricated to prevent sticking of the final product. Lubricants include Spray McLube 17006.

2. Application of rigid material for base layer: A base layer of approximately 3 ounces of pulverized and ground ABS (acrylonitrile butadiene styrenic) having an average particle size of less than 1/16 of an inch is evenly distributed in the mold using a funnel drop mechanism able to distribute free-flowing dry particles. The base layer may include weights of 3-12 ozs. of ABS materials. The ABS material has ideally been reclaimed from electronic waste which has been previously pulverized to achieve the preferred particle size.

3. Application of Sinker material: A core layer of approximately 8 to 36 ounces of loose Sinker material is placed over the previously applied ABS layer such that the ABS is completely covered by the Sinker material and only small voids are visible in the fibrous layer. The Sinker material in the middle layer has ideally been reclaimed from deconstructed PET materials, namely, washed, dried and roughly ground PET bottles, filled PP, or PVC materials. These materials have a specific gravity of more than 1.0. The middle layer may use a combination of Sinker and bulk ground ABS materials.

4. Application of rigid material for top layer: A top layer of approximately 3 ounces of the same ABS materials used in the base layer is distributed uniformly over the fibrous material using a similar funnel drop apparatus to create a continuous layer of ABS particles completely covering the sinker materials. The top layer may include weights of 3-12 ozs. of ABS material.

5. Fitting of top mold plate: A mold plate having the same characteristics as the base mold used is placed over the top layer of ABS material. This top plate can be a flat aluminum sheet.

6. Placement of loaded mold in thermoforming press: The loaded mold is placed on the lower platen of the thermoforming press which has been preheated to 315° F. and the hydraulic system of the press is activated to raise the lower platen until the upper platen contacts the top mold plate. The pre-heat time may be approximately 150 seconds, with such pre-heating being done between 100 seconds to 200 seconds. Pre-heating is done at 100 psi to reach a temperature of approximately 315° F. The pressure can range from 50 psi to 500 psi, and the pre-heat temperature can range from 200° F. to 500° F.

7. Application of heat and pressure to loaded molds: The platens are electrically heated to approximately 315° F. and the thermoforming press is actuated to apply pressure of 2200 psi (could range from 1500-3500 psi) for 45 seconds. The time range could vary from 30 to 150 seconds. This combination of temperature and pressure will allow the ABS materials to reach the vicat softening point and become viscous enough to flow around the sinker materials in the core material allowing the ABS and PET materials within the molds to fuse into a cohesive unit. Pressure is released after the appropriate time has elapsed.

8. Cooling and removal of finished panel: The molds are removed from the thermoforming press and placed between cooling platens until the fused materials reach ambient temperature—approximately 150 seconds, but could be a shorter time period or up to 3 minutes. Cooling platens are cooled using circulating water and receive 150 psi of pressure during the cooling period, but pressure could be greater (up to 500 psi) or lessened to 100 psi. A fan assists with cooling by blowing ambient temperature air over the mold in the cooling platen, when fused materials in the mold reach ambient temperature or less up to 74° F., the molds are removed from the cooling platens, the fused materials are removed from the mold and the panel is stacked with other panels. The stacked panels are held at ambient temperature for 24 hours to complete crystallization of the fused materials prior to further processing or shipping. The fully cooled panel is wiped with a cloth to remove dust and the edges are trimmed to remove loose fibers. The finished product is an approximately ¼ inch thick 12 inch square panel weighing slightly over 1 pound (16.5 ozs.) having a matte surface suitable for painting or sanding and painting to a desired color.

Example 3

ABS and sinker combination to produce a ¼ inch thick 12 inch square panel with a matte surface.

1. Selection of mold: An aluminum mold with a 12 inch by 12 inch fillable mold area and having a matte interior surface is selected. The mold selected is able to withstand pressures exceeding 4,000 lb/sq. in. and temperatures up to 500° F. Alternatively, the mold may have dimensions of 12×15, 12×18, 8×8, or 13×4. The mold is lubricated to prevent sticking of the final product. Lubricants include Spray McLube 17006.

2. Application of rigid material for base layer: A base layer of approximately 2 ounces of pulverized and ground ABS (acrylonitrile butadiene styrenic) having an average particle size of less than 1/16 of an inch is evenly distributed in the mold using a funnel drop mechanism able to distribute free-flowing dry particles. The base layer may include weights of 3-12 ozs. of ABS materials. The ABS material has ideally been reclaimed from electronic waste which has been previously pulverized to achieve the preferred particle size.

3. Application of Sinker material: A core layer of approximately 8 to 36 ounces of loose Sinker material is placed over the previously applied ABS layer such that the ABS is completely covered by the Sinker material and only small voids are visible in the fibrous layer. The Sinker material in the in the middle layer has ideally been reclaimed from deconstructed PET materials, namely, washed, dried and roughly ground PET bottles, filled PP, or PVC materials. These materials have a specific gravity of more than 1.0. The middle layer may use a combination of Sinker and bulk ground ABS materials.

4. Application of rigid material for top layer: A top layer of approximately 4 ounces of the same ABS materials used in the base layer is distributed over the sinker using a similar funnel drop apparatus to create a continuous layer of ABS particles completely covering the sinker core materials. The top layer may include weights of 3-12 ozs. of ABS materials.

5. Fitting of top mold plate: A mold plate having the same characteristics as the base mold used is placed over the top layer of ABS material. This top plate can be a flat aluminum sheet.

6. Placement of loaded mold in thermoforming press: The loaded mold is placed on the lower platen of the thermoforming press which has been preheated to 315° F. and the hydraulic system of the press is activated to raise the lower platen until the upper platen contacts the top mold plate. The pre-heat time may be approximately 150 seconds, with such pre-heating being done between 100 seconds to 200 seconds. Pre-heating is done at 100 psi to reach a temperature of approximately 315° F. The pressure can range from 50 psi to 500 psi, and the pre-heat temperature can range from 200° F. to 500° F.

7. Application of heat and pressure to loaded molds: The platens are electrically heated to approximately 315° F. and the thermoforming press is actuated to apply pressure of 2500 psi (could range from 1500-3500 psi) for 45 seconds. The time range could vary from 30 to 300 seconds. This combination of temperature and pressure will allow the ABS materials to reach the vicat softening point and become viscous enough to flow around the sinker materials in the core material allowing the ABS and PET materials within the molds to fuse into a cohesive unit. Pressure is released after the appropriate time has elapsed.

8. Cooling and removal of finished panel: The molds are removed from the thermoforming press and placed between cooling platens until the fused materials reach ambient temperature—approximately 150 seconds, but could be a shorter time period or up to 3 minutes. Cooling platens are cooled using circulating water and receive 150 psi of pressure during the cooling period, but pressure could be greater (up to 500 psi) or lessened to 100 psi. A fan assists with cooling by blowing ambient temperature air over the mold in the cooling platen, when fused materials in the mold reach ambient temperature or less up to 74° F., the molds are removed from the cooling platens, the fused materials are removed from the mold and the panel is stacked with other panels. The stacked panels are held at ambient temperature for 24 hours to complete crystallization of the fused materials prior to further processing or shipping. The fully cooled panel is wiped with a cloth to remove dust and the edges are trimmed to remove loose fibers. The finished product is an approximately ¼ inch thick 12 inch square panel weighing slightly over 1 pound (16.5 ozs.) having a matte surface suitable for painting or sanding and painting to a desired color.

Example 4

ABS and high impact polystyrene (HIPS) combination to produce a 0.135 inch thick 12 inch square panel with a matte surface.

1. Selection of mold: An aluminum mold with a 12 inch by 12 inch Tillable mold area and having a matte interior surface is selected. The mold selected is able to withstand pressures exceeding 4,000 lb/sq. in. and temperatures up to 500° F. Alternatively, the mold may have dimensions of 12×15, 12×18, 8×8, or 13×4. The mold is lubricated to prevent sticking of the final product. Lubricants include Spray McLube 17006.

2. Application of ABS/HIP material for base layer: A base layer of approximately 19 ounces of ground ABS (acrylonitrile butadiene styrenic) and HIP (high impact polystyrene) having an average particle size of less than 1/16 of an inch is evenly distributed in the mold using a funnel drop mechanism able to distribute free-flowing dry particles. The amount may vary depending on the size of the mold, such as variations between 10 ozs. to 25 ozs. of ABS/HIPS material. The ABS/HIPS material has ideally been reclaimed from electronic waste which has been previously pulverized to achieve the preferred particle size.

3. Application of fibrous core material: This step is optional, but a core layer of approximately 2 ounces of loose fibrous PET (polyethylene terephthalate) is placed over the previously applied ABS layer such that the ABS is completely covered by the fibrous material and only small voids are visible in the fibrous layer. Instead of 2 ozs. of fibrous material, the amount of such material may vary depending on the size of the mold. The PET fibrous material in the fibrous layer has ideally been reclaimed from deconstructed carpet fibers, but one may substitute sinker material taken from reclaimed and roughly ground PET bottles.

4. Application of rigid material for top layer: This step is also optional, but a top layer of approximately 8 ounces of the same ABS/HIPS materials used in the base layer is distributed uniformly over the fibrous material using a similar funnel drop apparatus to create a continuous layer of ABS particles completely covering the fibrous core materials. The amount of this layer of ABS/HIP material can vary between 2 to 15 ozs.

5. Fitting of top mold plate: A mold plate having the same characteristics as the base mold used is placed over the top layer of ABS material. This top plate may be a flat aluminum sheet.

6. Placement of loaded mold in thermoforming press: The loaded mold is placed on the lower platen of the thermoforming press which has been preheated to 315° F. and the hydraulic system of the press is activated to raise the lower platen until the upper platen contacts the top mold plate. The pre-heat time may be approximately 150 seconds, with such pre-heating being done between 100 seconds to 200 seconds. Pre-heating is done at 100 psi to reach a temperature of approximately 315° F. The pressure can range from 50 psi to 500 psi, and the pre-heat temperature can range from 200° F. to 500° F.

7. Application of heat and pressure to loaded molds: The platens are electrically heated to approximately 315° F. and the thermoforming press is actuated to apply pressure of approximately 2500 psi for 90 seconds. The time of the application can vary between 45 to 180 seconds, and the applied pressure can vary between 1500 to 3100 psi. This combination of temperature and pressure will allow the ABS/HIPS materials to reach the vicat softening point and become viscous enough to flow around the ABS/HIPS in the core material allowing the ABS and PET materials (or sinker materials) within the molds to fuse into a cohesive unit. Pressure is released after the appropriate time has elapsed.

8. Cooling and removal of finished panel: The molds are removed from the thermoforming press and placed between cooling platens until the fused materials reach ambient temperature of 78° F.—approximately 150 seconds (but could vary between 75 to 225 seconds). Cooling platens are cooled using circulating water and receive 2500 psi of pressure during the cooling period, but could receive pressure of 1500 psi to 3500 psi. A fan assists with cooling by blowing ambient temperature air over the mold in the cooling platen. When fused materials in the mold reach ambient temperature of approximately 78° F., the molds are removed from the cooling platens, the fused materials are removed from the mold and the panel is stacked with other panels. The stacked panels are held at ambient temperature for 24 hours to complete crystallization of the fused materials prior to further processing or shipping. The fully cooled panel is wiped with a cloth to remove dust and the edges are trimmed to remove loose fibers. The finished product is an approximately 0.135 inch thick 12 inch square panel weighing varying based on impact 13.5 (or weights) having a matte surface suitable for painting or sanding and painting to desired color.

Figure 22:
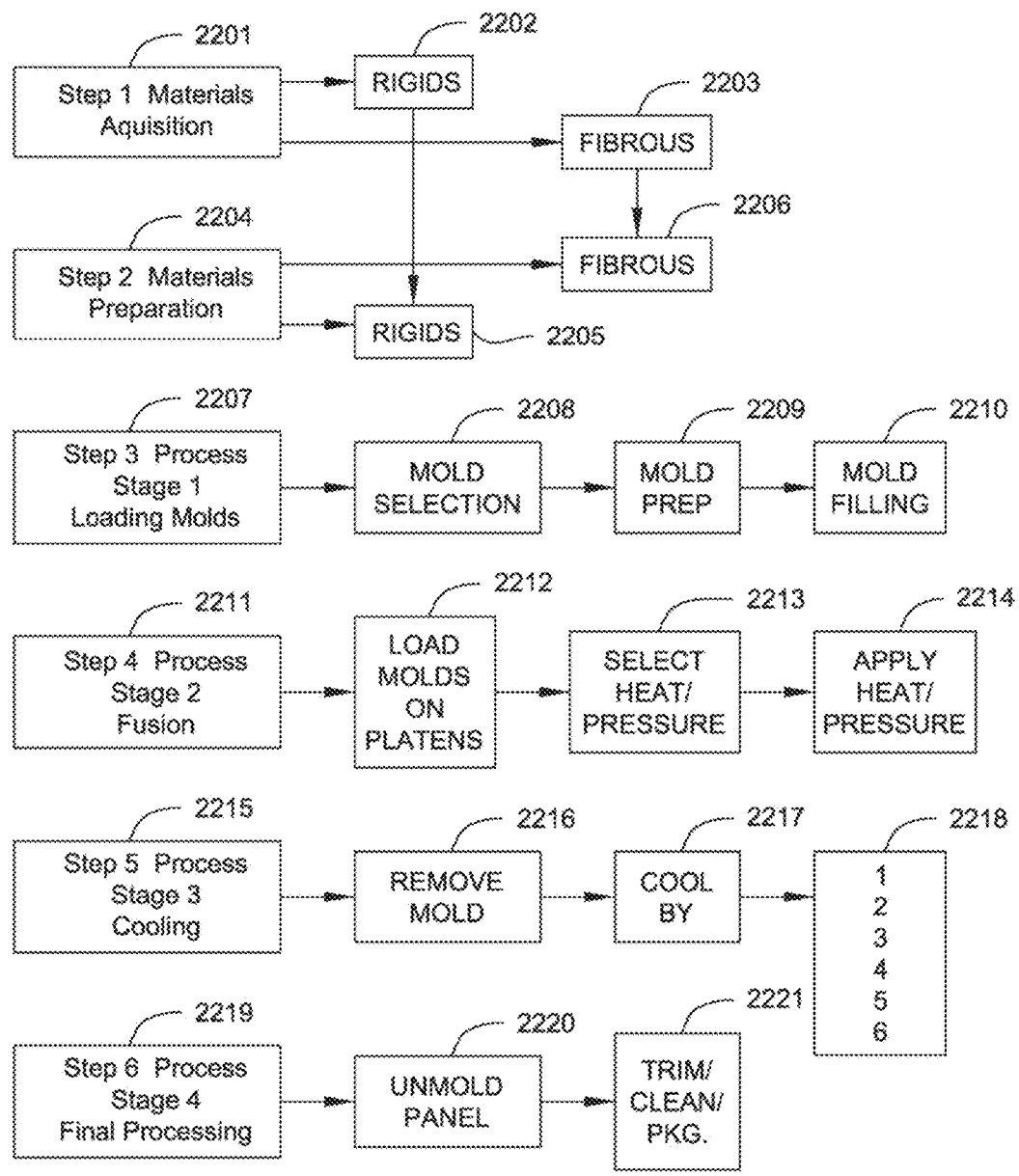
FIG. 22 shows a flow chart for one embodiment of the process in the present invention.

FIG. 22 is a flowchart of the process for making thermoformed structural composites using pre-formed blanks for the rigid materials in the base and top layers of the composite panel and having a fibrous core mat between the base and top layers of rigid blanks. The use of pre-formed rigid blank panels is particularly advantageous for making thick panels. Thin (less than ¼ inch thick) pre-formed panels can be used as the outside layers for panels having a final thickness of ¼ inch and thicker panels (having a thickness ¼ inch or more) can used in preparation of panels with thicknesses of greater than ½ inch. There is more flexibility is in selecting a final panel thickness. Less heat may be required since the pre-formed panels are already fully fused and less energy is needed to fuse the pre-formed panels with the fibrous core layer.

Rigid materials 2202 and fibrous materials 2203 useable for thermoforming panels are acquired for use in forming composite panels in step 2201. Two types of materials are utilized in formation of composite panels. Rigid materials are used for forming the exterior portions of the panels and fibrous materials are used as a core filling material.

Rigid materials are acquired in step 2202, and these rigid materials are preferred to be rigid plastics. Rigid plastics acquired in step 2202 are generally defined as polymer based materials holding a finite shape and having a low degree of flexibility whether the plastic article is full or empty, supported or freestanding. These properties make rigid plastics suitable for use as the hardshell casing or exoskeleton of the thermoformed panels of the invention. Acrylonitrile butadiene styrene (ABS) is the preferred rigid material (2202) for use in the invention.

Alternatively, engineered plastics and non-olefin materials, such as styrenic polymers, and polymers with low viscosity may be used. High-density polyethylene (HDPE), low-density polyethylene (LDPE), polypropylene (PP) and polyethylene (PE) may be used. Olefin materials with high melting points may be used for some limited applications. Mixed plastic materials, non-plastic type materials, such as rubbers and non-polymer materials like glass and mineral based materials may be used as fillers or additives.

Rigid materials used for the claimed process are acquired in step 2202 from post-consumer plastics, post-industrial plastics, and virgin plastics. Post-consumer ABS plastics are the preferred rigid material for the invention. Post-consumer plastics include such materials as electronic waste, automobiles, appliances, toys, pill bottles, and food containers. Post-consumer plastics having mineral, paper or glass contaminants are useable in the thermoformed panels of the invention Alternatively, post-industrial plastics including scraps and waste leftover from manufacturing processes or virgin plastics materials which are unprocessed and have not been used in manufacturing a product may be used.

Fibrous materials are acquired in step 2203 for use as the core layer of the composite panels are preferably man-made fibrous materials made through extrusion processes, such as fibers used in carpeting or clothing. Polyethylene terephthalate (PET) fibers are acquired in step 2203 and are preferred as the core layer for the thermoformed panels of the invention.

Other man-made fibers having a base of nylons, polyesters, polyethylene terephthalate (PET), poly 1,4-benzamide (BPA), poly-paraphenylene terephthalamide (Kevlar-type), biaxially-oriented polyethylene terephthalate (BOPET also known as Mylar) or polyamides may also be used for the thermoformed panels of the invention. Fibers may be combined or coated with acrylics, glass, mineral fillers or binders. The fibers may also contain an olefin component. Olefins having low melting points are not preferred, and materials deemed toxic are not suitable. Alternatively, cotton or other natural fibers may also be utilized as the fibrous component of the claimed process.

Fibrous materials reclaimed from carpets are preferred for the thermoformed panels of the invention. These fibrous materials are acquired as carpet fibers from shredded or otherwise deconstructed carpet. Alternatively fibers from clothing or other textiles, or fabric fibers reclaimed from fiber dominated products such as cleaning cloths, disposable gowns, diapers, pads or other healthcare textiles may be used as the fibrous core material of thermoformed panels.

Rigid materials acquired in step 2202 and fibrous materials acquired in step 2203 are prepared for use in a thermoformed composite panel in step 2204.

Rigid pre-formed blanks (2205), preferably of ABS plastics, are prepared in step 2205. These rigid blanks are pressed in presses from FIG. 14A-14D to rigid planes of material from size reduced rigid materials. Preferably pre-formed rigid blanks are ⅛ inch to ¼ inch thick. Alternatively, pre-formed rigid blanks may be from 1/16 inch thickness to ½ inch thickness, but are formed from pressing the rigid particles materials described above in presses such as shown in FIGS. 14A-D.

In step 2205, rigid materials, preferably ABS plastics are prepared for use in the method by reducing the size of the plastics to particulate sizes for subsequent dispersal into molds. Size reduction of the particles improves the overall process by reducing the amount of energy needed for fusion, by reducing the amount of pre-heating needed and by reducing the overall processing time. Reduced size particles produce a finished product with improved surface consistency having improved fusion of the particles due to the greater surface area associated with the smaller particles. Rigid plastics may be received in a reduced size form from a supplier or the plastics may be size reduced after acquisition. The rigid materials, after size reduction preparation, are shown by example in FIGS. 9-10.

In step 2205, grinding is the preferred means for size reduction of the rigid plastic materials into particulates for the thermoformed panels of the invention. Rigid plastics are ground to achieve particle sizes of less than 1/16 of an inch (approximately 1.5 mm) to mesh sizes of 30-100 (0.595 mm to 0.149 mm). Ground materials are sifted through screens to regulate particle sizes. Particles less than 1.5 mm are free-flowing powders, and have better penetration of fibrous core layer and better fusion with less heating than larger particles. Smaller sized particles are preferred for making panels with smooth or glossy finishes. Rigid materials received as large pieces may be size reduced prior to grinding. Alternatively, size reduction can be accomplished by folding, chopping, pulverizing or other means for reducing the plastic starting materials to the appropriate size for a particular application. After shredding, grinding or pulverizing, the materials are sifted through screens to regulate particles sizes.

Shredders capable of handling large-sized starting materials are utilized in step 2205 for materials such as automobile parts, rolls of materials such as carpets, fibers or films, large pieces of electronic equipment, large toys, and other such large sized materials. Large size starting materials are usually described as those having pieces larger than a suitcase. There is a greater need for pre-stage shredding of materials having harder impact properties or greater densities, or for those having assembled pieces with plastics and metals.

The extent of size reduction in step 2205 is dictated by the type of rigid material and by the process the materials will undergo in the next stage of production. These considerations can include the size of the feed or transfer piping, air movement, size of the storage containers, as well as the characteristics desired for the final panel, such as surface finish. Particles sizes of the rigid materials define how the fibrous materials need to be staged for use. Particle size may be selected based on the desired final appearance of the panel, or the type of fibrous core used.

Larger sizes of rigid materials can be achieved in step 2205, for use in thermoformed panels. Ground particles larger than 30 mesh and larger pieces up to one inch shredded strips of rigid plastic may be used. Larger sized polymer-dominated material can be used. However, smaller sizes will yield more consistent results in the final product. Particle sizes may be uniform or may be a combination of different sizes depending on the characteristics desired in the final product.

Smaller sized particles, such as those having mesh sizes of 30 to 100 (0.595 mm to 0.149 mm), are the preferred sizes in step 2204 for producing higher gloss finishes on the final product. Larger particle sizes may be preferred when a smooth or glossy finish on the final product is not needed, or to prevent or minimize migration of loose fibers to the surface of the panel.

Smaller particles of rigid materials are preferred sizes in step 2205 when the final product will have a glossy finish or a non-porous surface and are preferred when a thinner final panel is prepared. Smaller rigid particle sizes may be used advantageously when the temperature of the vicat softening point of the rigid material is high. Smaller particles have greater surface area requiring less energy to soften the particles to a uniformly flowable state for fusion through the layers.

Smaller particles are also preferred sizes in step 2205 when the fibrous core is fabric or textile type material. In one preferred embodiment, a layered folded fabric having many small openings around the fibers is used as the fibrous core and smaller particles sizes are used for the rigid material to allow for greater penetration of the spaces around the fabric fibers by the softened rigid plastics. This combination of materials leads to stronger fusion and bonding of the layers while producing a thinner end product.

Larger particle sizes of rigid materials are preferred sizes in step 2205 when the fibrous core is made of larger loose fibers prone to migration through the softened rigid materials. In another preferred embodiment, larger particles of rigid material are used to prevent or minimize the migration of loose core fibers to the surface of the panel. Migration of fibers can have a negative impact on the final product, such as the appearance of the panel, or may prevent good adhesion of decals on the panel surface. Use of larger rigid particle sizes in step 2204 may also be used to yield a more porous surface on the final product for improved adherence of paint.

Figure 24:
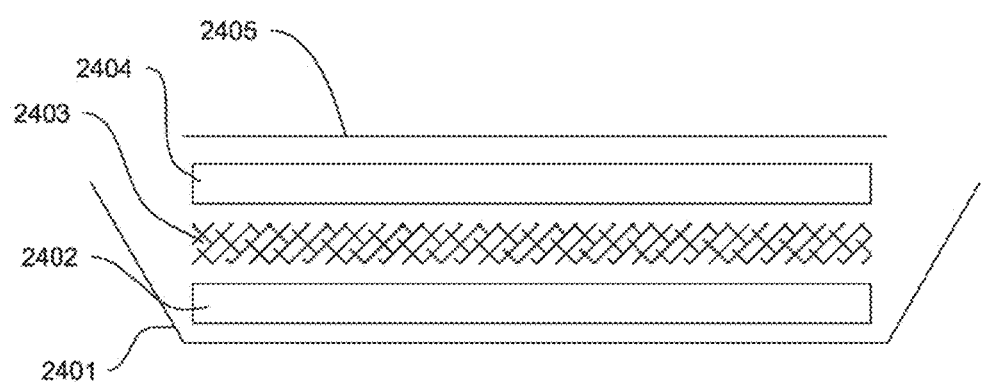
FIG. 24 shows a mold "sandwich" of materials in the present invention.

Preferably the pre-formed rigid blanks have a surface that is relatively smooth, i.e. do not have raised or depressed areas formed on the surface; however, small surface indentions or raised areas are acceptable. Any of the finishes described in FIGS. 25-31 may be used on pre-formed rigid blank panels for this embodiment, and the use of the pre-formed blanks is shown in FIG. 24.

Preparation of Fibrous Materials begins at step 2206. Fibrous materials may be size reduced after acquisition. Fibrous materials are size reduced in step 2206, and these materials include the preferred PET fibers. The fibrous materials are preferably size reduced in step 2206 using a hammermill or pulverizer type apparatus. Preferably, the fibrous materials are size-reduced for subsequent hand-layering of the loose fibers into the molds.

Alternatively, fibrous materials can be cut, shredded or pulverized in step 2206. Examples of equipment suitable for size reduction of fibrous materials for the process of the invention include pulverizers and hammermills. Added cutting or folding can be performed as needed to fit a specific size of mold.

Fibrous materials are preferentially sized in step 2206 to allow distribution by hand to form an even layer over the base layer of rigid particulate material in the molds, such that few voids are present in the fibrous layer. The disbursed fibrous materials are shown in FIGS. 11 and 12.

Loose fibrous materials may be pre-shaped in step 2206 by folding and pressing into a box having the same dimensions as a specific mold. Pressing the fibers with weights will create low to high density matting for core layers. Pre-shaping the fibrous materials into mats will control the presence of loose fibers on the edges, and allows for easier handling and transfer of the fibrous material to the final molding stage before entering the platens. Pre-shaping the fibrous material in step 2206 into mats reduces the processing time and reduces the voids between the fibers.

Fabric-type or netting-type fibrous materials in step 2206 may be folded to fit the mold. Fabric or netting-type fibrous materials are evenly distributed between the rigid layers either by hand layering or after being pre-shaped into mats to fit specific molds.

In step 2206, fibrous materials may be selected based on the size of the fibers, by either the length or width of loose fibers, by the thickness of a fabric or textile fibrous core, or by the thickness of a pre-shaped fibrous mat. Fibrous materials add ductile strength to the finished panels. The thickness of the end product is directly affected by the thickness of the fibrous core, which can be adjusted in the stated ranges.

Preferably, the fibrous core will have a weight that is approximately 10-15% of the total weight of the rigid materials. Alternatively, the weight of fibrous material in the core layer can be from 1% to 80% of the weight of the rigid materials. Preferably, the fibrous core is from ⅛ inch to ¼ inch thick. Alternatively, the fibrous core can have the thickness of a single layer of netting up to a densely pressed mat of ½ inch thickness.

The process step 2207 is then conducted were molds are prepared and loaded with materials. Rigid materials 2205 and fibrous materials 2206 as prepared in Step 2 2204 are loaded into molds at step 2207. FIGS. 9-12 show molds that have been prepared and loaded with first layer of rigid material and a covering layer of fibrous material.

Mold selection is determined in step 2208 by the characteristics desired in the final panel, the starting materials used in preparation of the panel, or combinations of these factors. Molds are sized that will fit between the platens of the press and must be made of materials that can withstand pressures in excess of 4000 psi and temperatures up to 500° F. Characteristics such as the dimensions, thickness and finish desired for the thermoformed panel are determining factors for mold selection in step 2208. Properties of the starting materials, such as vicat softening temperature, are also determining factors for mold selection.

Molds have two parts, a mold base and a mold top plate. Preferably, molds are made of metals, such as aluminum, copper and/or steel. The aluminum molds we use provide a better coefficient of heat transfer to our process by a fact of 20 plus versus steel molds. This allows us to use less heat and energy. Alternatively, molds can be made of epoxy board, wood or other materials able to withstand at least 4000 psi of pressure and temperatures up to 500° F. Molds made of metals, such as aluminum, copper and/or steel, have higher coefficients of heat transfer as compared to wood or epoxy board, allowing for more rapid heat transfer to the particulate materials.

Molds used in step 2207 made of metal are preferred for making thicker or larger panels, for use with rigid materials having high vicat temperatures, for fusion processes requiring pressures over 2500 psi, and for use when fused materials require rapid cooling prior to unmolding. Molds of epoxy board and wood are used for making thinner panels or where lower temperatures and pressure are needed. Non-metal molds are also advantageous used when fused material require slower cooling to prevent warping.

The mold used in step 2207 has a base unit with an area able to contain the rigid and fibrous materials for fusion. Molds have a depth that corresponds to the thickness of the finished panel and a recessed area capable of receiving and retaining the rigid and fibrous components in both the dry phase during loading and the viscous phase during fusion. The mold used in step 2208 will also have a top plate that fits over the mold base to form a closed interior space able to contain the rigid and fibrous components during the fusion stage of the process. When heat and pressure are applied to the top and bottom parts of the mold, the rigid and fibrous materials will be compressed to fill the interior space of the mold producing a fused surface on the panel. Alternatively, the mold base has a flat surface without a recessed area.

Preferred mold dimensions for the molds used in step 2207 are less than the dimensions of the platens. Mold length and width dimensions may be smaller than the dimensions of the platens of the thermoforming press, the same dimensions as the platens, or have larger dimensions than the platens. Mold dimensions are limited by whether adequate pressure and heat can be applied to produce fusion of the materials loaded within the molds.

Molds may also be selected in step 2208 based on the desired shape and size of the final product. A mold with a high polish finish on the interior contact surface will produce a panel with a highly polished surface. The aluminum molds we use provide a better coefficient of heat transfer to our process by a fact of 20 plus versus steel molds. This allows us to use less heat and energy. A rougher mold finish will produce a matte type finish on the final product which would be useful for surfaces that will be painted or glued.

A mold used in step 2207 will also have a top plate preferably made of the same material as the mold base. Alternatively, the top plate can be made of a different material that is able to withstand the heat and pressure of the fusion process. The mold top plate is preferably a flat piece that substantially mirrors the dimensions of the base plate and is held in place against the mold base by the weight of the top plate. Alternatively, the mold top plate can be secured by matching male/female type fasteners on the edges of the mold base and top plate.

Preferably, a mold used in step 2207 will have a flat surface on both the mold base and the mold top plate producing a panel that has two flat surfaces. Alternatively, the mold base will have a depressed design in the bottom of the mold that will produce a raised design on the surface of the finished panel. Alternatively, the mold base has a raised area that will result in a groove-like depression in the panel surface for insertion of a bold or other fastener.

Mold preparation in step 2209 includes removing surface contaminants from the mold and pre-heating the mold prior to loading with materials for fusion. Molds are wiped with a polymer wool brush to remove contaminants prior to loading with materials for fusion. Molds may be cleaned by air-blowing, brushing, washing, or other means of cleaning debris from the mold surface that could interfere with fusion of materials, mar the finish of the panel or otherwise have a negative effect on the thermoformed panel. Molds may optionally be coated with a releasing agent to aid the release of certain types of materials.

Molds used in step 2209 are preferably preheated following removal of contaminants and prior to addition of materials for fusion. Preheating the molds reduces the heat that must be added during the pressure stage allowing for shorter processing times. Molds are preferably preheated to temperatures of approximately 100° F./38° C. to 122° F./50° C. in step 2109 prior to filling. Rigid and fibrous materials may be preheated in a like manner prior to loading into preheated molds. Higher pre-heating temperatures should not exceed the melt flow temperature of the materials may be used in step 2209. Alternatively, molds may be filled without preheating for use with materials having low vicat softening points.

Mold filling is conducted in step 2210, which includes layering prepared materials in the mold for thermoforming into a panel. The cross-section of the "sandwich" is shown in FIG. 23 after rigid and fibrous materials are distributed in the mold. Molds that have been cleaned and preheated in the manner described above 2209 are loaded with materials for thermoforming into panels in step 2110. The mold base is preferably filled in step 2210 in a "sandwich" manner with a base layer of particulate rigid material on a lower level, followed by a covering of core layer of fibrous material, and then followed by covering the core layer with a top layer of particulate rigid material. The cross-section of the "sandwich" is shown in FIG. 23 after rigid and fibrous materials are distributed in the mold. The filled mold base is then topped with the mold top plate. Alternatively, molds may be filled with only rigid materials, omitting the fibrous core. Molds may also be fitted with a pre-made blank panel for the rigid base, followed by a fibrous core layer and then followed by covering the core layer with another pre-made blank panel.

The "sandwich" filling method of loading in step 2210 is described in more detail as follows, but is shown in profile at FIG. 13 and graphically in FIG. 24. Rigid particulate materials, prepared as described above, are evenly distributed in the bottom of the mold to form a base layer of material covering from edge to edge of the mold. Preferably, rigid materials are a free-flowing dry powder sized less than 1.5 mm (1/16") to 0.149 mm (100 mesh) for uniform distribution in the mold. Rigid materials are preferably loaded into the molds by a funnel drop mechanism, but alternatively, may be distributed by hand, via hose, or other loading mechanism that can deliver the materials into the mold for even distribution of materials across the mold surface. If larger rigid materials are used, such as folded strips, shredded pieces or pre-made blank panels, these rigid materials are preferably distributed in the molds by hand.

The amount of rigid material loaded into a mold will be determined based on size of the panel desired and the end use of the panel. In a preferred embodiment, a 12 inch square mold is loaded with a base layer of eight ounces of rigid ABS particulate material. Alternatively, rigid particulate materials ranging in weight from 0.3 ounce, to produce a very thin blank panel, up to about 2 pounds of particulate material, to produce a panel having a thickness of greater than ¼ inch, may be used in a 12 inch square mold, with the total amount evenly divided between the base and top layers of rigid particulate materials.

A fibrous core layer is then distributed over the top of the previously distributed layer of rigid material. Fibrous materials are preferably loose fibers distributed by hand over the rigid particulates; however, fibrous fabrics, netting-type materials or pre-formed fibrous mats may be used as the fibrous core. The fibrous layer will preferably be 10-15% by weight of the rigid material. In the preferred embodiment having an 8 ounce base layer of rigid particulates layered in a 12 inch square mold, the fibrous core would constitute 1.6-2.4 ounces of loose PET fibers evenly distributed over the rigid materials. Fibers are distributed evenly to the edges of the base layer of rigid materials in the mold, but preferably not beyond the rigid material to prevent migration of fibers during fusion.

Fibrous materials are evenly distributed over the surface of the rigid material base layer by hand distribution of loose fibers, by folding fabric or netting type materials to fit the dimensions of the mold or by placing a pre-shaped fibrous mat of the appropriate dimensions on top of the base layer of rigid material. The fibrous materials are placed over the rigid materials such that the fibrous materials are nearly to the edge of the mold, but preferably not contacting the edges of the mold. The fibrous layer can range from a very thin layer having numerous and/or large voids between the fibers (such as a single thickness of netting) up to a thickness of ¼ inch having few and/or very small voids between the fibers (such as a dense pre-formed mat) depending upon the intended end use of the panel. The fibrous layer can also be omitted altogether to make pre-formed blank panels.

A top layer of rigid material is applied over the top of the fibrous core material previously distributed as described above. The rigid materials of the top layer should completely cover the fibrous layer and contact the edges of the mold base. In the preferred embodiment having a base layer of 8 ounces of rigid particulate material in a 12 inch square mold and a fibrous core layer of 1.6-2.4 ounces of loose fibers, eight ounces of rigid particulate material is evenly distributed over the surface of the fibrous core layer.

A top mold plate is situated over the loaded base mold. The top mold plate will be in contact with the top layer of rigid material. The "sandwich" of materials, having a mold base, a rigid particulate base layer, a fibrous core layer, a rigid particulate top layer and a mold top plate, is now ready for loading into the thermoforming press. The cross-section of the "sandwich" is shown in FIG. 23 after rigid and fibrous materials are distributed in the mold.

The process then proceeds to step 2211 where the fusion step is conducted. First, in step 2212, the platen is loaded with molds that have been filled. Filled molds are loaded onto the platens of the thermoforming press. Preferably the platens have been preheated to prior to placing the molds in the press. Molds are centrally placed on the lower heated platen of the thermoforming press to ensure uniform fusion of materials within the mold.

Heat and pressure parameters are selected in step 2213 using the control panel shown in FIG. 14B or 14D. Pressure, heat and processing time are selected based on the vicat softening point of the materials, but sufficient for fusing the materials loaded in the mold is selected on the control panel of the thermoforming press. The vicat softening point is the temperature where materials with no definite melting point, such as plastics, will become viscous enough to flow, sometimes referred to as the melt-flow temperature. Materials at the vicat softening point are able to flow under pressure to fill voids between the layers used in preparing the claimed thermoformed panels.

The vicat softening point of the rigid particulate material is preferably used to determine the processing parameters. Alternatively, the vicat softening point of the fibrous core is used to determine the processing parameters. The preferred rigid material, ABS plastic, has a vicat softening point of approximately 212° F./100° C. to 248° F./120° C. Alternative rigid materials that may be used have different vicat softening points. The average vicat softening point for polystyrene is approximately 217° F./102.5° C. The average vicat softening point for polyethylene is approximately 261° F./127.3° C. The average vicat softening point for polypropylene is approximately 305° F./152.2° C. For processing the preferred ABS plastic rigid material, the preferred parameters are a temperature of approximately 400° F., with pressure of 1500-2500 psi applied for 100-130 seconds.

The platens are heated during processing step 2214 to temperatures up to 500° F. The application of pressure in combination with the heat of the platens will raise the temperature of the compressed materials to the temperature needed to achieve vicat softening of the materials inside the mold. Pressures of 1500-3600 psi are applied to the molds.

Processing times from 90-150 seconds are required to achieve fusion of materials at the selected pressure and temperature. The processing time is determined by how long it takes to reach the temperature and pressure needed to allow the materials to flow through the layers within the mold. Excessive dwell times (the time the materials are held under heat and pressure after reaching vicat softening) will have a detrimental effect of the surface of the panel due to degradation of the materials. Dwell times should be less than 90 seconds.

In step 2214 a thermoforming press, such as in FIG. 14A and FIG. 14C, is actuated to apply the selected heat and pressure to the loaded mold. The hydraulic system of the press raises the bolsters applying pressure to the mold situated between the platens. The platens are heated to raise the selected temperature to the vicat softening point of the rigid materials within the mold. Pressure and temperature are held for a pre-determined amount of time needed to achieve fusion. When the processing time has elapsed, the heating is discontinued and the pressure is released by lowering the bolster plates to separate the platens and release the mold.

The next step in the process is in cooling step performed in step 2215. After the pressure is released from the mold by lowering the bolster plates with the hydraulic cylinder, the mold is removed from the heated platens and prepared for cooling. Molds must be cooled in step 2117 prior to removing the thermoformed panel from the mold. Cooling means are used to decrease the temperature of the materials in the mold below the vicat softening point and to near the ambient temperature before removing the panels to minimize warping of the panels.

Molds may be cooled by one or more means to achieve the temperature necessary to prevent warping of the thermoformed panels. Cooling continues until the center area of the fused materials in the mold has cooled to ambient or near ambient temperatures for unmolding. The preferred means of cooling the molds post-thermoforming shown in step 2218 employs a combination of cooling platens and air cooling until the interior of the fused material has reached ambient temperature. Molds are placed between cooling platens of the thermoforming press and cooled water is circulated through the cooling platens while air is blown over the molds.

Preferably, pressure of approximately 500 psi is applied to the cooling platens during the cooling process. Pressure applied to the cooling platens during the cooling process minimizes the possibility of warping of panels. Alternatively, pressures of 0 psi to 2500 psi are applied to the cooling platens during the cooling period.

Preferably, air at ambient temperature is blown over the molds during the cooling period while the molds are in the cooling platens. Air blowing over the molds in the cooling platens accelerates the cooling process. Alternatively, chilled air is blown over the molds.

Preferably, molds remain in the cooling platens with air cooling for approximately 3 minutes for a panel formed from particulate ABS rigid materials having a final panel thickness of ¼ inch. Thicker panels will require more cooling time and thinner panels will require less time. Starting with smaller rigid particulates will require more cooling time to prevent warping of the panels than using larger particles. Alternative cooling times can range from 1 minute for flash cooling (rapid cooling at temperatures below freezing) of a panel that is less than ¼ inch thick and up to 24 to 72 hours for a greater than ½ inch thick panel that is air cooled entirely at ambient temperature.

Alternative means may be employed to cool the thermoformed panels in step 2118 before unmolding. The molds may be removed from the press and air-cooled by blowing a fan over the removed mold or removed molds may be allowed to cool to ambient temperature without use of a fan. Molds may be cooled by placing the mold between cooled pinch rollers or by submersion in a chilled water bath. Combinations of the cooling methods may be selected based on the final thickness of the panel and the vicat softening point of the rigid materials.

The final processing step 2219 is then conducted. Following the cooling stage, the thermoformed panels are removed from the molds and final processing will prepare the panels for use in step 2219.

Panels are removed from molds following cooling in step 2220. Additional air-cooling or water-bath cooling to reduce panels to ambient air temperature or below may be used after unmolding. Panels may be stacked following unmolding to allow for additional crystallization time.

Preferably, ¼ inch thick thermoformed ABS panels are allowed to sit for 24 hours at ambient air temperature after unmolding to ensure complete crystallization of fused materials before trimming and packaging. Panels are preferably stacked after unmolding to allow the passive pressure supplied by the weight of the stacked panels to prevent warpage during crystallization. Additional flat weights of approximately the weight of the panels can be added to the top of the stacked panels.

Alternatively, panels thinner than ¼ inch are allowed to set for 1-8 hours after unmolding and are preferably stacked to allow the passive pressure supplied by the weight of the stacked panels to prevent curling of the edges during crystallization. Panels thicker than ¼ inch are allowed to sit for 24-72 hours after unmolding and may be stacked or unstacked during crystallization. A fan can be used to assist in air-cooling the panels, or unmolded panels may be submerged in cool water to assist cooling.

In step 2221, edges of removed panels may be trimmed to remove fibers that migrated from the edges during fusion. Panel surfaces may be lightly sanded to remove particles that have risen on the panel surface after unmolding. Panels may be cleaned to remove any dust from the panel surface or any releasing agent that was used in the mold.

Preferably, ABS panels are trimmed by hand to remove migrated fibers from the edges and to achieve final product size before packaging. Alternatively, panels are trimmed in a cutting press or by other mechanized cutting means to achieve a specified size, or are left untrimmed for sizing at the point of use. ABS panels are preferably wiped with a cloth to remove dust from the surface of the panel. Alternatively, panels are lightly sanded with high-grit sand paper to remove raised areas that appeared after unmolding. After any necessary trimming and cleaning thermoformed panels are packaged for distribution to end user. Packaging may be by boxing, bagging, stretch wrapping, vinyl heat wrapping, or other means suitable for packaging flat panels. The finished panels are shown in FIGS. 25-31.

Fibrous materials are prepared in step 2206 and are size reduced prior to receipt or after acquisition. Fibrous materials, such the preferred PET fibers, are preferably size reduced using a hammermill or pulverizer type apparatus in step 2206. Preferably, the fibrous materials are size-reduced and then pressed into mats having the same dimensions as the mold.

Fibrous materials can be cut, shredded or pulverized prior to use in step 2206 to produce loose fibers for pressing into mats. Examples of equipment suitable for size reduction of fibrous materials for the process of the invention include pulverizers and hammermills of the type produced by Pallmann Pulverizers Inc. and Schute-Buffalo Hammermill. Added cutting or folding can be performed in step 2206 as needed to fit a specific size of mold.

Loose fibrous materials are preferably pressed into a mat having few voids visible between the fibers. The mats are sized to be an even layer over the base layer of pre-formed rigid blank in the molds such that few voids are present in the fibrous mat. Loose fibrous materials are pre-shaped in step 2206 by folding and pressing into a box-like structure having the same dimensions as a specific mold. Pressing the fibers with weights will create low to high density matting for core layers. Pre-shaping the fibrous materials into mats in step 2206 controls the fibers on the edges, and allows for easier handling and transfer of the fibrous material to the final molding stage before entering the platens. Pre-shaping the fibrous material into mats reduces the processing time and reduces the voids between the fibers.

Alternatively, fibrous materials, such as in textiles used without size reduction. Fibrous materials can be used as received without size reduction. Fabric-type or netting-type fibrous materials may be used without size reduction by folding the fabric or netting to fit the mold. Fabric or netting-type fibrous materials or are evenly distributed between the rigid layers either by hand layering or after being pre-shaped into mats to fit specific molds.

Alternatively, the fibrous core layer prepared in step 2206 can be loose fibers which are distributed by hand in an even layer over the pre-formed blank. Loose fiberes can be size reduced by cutting, shredding or pulverizing prior to use to produce loose fibers for had distribution. Examples of equipment suitable for size reduction of fibrous materials include pulverizers and hammermills of the type produced by Pallmann Pulverizers Inc. and Schute-Buffalo Hammermill.

Fibrous materials may be selected in step 2203 based on the size of the fibers, by either the length or width of loose fibers, by the thickness of a fabric or textile fibrous core, or by the thickness of a pre-shaped fibrous mat. Fibrous materials add ductile strength to the panels. The thickness of the end product is directly affected by the thickness of the fibrous core.

Preferably, the fibrous mat will have a weight that is approximately 10-15% of the total weight of the rigid materials. Alternatively, the weight of fibrous material in the core layer can be from 1% to 80% of the weight of the pre-formed rigid blank panels. Preferably, the fibrous core mat is from ⅛ inch to ¼ inch thick and has the same dimensions as the mold. Alternatively, the fibrous core can have the thickness of a single layer of netting up to a densely pressed mat of ½ inch thickness.

Preformed rigid blanks 2205 and fibrous mats 2206 as prepared in Step 2 2204 are loaded into molds in step 2207.

Molds are selected in step 2208, and the molds are selected based on characteristics desired in the final panel, the starting materials used in preparation of the panel, or combinations of these factors. Molds are sized in step 2207 that will fit between the platens of the press and must be made of materials that can withstand pressures in excess of 4000 psi and temperatures up to 500° F. Characteristics such as the dimensions, thickness and finish desired for the thermoformed panel are determining factors for mold selection. Properties of the starting materials, such as vicat softening temperature, are also determining factors for mold selection. Molds have two parts, a mold base and a mold top plate.

Preferably, molds are made of metals, such as aluminum, copper or steel. Alternatively, molds can be made of epoxy board, wood or other materials able to withstand 4000 psi of pressure and temperatures up to 500° F. Molds made of metals, such as aluminum, copper and steel, have higher coefficients of heat transfer as compared to wood or epoxy board, allowing for more rapid heat transfer to the particulate materials.

Molds made of metal are preferred for making thicker or larger panels, for use with rigid materials having high vicat temperatures, for fusion processes requiring pressures over 2500 psi, and for use when fused materials require rapid cooling prior to unmolding. Molds of epoxy board and wood are used for making thinner panels or where lower temperatures and pressure are needed. Non-metal molds are also advantageous used when fused material require slower cooling to prevent warping.

The mold selected in step 2208 will have a base unit with an area able to contain the rigid and fibrous materials for fusion. Molds have a depth that corresponds to the thickness of the finished panel and a recessed area capable of receiving and retaining the rigid and fibrous components in both the dry phase during loading and the viscous phase during fusion. The mold selected in step 2208 will also have a top plate that fits over the mold base to form a closed interior space able to contain the rigid and fibrous components during the fusion stage of the process. When heat and pressure are applied to the top and bottom parts of the mold, the rigid and fibrous materials will flow to completely fill the interior space of the mold producing an entire fused surface on the panel. Alternatively, the mold base has a flat surface without a recessed area.

Preferred mold dimensions are less than the dimensions of the platens. Mold length and width dimensions may be smaller than the dimensions of the platens of the thermoforming press, the same dimensions as the platens, or have larger dimensions than the platens. Mold dimensions are limited by whether adequate pressure and heat can be applied to produce fusion of the materials loaded within the molds.

Molds may also be selected in step 2208 based on the finish desired on the final product. A mold with a high polish finish on the interior contact surface will produce a panel with a highly polished surface. A rougher mold finish will produce a matte type finish on the final product which would be useful for surfaces that will be painted or glued.

Figure 25:
FIG. 25 shows a slate finish for the processed material.
Figure 26:
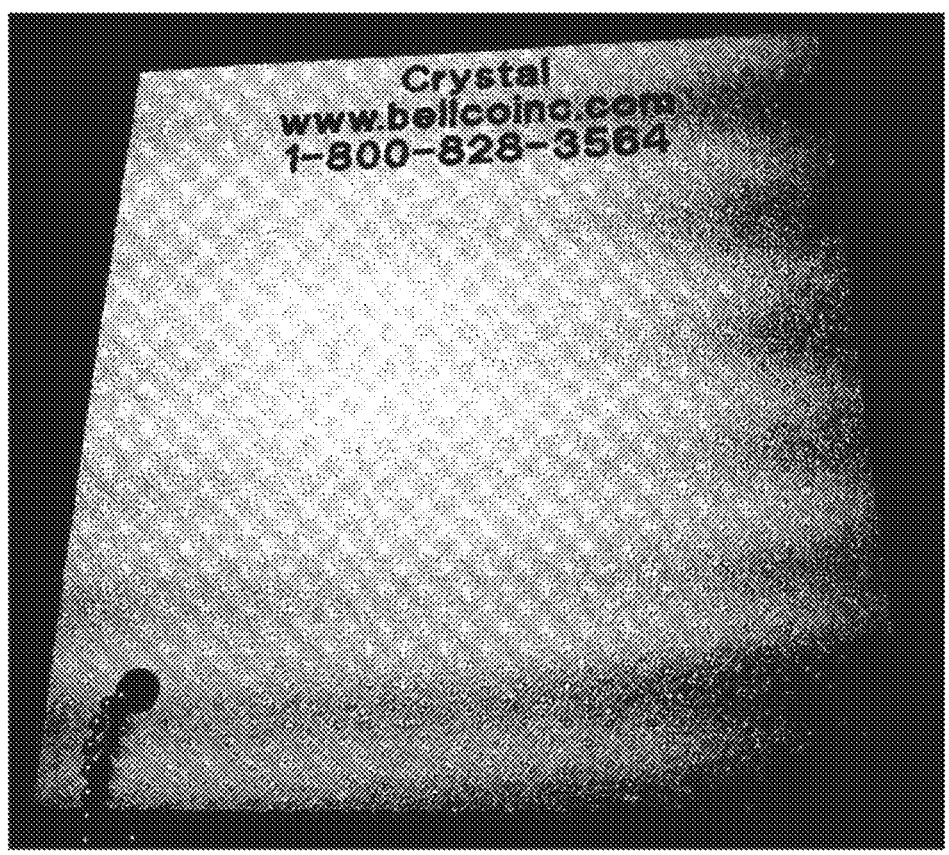
FIG. 26 shows a crystal finish for the processed material.
Figure 27:
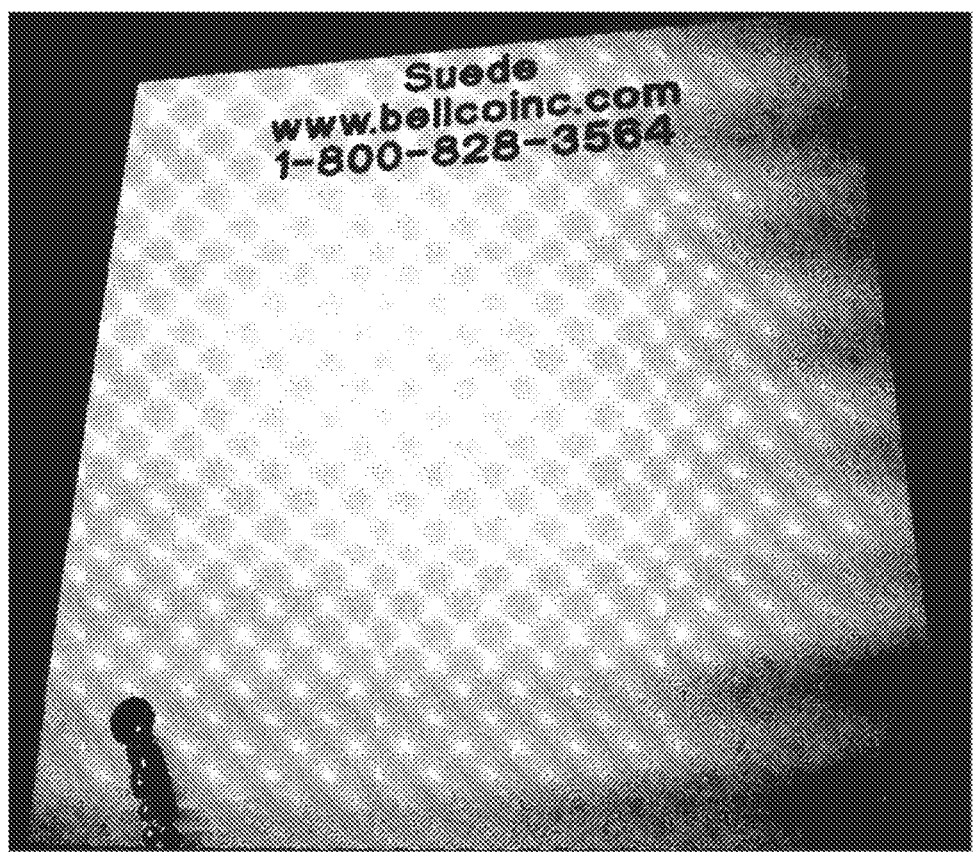
FIG. 27 shows a suede finish for the processed material.
Figure 28:
FIG. 28 shows a hi-brite finish for the processed material.
Figure 29:
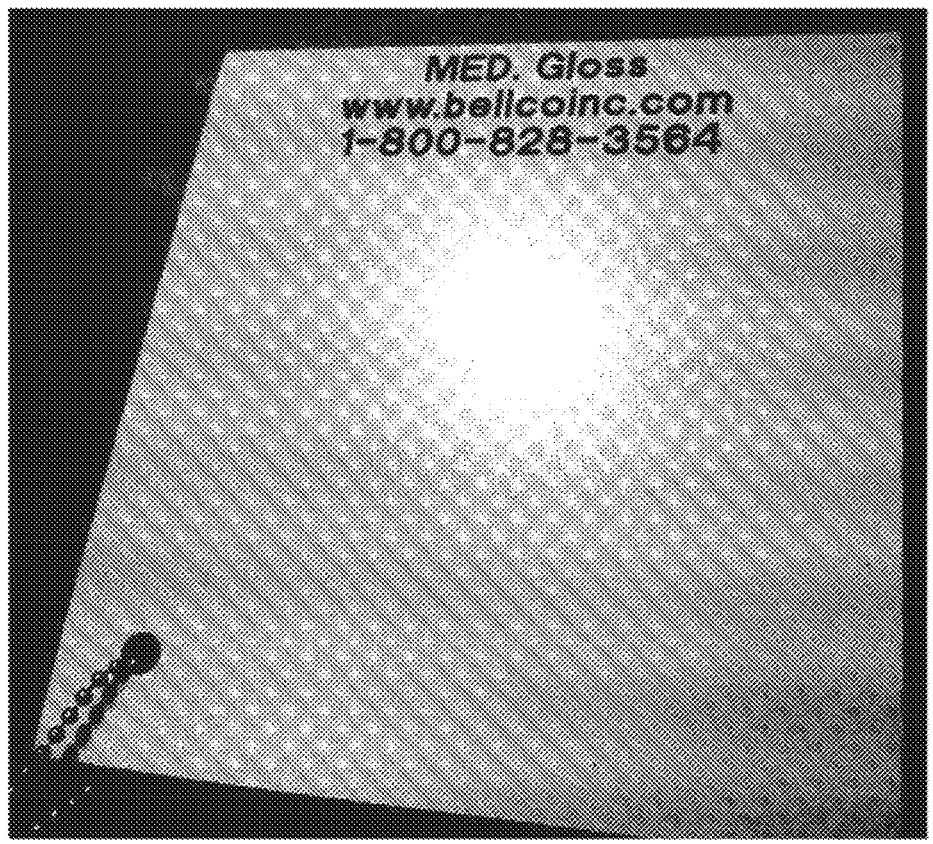
FIG. 29 shows a medium gloss finish for the processed material.
Figure 30:
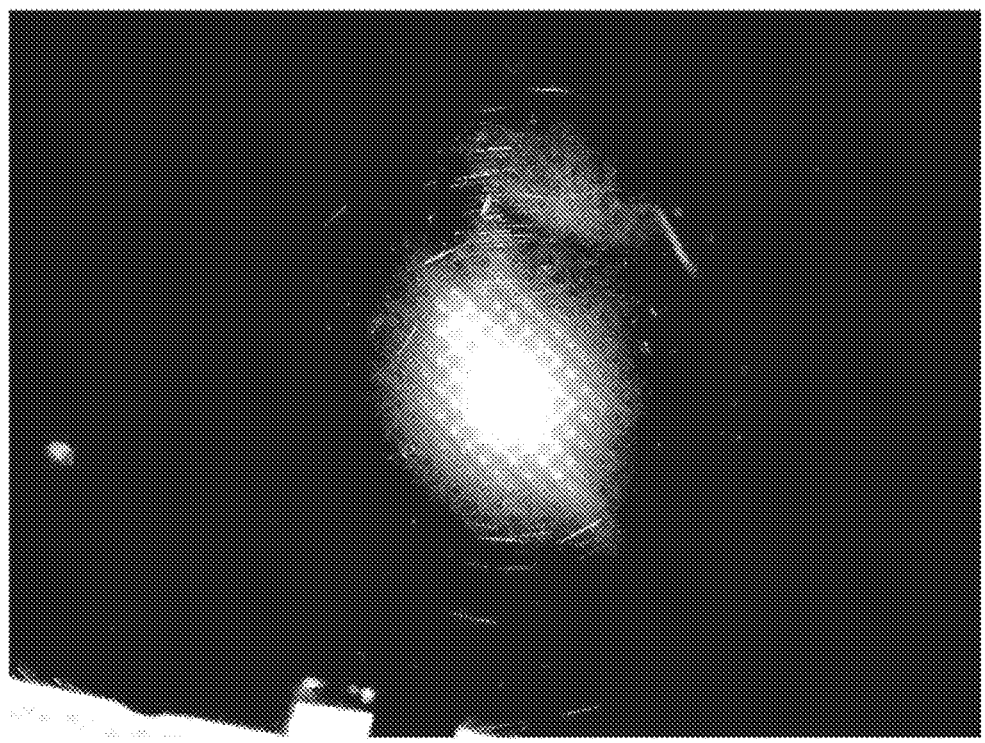
FIG. 30 shows a mirror gloss finish for the processed material.
Figure 31:
FIG. 31 shows a polished aluminum finish for the processed material.

FIGS. 25 through 31 demonstrate examples of finishes that may be produced on the panels as a result of the interior finishes on the molds. FIG. 25 shows a panel with slate finish having a stone-like appearance. FIG. 26 shows a panel with crystal finish having a textured reflective surface. FIG. 27 shows a panel with a suede-type finish having a textured matte surface. FIG. 28 shows a panel with the hi-brite finish having a highly reflective textured surface. FIG. 29 shows a panel with the medium gloss finish having a reflective finely textured surface. FIG. 30 shows a panel with a mirror finish which has a highly reflective smooth surface. FIG. 31 shows a panel with a polished aluminum-type finish having a highly reflective smooth surface with a brushed appearance.

Pre-formed rigid blank panels used in this thermoforming embodiment will develop a surface finish like that of the mold used in the final thermoforming step regardless of the original surface finish of the pre-formed rigid blank panel when loaded in the mold.

A mold will also have a top plate preferably made of the same material as the mold base. Alternatively, the top plate can be made of a different material that is able to withstand the heat and pressure of the fusion process. The mold top plate is preferably a flat piece that mirrors the dimensions of the base plate and is held in place against the mold base by the weight of the top plate. Alternatively, the mold top plate can be secured by matching male/female type fasteners on the edges of the mold base and top plate.

Preferably, a mold will have a flat surface on both the mold base and the mold top plate producing a panel that has two flat surfaces. Alternatively, the mold base will have a depressed design in the bottom of the mold that will produce a raised design on the surface of the finished panel. In another alternative, the mold base has a raised area that will result in a groove-like depression in the panel surface for insertion of a bold or other fastener.

Mold preparation is conducted in step 2209, which includes removing surface contaminants from the mold and pre-heating the mold prior to loading with materials for fusion. Preferably, molds are wiped with a polymer wool brush to remove contaminants prior to loading with materials for fusion. Molds may be cleaned in step 2209 by air-blowing, brushing, washing, or other means of cleaning debris from the mold surface that could interfere with fusion of materials, mar the finish of the panel or otherwise have a negative effect on the thermoformed panel. Molds may optionally be coated with a releasing agent to aid the release of certain types of materials.

Molds are preferably preheated in step 2209 following removal of contaminants and prior to addition of materials for fusion. Preheating the molds reduces the heat that must be added during the pressure stage allowing for shorter processing times. Molds are preferably preheated to temperatures of approximately 100° F./38° C. to 122° F./50° C. prior to filling. Rigid and fibrous materials may be preheated in a like manner prior to loading into preheated molds. Higher pre-heating temperatures not to exceed the melt flow temperature of the materials may be used. Alternatively, molds may be filled without preheating for use with materials having low vicat softening points.

Molds that have been cleaned and preheated in the manner described above in step 2209 are loaded with materials for thermoforming into panels in step 2210. Mold filling 2210 occurs next in step 2210, which includes layering prepared materials in the mold for thermoforming into a panel. The mold base is preferably filled in a "sandwich" manner with a base layer of a pre-formed rigid blank panel, followed by a core layer of a fibrous mat, and a top layer of a second pre-formed rigid blank panel, and the filled mold base is topped with the mold top plate. Alternatively, molds may be filled with only pre-formed rigid blanks, omitting the centered fibrous core mat. Molds may also be fitted with a pre-formed rigid blank panel for the rigid base, followed by a fibrous core layer of loose fibers and topped by another pre-made rigid blank panel.

A pre-formed rigid blank panel is placed in the bottom of the mold in step 2210 to form a base layer of material covering from edge to edge of the mold. Preferably, rigid materials are pre-formed rigid blank panels that are ⅛ inch to ¼ inch thick with a smooth surface. Rigid blanks are preferably loaded into the molds by hand, but alternatively, may be distributed by a loading mechanism that can place the panel into the mold.

The size of the preformed rigid blank panel loaded into a mold will be determined based on size of the panel desired and the end use of the panel. In a preferred embodiment, a 12 inch square mold is loaded with a base layer of a pre-formed rigid ABS panel weighing approximately eight ounces. Alternatively, pre-formed rigid panels ranging in weight from 0.6 ounce each, to produce a very thin final panel, up to preformed rigid panels weighing about 2 pounds each, to produce a panel having a thickness of greater than ¼ inch, may be used in a 12 inch square mold.

A fibrous core mat is placed evenly over the top of the pre-formed rigid blank in the mold base. Fibrous materials are preferably mats of pressed fibers having a defined shape; however, fibrous fabrics, netting-type materials or loose fibrous materials may be used as the fibrous core.

The fibrous layer will preferably be 10-15% by weight of the rigid material. In the preferred embodiment having an 8 ounce base of a pre-formed rigid panel layered in a 12 inch square mold, the fibrous core would constitute a mat of PET fibers weighing 1.6-2.4. The fiber mat is placed evenly to the edges of the base layer of the rigid blank in the mold in step 2210, but preferably not beyond the rigid material to prevent migration of fibers during fusion.

The fibrous core is preferably a mat of fibers that have been pressed into a shape having the dimensions of the mold. Alternatively, loose fibrous materials are evenly distributed over the surface of the rigid material base layer in step 2210 by hand distribution of loose fibers, or by folding fabric or netting type materials to fit the dimensions of the mold. The fibrous materials are placed over the pre-formed rigid blank in step 2210 such that the fibrous mat is nearly to the edge of the mold, but preferably not contacting the edges of the mold. The fibrous layer can range from a very thin layer having numerous and/or large voids between the fibers (such as a single thickness of netting) up to a thickness of ¼ inch having few and/or very small voids between the fibers (such as a dense pre-formed mat) depending upon the intended end use of the panel. Increasing the thickness of the fibrous layer will result in a panel with greater ductile strength.

A top layer of the same pre-formed rigid blank panel used for the base layer is placed over the top of the fibrous core mat in step 2210. The rigid panel on the top layer should completely cover the fibrous layer and contact the edges of the mold base. In the preferred embodiment having a base layer of a pre-formed rigid blank panel weighing 8 ounces in a 12 inch square mold and a fibrous core layer of 1.6-2.4 ounces of matted fibers, a top layer of a pre-formed rigid blank panel weighing 8 ounces eight ounces is evenly placed over the surface of the fibrous core mat.

A top mold plate is situated over the loaded base mold. The top mold plate will be in contact with the top layer of rigid material. The "sandwich" of materials, having a mold base, a rigid blank panel base layer, a fibrous mat core layer, a rigid blank panel top layer and a mold top plate, is now ready for loading into the thermoforming press.

The fusion steps then occur in step 2211. The platens loaded with materials are placed in the press in step 2212. Filled molds are loaded onto the platens of the thermoforming press. Preferably the platens have been preheated prior to placing the molds in the press. Molds are centrally placed on the lower heated platen of the thermoforming press to ensure uniform fusion of materials within the mold.

The heat and pressure criteria are selected in step 2213 using the control panels shown in FIGS. 14B and 14D. Pressure, heat and processing time are selected based on the vicat softening point of the materials, but the selected pressure and temperature sufficient for fusing the materials loaded in the mold. The vicat softening point is the temperature where materials with no definite melting point, such as plastics, will become viscous enough to flow, sometimes referred to as the melt-flow temperature. Materials at the vicat softening point are able to flow under pressure to fill voids between the layers used in preparing the claimed thermoformed panels.

The vicat softening point of the pre-formed rigid panels is preferably used to determine the processing parameters. Alternatively, the vicat softening point of the fibrous core is used to determine the processing parameters. The preferred rigid material, ABS plastic, has a vicat softening point of approximately 212° F./100° C. to 248° F./120° C. Alternative rigid materials that may be used have different vicat softening points. The average vicat softening point for polystyrene is approximately 217° F./102.5° C. The average vicat softening point for polyethylene is approximately 261° F./127.3° C. The average vicat softening point for polypropylene is approximately 305° F./152.2° C. For processing the preferred ABS plastic rigid material, the preferred parameters are a temperature of approximately 400° F., with pressure of 1500-2500 psi applied for 100-130 seconds.

The platens are heated during processing to temperatures up to 500° F. in step 2214. The application of pressure in combination with the heat of the platens will raise the temperature of the compressed materials to the temperature needed to achieve vicat softening of the materials inside the mold. Pressures of 1500-3600 psi are applied to the molds.

Processing times from 90-150 seconds are required to achieve fusion of materials at the selected pressure and temperature. The processing time is determined by how long it takes to reach the temperature and pressure needed to allow the materials to flow through the layers within the mold. Excessive dwell times (the time the materials are held under heat and pressure after reaching vicat softening) will have a detrimental effect of the surface of the panel due to degradation of the materials. Dwell times should be less than 90 seconds.

A thermoforming press, such as in FIG. 14A and FIG. 14C, is actuated to apply the selected heat and pressure to the mold. The hydraulic system of the press raises the bolsters applying pressure to the mold situated between the platens. The platens are heated to raise the selected temperature to the vicat softening point of the rigid materials within the mold. Pressure and temperature are held for a pre-determined amount of time needed to achieve fusion. When the processing time has elapsed, the heating is discontinued and the pressure is released by lowering the bolster plates to separate the platens and release the mold.

The cooling sequence of steps is then conducted in step 2215. After the pressure is released from the mold by lowering the bolster plates with the hydraulic cylinder, the mold is removed from the heated platens and prepared for cooling in step 2217. Molds must be cooled prior to removing the thermoformed panel. Cooling means are used to decrease the temperature of the materials in the mold below the vicat softening point and to near the ambient temperature before removing the panels to minimize warping of the panels.

Molds may be cooled by one or more means shown in 2218 to achieve the temperature necessary to prevent warping of the thermoformed panels. Cooling continues until the center area of the fused materials in the mold has cooled to ambient or near ambient temperatures for unmolding.

The preferred means of cooling the molds post-thermoforming as shown in 2217 employs a combination of cooling platens and air cooling until the interior of the fused material has reached ambient temperature. Molds are placed between cooling platens of the thermoforming press and cooled water is circulated through the cooling platens while air is blown over the molds.

Preferably, pressure of approximately 500 psi is applied to the cooling platens during the cooling process. Pressure applied to the cooling platens during the cooling process minimizes the possibility of warping of panels. Alternatively, pressures of 0 psi to 2500 psi are applied to the cooling platens during the cooling period.

Preferably, air at ambient temperature is blown over the molds during the cooling period in step 2217 while the molds are in the cooling platens. Air blowing over the molds in the cooling platens accelerates the cooling process, and chilled air can be blown over the molds in step 2217.

Molds remain in the cooling platens with air cooling for approximately 3 minutes for a panel formed from particulate ABS rigid materials having a final panel thickness of ¼ inch. Thicker panels will require more cooling time and thinner panels will require less time. Starting with smaller rigid particulates will require more cooling time to prevent warping of the panels than using larger particles. Alternative cooling times can range from 1 minute for flash cooling (rapid cooling at temperatures below freezing) of a panel that is less than ¼ inch thick and up to 24 to 72 hours for a greater than ½ inch thick panel that is air cooled entirely at ambient temperature.

Alternative means may be employed to cool the thermoformed panels before unmolding. The molds may be removed from the press and air-cooled by blowing a fan over the removed mold or removed molds may be allowed to cool to ambient temperature without use of a fan. Molds may be cooled by placing the mold between cooled pinch rollers or by submersion in a chilled water bath. Combinations of the cooling methods may be selected based on the final thickness of the panel and the vicat softening point of the rigid materials.

Following the cooling stage in step 2217, the thermoformed panels are removed from the molds and final processing will prepare the panels for use in step 2219. Panels are removed from molds following cooling in step 2220. Additional air-cooling or water-bath cooling will reduce the temperature of the panels to ambient air temperature or below may be used after unmolding. Panels may be stacked following unmolding to allow for additional crystallization time.

Preferably, ¼ inch thick thermoformed ABS panels are allowed to go through a setting time period of 24 hours at ambient air temperature after unmolding to ensure complete crystallization of fused materials before trimming and packaging. Panels are preferably stacked after unmolding to allow the passive pressure supplied by the weight of the stacked panels to prevent warpage during crystallization. Additional flat weights of approximately the weight of the panels can be added to the top of the stacked panels.

Alternatively, panels thinner than ¼ inch are allowed to set for 1-8 hours after unmolding and are preferably stacked to allow the passive pressure supplied by the weight of the stacked panels to prevent curling of the edges during crystallization. Panels thicker than ¼ inch are allowed to sit for 24-72 hours after unmolding and may be stacked or unstacked during crystallization. A fan can be used to assist in air-cooling the panels, or unmolded panels may be submerged in cool water to assist cooling.

Trim, clean and package panels are then conducted in step 2221. Edges of removed panels may be trimmed to remove fibers that migrated from the edges during fusion. Panel surfaces may be lightly sanded to remove particles that have risen on the panel surface after unmolding. Panels may be cleaned to remove any dust from the panel surface or any releasing agent that was used in the mold.

Preferably, ABS panels are trimmed by hand to remove migrated fibers from the edges and to achieve final product size before packaging. Alternatively, panels are trimmed in a cutting press or by other mechanized cutting means to achieve a specified size, or are left untrimmed for sizing at the point of use. ABS panels are preferably wiped with a cloth to remove dust from the surface of the panel. Alternatively, panels are lightly sanded with high-grit sand paper to remove raised areas that appeared after unmolding. After any necessary trimming and cleaning thermoformed panels are packaged for distribution to end user. Packaging may be by boxing, bagging, stretch wrapping, vinyl heat wrapping, or other means suitable for packaging flat panels.

All of the examples set forth below are used to produce floor tiles and signage. The produced signage and floor tiles are produced as blanks that can be polished, sanded and painted for particular uses. Gloss finishes may improve adhesion of paints or glues. There are also applications available to anti-ballistic composite materials that do not degrade like Kevlar (susceptible to degradation with exposure to arid or moisture). Kevlar fibers and material can be used in the process filler/middle layers of the present invention to produce a significantly improved antiballistic composite. Also, plastic or metal sheeting may be placed on one or more surfaces of the floor tile, signage or antiballistic blanks to improve product strength, flexibility and product longevity.

Example 5

Pre-formed ABS panel and PET mat combination to produce a ½ inch thick 12 inch square panel with a matte surface.

1. Selection of mold: An aluminum mold with a 12 inch by 12 inch fillable mold area and having a matte interior surface is selected. The mold selected is able to withstand pressures exceeding 4,000 lb/sq. in. and temperatures up to 500° F. The mold is preheated to approximately 100° F./38° C. Alternatively, the mold may have dimensions of 12×15, 12×18, 8×8, or 13×4. The mold is lubricated to prevent sticking of the final product. Lubricants include Spray McLube 17006.

2. Application of pre-formed rigid blank panel for base layer: A pre-formed rigid ABS panel weighing approximately 16 ounces (acrylonitrile butadiene styrene) is placed evenly in the mold by hand. The ABS material in the rigid panel has ideally been reclaimed from electronic waste which has been previously pulverized to achieve the preferred particle size and formed into panels in the manner described in FIG. 21. The size and weight of the pre-formed blank can vary (from range of 10 oz. to 25 oz.) depending on the application and size of the desired end product.

3. Application of fibrous core mat: A core layer of approximately 4 ounces of fibrous PET (polyethylene terephthalate) material that has been previously pressed into a mat with dimensions slightly less than 12 inches square is placed over the previously applied pre-formed ABS rigid panel such that the ABS is completely covered by the fibrous mat and only small voids are visible in the fibrous layer. The PET fibrous material in the mat has ideally been reclaimed from deconstructed carpet fibers. The weight of the fibrous material may vary between 2 to 12 oz. depending on size of desired and type of fibrous materials.

4. Application of pre-formed rigid blank panel for top layer: A pre-formed rigid ABS (acrylonitrile butadiene styrene) panel weighing approximately 16 ounces of the same ABS materials used in the base layer is placed evenly in the mold by hand to such that the top ABS rigid panel completely covers the fibrous core mat. The size and weight of the pre-formed blank can vary (from range of 10 oz. to 25 oz.) depending on the application and size of the desired end product.

5. Fitting of top mold plate: A mold plate having the same characteristics as the base mold used is placed over the top layer of ABS material. This top plate may be a flat aluminum sheet.

6. Placement of loaded mold in thermoforming press: The loaded mold is placed on the lower platen of the thermoforming press which has been preheated to approximately 100° F./38° C. and the hydraulic system of the press is activated to raise the lower platen until the upper platen contacts the top mold plate.

7. Application of heat and pressure to loaded molds: The platens are electrically heated to approximately 400° F. and the thermoforming press is actuated to apply pressure of 1500-2500 psi for 100-130 seconds. This combination of temperature and pressure will allow the ABS materials in the pre-formed panels to reach the vicat softening point and become viscous enough to flow around the PET fibers in the core mat allowing the ABS and PET materials within the molds to fuse into a cohesive unit. Pressure is released after the appropriate time has elapsed.

8. Cooling and removal of finished panel: The molds are removed from the thermoforming press and placed between cooling platens until the fused materials reach ambient temperature—approximately 3 minutes. Cooling platens are cooled using circulating water and receive 500 psi of pressure during the cooling period. A fan assists with cooling by blowing ambient temperature air over the mold in the cooling platen.

Example 6

Pre-formed ABS and sinker combination to produce a ¼ inch thick 12 inch square panel with a matte surface.

1. Selection of mold: An aluminum mold with a 12 inch by 12 inch fillable mold area and having a matte interior surface is selected. The mold selected is able to withstand pressures exceeding 4,000 lb/sq. in. and temperatures up to 500° F. Alternatively, the mold may have dimensions of 12×15, 12×18, 8×8, or 13×4. The mold is lubricated to prevent sticking of the final product. Lubricants include Spray McLube 17006.

2. Application of pre-formed rigid blank panel for base layer: A pre-formed rigid ABS panel weighing approximately 16 ounces (acrylonitrile butadiene styrene) is placed evenly in the mold by hand. The ABS material in the rigid panel has ideally been reclaimed from electronic waste which has been previously pulverized to achieve the preferred particle size and formed into panels in the manner described in FIG. 21. The size and weight of the pre-formed blank can vary (from range of 10 oz. to 25 oz.) depending on the application and size of the desired end product.

3. Application of Sinker material: A core layer of approximately 8 to 36 ounces of loose Sinker material is placed over the previously applied ABS layer such that the ABS is completely covered by the Sinker material and only small voids are visible in the fibrous layer. The Sinker material in the in the middle layer has ideally been reclaimed from deconstructed PET materials, namely, washed, dried and roughly ground PET bottles, filled PP, or PVC materials. These materials have a specific gravity of more than 1.0. The middle layer may use a combination of Sinker and bulk ground ABS materials.

4. Application of pre-formed rigid blank panel for top layer: A pre-formed rigid ABS (acrylonitrile butadiene styrene) panel weighing approximately 16 ounces of the same ABS materials used in the base layer is placed evenly in the mold by hand to such that the top ABS rigid panel completely covers the fibrous core mat. The size and weight of the pre-formed blank can vary (from range of 10 oz. to 25 oz.) depending on the application and size of the desired end product.

5. Fitting of top mold plate: A mold plate having the same characteristics as the base mold used is placed over the top layer of ABS material. The tope plate may be a flat aluminum sheet.

6. Placement of loaded mold in thermoforming press: The loaded mold is placed on the lower platen of the thermoforming press which has been preheated to 315° F. and the hydraulic system of the press is activated to raise the lower platen until the upper platen contacts the top mold plate. The pre-heat time may be approximately 150 seconds, with such pre-heating being done between 100 seconds to 200 seconds. Pre-heating is done at 100 psi to reach a temperature of approximately 315° F. The pressure can range from 50 psi to 500 psi, and the pre-heat temperature can range from 200° F. to 500° F.

7. Application of heat and pressure to loaded molds: The platens are electrically heated to approximately 315° F. and the thermoforming press is actuated to apply pressure of 2200 psi (could range from 1500-3500 psi) for 45 seconds. The time range could vary from 30 to 150 seconds. This combination of temperature and pressure will allow the ABS materials to reach the vicat softening point and become viscous enough to flow around the sinker materials in the core material allowing the ABS and PET materials within the molds to fuse into a cohesive unit. Pressure is released after the appropriate time has elapsed.

8. Cooling and removal of finished panel: The molds are removed from the thermoforming press and placed between cooling platens until the fused materials reach ambient temperature—approximately 150 seconds, but could be a shorter time period or up to 3 minutes. Cooling platens are cooled using circulating water and receive 150 psi of pressure during the cooling period, but pressure could be greater (up to 500 psi) or lessened to 100 psi. A fan assists with cooling by blowing ambient temperature air over the mold in the cooling platen, when fused materials in the mold reach ambient temperature or less up to 74° F., the molds are removed from the cooling platens, the fused materials are removed from the mold and the panel is stacked with other panels. The stacked panels are held at ambient temperature for 24 hours to complete crystallization of the fused materials prior to further processing or shipping. The fully cooled panel is wiped with a cloth to remove dust and the edges are trimmed to remove loose fibers. The finished product is an approximately ¼ inch thick 12 inch square panel weighing slightly over 1 pound (16.5 ozs.) having a matte surface suitable for painting or sanding and painting to a desired color.

Example 7

Pre-formed ABS panel and HIPS (high impact polystyrene) combination to produce a 0.135 inch thick 12 inch square panel with a matte surface.

1. Selection of mold: An aluminum mold with a 12 inch by 12 inch fillable mold area and having a matte interior surface is selected. The mold selected is able to withstand pressures exceeding 4,000 lb/sq. in. and temperatures up to 500° F. Alternatively, the mold may have dimensions of 12×15, 12×18, 8×8, or 13×4. The mold is lubricated to prevent sticking of the final product. Lubricants include Spray McLube 17006.

2. Application of pre-formed rigid blank panel for base layer: A pre-formed rigid ABS panel weighing approximately 16 ounces (acrylonitrile butadiene styrene) is placed evenly in the mold by hand. The ABS material in the rigid panel has ideally been reclaimed from electronic waste which has been previously pulverized to achieve the preferred particle size and formed into panels in the manner described in FIG. 21. The size and weight of the pre-formed blank can vary (from range of 10 oz. to 25 oz.) depending on the application and size of the desired end product.

3. Application of HIPS material: A core layer of approximately 18 ounces of loose HIPS (high impact polystyrene) is placed over the previously applied ABS preformed blank such that the ABS preformed blank is completely covered by the HIPS material and only small voids are visible in the HIPS layer. The HIPS material has ideally been reclaimed from deconstructed high impact polystyrene but can be replaced by fibrous carpet fibers (PET fibers).

4. Application of pre-formed rigid blank panel for top layer: A pre-formed rigid ABS (acrylonitrile butadiene styrene) panel weighing approximately 16 ounces of the same ABS materials used in the base layer is placed evenly in the mold by hand to such that the top ABS rigid panel completely covers the fibrous core mat. The size and weight of the pre-formed blank can vary (from range of 10 oz. to 25 oz.) depending on the application and size of the desired end product.

5. Fitting of top mold plate: A mold plate having the same characteristics as the base mold used is placed over the top layer of ABS material. The top plate may be a flat aluminum sheet.

6. Placement of loaded mold in thermoforming press: The loaded mold is placed on the lower platen of the thermoforming press which has been preheated to 315° F. and the hydraulic system of the press is activated to raise the lower platen until the upper platen contacts the top mold plate. The pre-heat time may be approximately 150 seconds, with such pre-heating being done between 100 seconds to 200 seconds. Pre-heating is done at 100 psi to reach a temperature of approximately 315° F. The pressure can range from 50 psi to 500 psi, and the pre-heat temperature can range from 200° F. to 500° F.

7. Application of heat and pressure to loaded molds: The platens are electrically heated to approximately 315° F. and the thermoforming press is actuated to apply pressure of approximately 2500 psi for 90 seconds. The time of the application can vary between 45 to 180 seconds, and the applied pressure can vary between 1500 to 3100 psi. This combination of temperature and pressure will allow the ABS/HIPS materials to reach the vicat softening point and become viscous enough to flow around the ABS/HIPS in the core material allowing the ABS and PET materials (or sinker materials) within the molds to fuse into a cohesive unit. Pressure is released after the appropriate time has elapsed.

8. Cooling and removal of finished panel: The molds are removed from the thermoforming press and placed between cooling platens until the fused materials reach ambient temperature of 78° F.—approximately 150 seconds (but could vary between 75 to 225 seconds). Cooling platens are cooled using circulating water and receive 2500 psi of pressure during the cooling period, but could receive pressure of 1500 psi to 3500 psi. A fan assists with cooling by blowing ambient temperature air over the mold in the cooling platen. When fused materials in the mold reach ambient temperature of approximately 78° F., the molds are removed from the cooling platens, the fused materials are removed from the mold and the panel is stacked with other panels. The stacked panels are held at ambient temperature for 24 hours to complete crystallization of the fused materials prior to further processing or shipping. The fully cooled panel is wiped with a cloth to remove dust and the edges are trimmed to remove loose fibers. The finished product is an approximately 0.135 inch thick 12 inch square panel weighing varying based on impact 13.5 (or weights) having a matte surface suitable for painting or sanding and painting to desired color.

Example 8

Pre-formed ABS and ABS powder combination to produce a 0.115 inch thick 12 inch square panel with a matte surface.

1. Selection of mold: An aluminum mold with a 12 inch by 12 inch fillable mold area and having a matte interior surface is selected. The mold selected is able to withstand pressures exceeding 4,000 lb/sq. in. and temperatures up to 500° F. Alternatively, the mold may have dimensions of 12×15, 12×18, 8×8, or 13×4. The mold is lubricated to prevent sticking of the final product. Lubricants include Spray McLube 17006.

2. Application of pre-formed rigid blank panel for base layer: A pre-formed rigid ABS panel weighing approximately 16 ounces (acrylonitrile butadiene styrene) is placed evenly in the mold by hand. The ABS material in the rigid panel has ideally been reclaimed from electronic waste which has been previously pulverized to achieve the preferred particle size and formed into panels in the manner described in FIG. 21. The size and weight of the pre-formed blank can vary (from range of 10 oz. to 25 oz.) depending on the application and size of the desired end product.

3. Application of ABS powder: A core layer of approximately 2 ounces of pulverized ABS powder is placed under the previously applied ABS layer such that the ABS is completely covered by the fibrous material and only small voids are visible in the fibrous layer. The PET fibrous material in the fibrous layer has ideally been reclaimed from deconstructed carpet fibers.

4. Application of pre-formed rigid blank panel for top layer: A pre-formed rigid ABS (acrylonitrile butadiene styrene) panel weighing approximately 16 ounces of the same ABS materials used in the base layer is placed evenly in the mold by hand to such that the top ABS rigid panel completely covers the fibrous core mat. The size and weight of the pre-formed blank can vary (from range of 10 oz. to 25 oz.) depending on the application and size of the desired end product.

5. Fitting of top mold plate: A mold plate having the same characteristics as the base mold used is placed over the top layer of ABS material. The top plate may be a flat aluminum sheet or a pionite top sheet.

6. Placement of loaded mold in thermoforming press: The loaded mold is placed on the lower platen of the thermoforming press which has been preheated to 315° F. and the hydraulic system of the press is activated to raise the lower platen until the upper platen contacts the top mold plate. The pre-heat time may be approximately 150 seconds, with such pre-heating being done between 100 seconds to 200 seconds. Pre-heating is done at 100 psi to reach a temperature of approximately 315° F. The pressure can range from 50 psi to 500 psi, and the pre-heat temperature can range from 200° F. to 500° F.

7. Application of heat and pressure to loaded molds: The platens are electrically heated to approximately 315° F. and the thermoforming press is actuated to apply pressure of 2000 psi (could range from 1500-3500 psi) for 45 seconds. The time range could vary from 30 to 150 seconds. This combination of temperature and pressure will allow the ABS materials to reach the vicat softening point and become viscous enough to flow around the sinker materials in the core material allowing the ABS and PET materials within the molds to fuse into a cohesive unit. Pressure is released after the appropriate time has elapsed.

8. Cooling and removal of finished panel: The molds are removed from the thermoforming press and placed between cooling platens until the fused materials reach ambient temperature—approximately 150 seconds, but could be a shorter time period or up to 3 minutes. Cooling platens are cooled using circulating water and receive 150 psi of pressure during the cooling period, but pressure could be greater (up to 500 psi) or lessened to 100 psi. A fan assists with cooling by blowing ambient temperature air over the mold in the cooling platen, when fused materials in the mold reach ambient temperature or less up to 74° F., the molds are removed from the cooling platens, the fused materials are removed from the mold and the panel is stacked with other panels. The stacked panels are held at ambient temperature for 24 hours to complete crystallization of the fused materials prior to further processing or shipping. The fully cooled panel is wiped with a cloth to remove dust and the edges are trimmed to remove loose fibers. The finished product is an approximately ¼ inch thick 12 inch square panel weighing slightly over 1 pound (16.5 ozs.) having a matte surface suitable for painting or sanding and painting to a desired color.

When fused materials in the mold reach ambient temperature, the molds are removed from the cooling platens, the fused materials are removed from the mold and the panel is stacked with other panels. The stacked panels are held at ambient temperature for 24-48 hours to complete crystallization of the fused materials prior to further processing or shipping. The fully cooled panel is wiped with a cloth to remove dust and the edges are trimmed to remove loose fibers. The finished product is an approximately ½ inch thick 12 inch square panel weighing slightly over 2 pounds having a matte surface suitable for painting.

As shown in FIG. 23, the composite Panel materials are "sandwiched" in mold using rigid particulate materials for top and bottom exteriors. A thermoforming mold base 2301 made of aluminum, copper, steel, epoxy board or wood is filled with materials for preparing thermoformed composite panels by layering the materials in a sandwich-like manner.

A base layer 2302 of rigid particulate materials is distributed in an even layer from edge to edge across the interior of the mold base. The base layer of materials added to a 12 inch square mold can range from a low of 0.3 ounce to produce a very thin panel and up to 8 ounces to produce a panel having a final thickness of ¼ inch.

A core layer 2303 of fibrous material is distributed in an even layer over the over base layer 2302 of rigid particulate material. The fibrous core can be very thin, such as a single thickness of netting-type fabric, up to a ¼ inch thick densely packed fiber mat.

A top layer 2304 of rigid particulate material is distributed from edge to edge of the mold in an even layer over the fibrous core. The top layer of rigid particulate matter added to a 12 inch square mold can range from a low of 0.3 ounce to produce a very thin panel and up to 8 ounces to produce a panel having a final thickness of ¼ inch.

A top mold plate 2305 made of aluminum, copper, steel, epoxy board or wood is situated over the top layer 2304 of particulate material.

Mold base 2301 filled with "sandwiched" materials 2302, 2303 and 2304 and covered with top mold plate 2305 is now ready to load into thermoforming press for fusion of "sandwiched" materials.

Composite Panel materials "sandwiched" in mold using rigid pre-formed blank panel for exterior are shown in FIG. 24. A thermoforming mold base 2401 made of aluminum, copper, steel, epoxy board or wood is filled with materials for preparing thermoformed composite panels by layering the materials in a sandwich-like manner.

A base layer 2402 of a panel pre-formed from rigid particulate materials is placed in the interior of the mold base. The base layer of materials added to a 12 inch square mold can range from a very thin panel weighing 0.6 ounce up to 1 pound panel having a thickness of ¼ inch.

A core layer 2403 of fibrous material is distributed in an even layer over the over base layer 2402 of the rigid pre-made panel. The fibrous core can be very thin, such as a single thickness of netting-type fabric, up to a ¼ inch thick densely packed fiber mat.

A top layer 2404 of panel pre-formed from rigid particulate materials is situated over the fibrous core 2403. The pre-formed panel of top layer 2403 for a 12 inch square mold can range from a very thin panel weighing 0.6 ounce up to 1 pound panel having a thickness of ¼ inch.

A top mold plate 2405 made of aluminum, copper, steel, epoxy board or wood is situated over the pre-formed panel of the top layer 2404.

Mold base 2401 filled with "sandwiched" materials 2402, 2403 and 2404 and covered with top mold plate 2405 is now ready to load into thermoforming press for fusion of "sandwiched" materials.

FIGS. 25 through 31 demonstrate examples of finishes that may be produced on the panels as a result of the interior finishes on the molds. FIG. 25 shows a panel with slate finish having a stone-like appearance. FIG. 26 shows a panel with crystal finish having a textured reflective surface. FIG. 27 shows a panel with a suede-type finish having a textured matte surface. FIG. 28 shows a panel with the hi-brite finish having a highly reflective textured surface. FIG. 29 shows a panel with the medium gloss finish having a reflective finely textured surface. FIG. 30 shows a panel with a mirror finish which has a highly reflective smooth surface. FIG. 31 shows a panel with a polished aluminum-type finish having a highly reflective smooth surface with a brushed appearance.

Because the invention uses polymer materials within the creation of our finished substrate, our ES products transfer less than 1% of the heat seen versus aluminum substrates which are the dominant traffic sign substrate seen today. This reduced heat transfer causes less degradation to laminated surface materials; such as reflective sign sheeting paints. It will be apparent to those skilled in the art, that is, to those who have knowledge or experience in this area of technology that many uses and design variations are possible for the invention disclosed herein. The above detailed discussion of various alternative and preferred features and embodiments will illustrate the general principles of the invention. Other embodiments suitable for other applications will be apparent to those skilled in the art given the benefit of this disclosure. The particular combination of parts described and illustrated herein is intended to represent only certain embodiments of the present invention.

The invention claimed is:

1. A method for making a panel by a thermoforming press comprising pressure plates, a base mold, and a top mold cover, comprising:
preheating the pressure plates of the thermoforming press to a temperature of at least 100° F.;
loading the base mold with a base layer, a fibrous core layer, and a top layer;
covering the base layer, the core layer, and the top layer with the top mold cover;
applying heat and approximately 1500-2500 psi of pressure, by the pressure plates of the thermoforming press, to the base layer, the fibrous core layer, and the top layer for a predetermined time period of 100-130 seconds to produce a panel of fused material; and
causing the base layer and the top layer to reach their respective vicat softening points and become viscous enough to flow around the fibrous core layer thereby causing materials of the base layer, top and fibrous core layers to fuse due to application of the heat and the pressure on the base layer, the fibrous core layer, and the top layer from the thermoforming press,
wherein the base layer comprises a rigid acrylonitrile butadiene styrenic (ABS) material having an average particle size of less than ¹⁄₁₆ of an inch, the core layer comprises fibrous polyethylene terephthalate (PET) placed on top of the base layer, and the top layer comprises the rigid ABS material placed on top of the fibrous core layer,
and wherein the rigid ABS material of the top layer has an average particle size of less than ¹⁄₁₆ of an inch.

2. The method of claim 1 further comprising: applying, by a funnel drop mechanism, the base layer and the top layer; and
distributing, by the funnel drop mechanism, free-flowing dry ABS rigid particles.

3. The method of claim 1 wherein the rigid ABS material comprises reclaimed electronic waste that has been previously pulverized to achieve the average particle size.

4. The method of claim 1 wherein the fibrous PET material comprises reclaimed, deconstructed carpet fibers.

5. The method of claim 1 further comprising cooling, by one or more cooling plates, the panel of fused materials.

6. The method of claim 5 wherein the one or more cooling plates cooling the panel of fused materials comprises circulating water and receiving about 500 psi of pressure during a cooling period.

7. The method of claim 1, further comprises blowing, by a fan, ambient temperature air over the panel of fused materials.

8. The method of claim 1, wherein the panel of fused material is approximately 1¼ inch thick, 12 inch square panel weighing approximately 1 pound and has a matte surface suitable for painting.

9. A method for making a panel by a thermoforming press comprising pressure plates, a base mold, and a top mold cover, comprising:

preheating the pressure plates of the thermoforming press to a temperature of at least 100° F.;

loading the base mold with a base layer, a fibrous core layer, and a top layer;

covering the base layer, the core layer, and the top layer with the top mold cover;

applying heat and approximately 1500-2500 psi of pressure, by the pressure plates of the thermoforming press, to the base layer, the fibrous core layer, and the top layer for a predetermined time period of 100-130 seconds to produce a panel of fused material; and causing the base layer and the top layer to reach their respective vicat softening points and become viscous enough to flow around the fibrous core layer thereby causing materials of the base layer, top and fibrous core layers to fuse due to application of the heat and the pressure on the base layer, the fibrous core layer, and the top layer from the thermoforming press, wherein the base layer comprises a ground acrylonitrile butadiene styrenic (ABS) material having an average particle size of less than 1/16 of an inch, wherein the core layer comprises polyethylene terephthalate (PET) sinker core material comprising roughly ground PET bottles, filled polypropylene, or polyvinyl chloride (PVC) materials having a specific gravity of more than 1.0 placed on top of the base layer, and wherein the top layer comprises the ground ABS material having an average particle size of less than 1/16 of an inch.

10. The method of claim 9 further comprising distributing, by a funnel drop mechanism, free-flowing, dry ABS rigid particles.

11. The method of claim 9 wherein the rigid ABS material comprises reclaimed electronic waste that has been previously pulverized to achieve the average particle size.

12. The method of claim 9 wherein the PET sinker core material comprises reclaimed, deconstructed carpet fibers.

13. The method of claim 9 further comprising cooling, by one or more cooling plates, the panel of fused materials.

14. The method of claim 13 wherein the one or more cooling plates cooling the panel of fused materials comprises circulating water and receiving about 500 psi of pressure during a cooling period.

* * * * *